(12) United States Patent
Robinson et al.

(10) Patent No.: US 10,330,843 B2
(45) Date of Patent: Jun. 25, 2019

(54) WIDE ANGLE IMAGING DIRECTIONAL BACKLIGHTS

(71) Applicant: REALD SPARK, LLC, Beverly Hills, CA (US)

(72) Inventors: Michael G. Robinson, Boulder, CO (US); Graham J. Woodgate, Henley-on-Thames (GB)

(73) Assignee: RealD Spark, LLC, Beverly Hills, CA (US)

( * ) Notice: Subject to any disclaimer, the term of this patent is extended or adjusted under 35 U.S.C. 154(b) by 252 days.

(21) Appl. No.: 15/290,543

(22) Filed: Oct. 11, 2016

(65) Prior Publication Data
US 2017/0139097 A1     May 18, 2017

Related U.S. Application Data

(60) Provisional application No. 62/255,248, filed on Nov. 13, 2015.

(51) Int. Cl.
*F21V 8/00*        (2006.01)
*G02B 27/22*     (2018.01)
(Continued)

(52) U.S. Cl.
CPC ........... *G02B 6/002* (2013.01); *G02B 6/0048* (2013.01); *G02B 6/0068* (2013.01);
(Continued)

(58) Field of Classification Search
CPC .... G02B 6/002; G02B 6/0048; G02B 6/0068; G02B 27/225; G02B 27/2228; H04N 13/32; H04N 13/312; H04N 13/305
See application file for complete search history.

(56) References Cited

U.S. PATENT DOCUMENTS 1,128,979 A    2/1915   Hess
1,970,311 A    8/1934   Ives
(Continued)

FOREIGN PATENT DOCUMENTS

CN       1142869 A     2/1997
CN       1377453 A    10/2002
(Continued)

OTHER PUBLICATIONS

AU-2011329639 Australia Patent Examination Report No. 1 dated Mar. 6, 2014.
(Continued)

*Primary Examiner* — David V Bruce
(74) *Attorney, Agent, or Firm* — Penny L. Lowry; Neil G J Mothew

(57) ABSTRACT

An imaging directional backlight apparatus includes a waveguide and a light source array for providing large area directed illumination from localized light sources. The waveguide may include a stepped structure. The steps may include extraction features optically hidden to guided light, propagating in a first forward direction. Returning light propagating in a second backward direction may be refracted, diffracted, or reflected by the features, providing discrete illumination beams exiting from the top surface of the waveguide. Viewing windows are formed through imaging individual light sources and define the relative positions of system elements and ray paths. The uncorrected system creates non-illuminated void portions when viewed off-axis preventing uniform wide angle 2D illumination modes. The input end may have microstructures arranged to remove this non uniformity at wide angles. The microstructures may have reduced reflectivity for parts of the input end that contribute to stray light in privacy and autostereoscopic modes.

82 Claims, 48 Drawing Sheets

(51) Int. Cl.
*H04N 13/32* (2018.01)
*H04N 13/305* (2018.01)
*H04N 13/312* (2018.01)

(52) U.S. Cl.
CPC ....... *G02B 27/225* (2013.01); *G02B 27/2228* (2013.01); *H04N 13/32* (2018.05); *H04N 13/305* (2018.05); *H04N 13/312* (2018.05)

(56) References Cited

U.S. PATENT DOCUMENTS

| | | |
|---|---|---|
| 2,133,121 A | 10/1938 | Stearns |
| 2,247,969 A | 7/1941 | Strewart |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,216,405 B2 | 7/2012 | Emerton et al. |
| 8,223,296 B2 | 7/2012 | Lee et al. |
| 8,251,562 B2 | 8/2012 | Kuramitsu et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,714,804 B2 | 5/2014 | Kim et al. |
| 8,752,995 B2 | 6/2014 | Park |
| 9,197,884 B2 | 11/2015 | Lee et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |

(56) References Cited

U.S. PATENT DOCUMENTS

| | | |
|---|---|---|
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2006/0291244 A1* | 12/2006 | Yang ............ G02B 6/002 362/609 |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0174700 A1 | 7/2009 | Daiku |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091093 A1 | 4/2010 | Robinson |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0062991 A1 | 3/2012 | Krijn |
| 2012/0063166 A1 | 3/2012 | Panagotacos et al. |
| 2012/0075285 A1 | 3/2012 | Oyagi et al. |
| 2012/0086776 A1 | 4/2012 | Lo |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0314145 A1 | 12/2012 | Robinson |
| 2013/0101253 A1 | 4/2013 | Popovich et al. |
| 2013/0107340 A1 | 5/2013 | Wong et al. |
| 2013/0135588 A1 | 5/2013 | Popovich et al. |
| 2013/0169701 A1 | 7/2013 | Whitehead et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0022619 A1 | 1/2014 | Woodgate et al. |
| 2014/0036361 A1 | 2/2014 | Woodgate et al. |

(56) References Cited

U.S. PATENT DOCUMENTS

| | | | |
|---|---|---|---|
| 2014/0126238 A1 | 5/2014 | Kao et al. | |
| 2014/0240828 A1 | 8/2014 | Robinson et al. | |
| 2014/0340728 A1 | 11/2014 | Taheri | |
| 2014/0368602 A1 | 12/2014 | Woodgate et al. | |

FOREIGN PATENT DOCUMENTS

| | | | |
|---|---|---|---|
| CN | 1454329 A | 11/2003 | |
| CN | 1466005 A | 1/2004 | |
| CN | 1487332 A | 4/2004 | |
| CN | 1696788 A | 11/2005 | |
| CN | 1823292 A | 8/2006 | |
| CN | 1826553 A | 8/2006 | |
| CN | 1866112 A | 11/2006 | |
| CN | 2872404 | 2/2007 | |
| CN | 1307481 | 3/2007 | |
| CN | 101029975 A | 9/2007 | |
| CN | 101049028 A | 10/2007 | |
| CN | 200983052 | 11/2007 | |
| CN | 101114080 A | 1/2008 | |
| CN | 101142823 A | 3/2008 | |
| CN | 100449353 | 1/2009 | |
| CN | 101364004 A | 2/2009 | |
| CN | 101598863 B | 12/2009 | |
| CN | 100591141 | 2/2010 | |
| CN | 202486493 U | 10/2012 | |
| CN | 1910399 B | 5/2013 | |
| EP | 0653891 A1 | 5/1995 | |
| EP | 0721131 A2 | 7/1996 | |
| EP | 0830984 A2 | 3/1998 | |
| EP | 0833183 A1 | 4/1998 | |
| EP | 0860729 A2 | 8/1998 | |
| EP | 0939273 A1 | 9/1999 | |
| EP | 0656555 B1 | 3/2003 | |
| EP | 2003394 A2 | 12/2008 | |
| EP | 1394593 B1 | 6/2010 | |
| EP | 2451180 A2 | 5/2012 | |
| EP | 1634119 B1 | 8/2012 | |
| GB | 2405542 | 2/2005 | |
| JP | H08211334 | 8/1996 | |
| JP | H08237691 A | 9/1996 | |
| JP | H08254617 | 10/1996 | |
| JP | H08070475 | 12/1996 | |
| JP | H08340556 | 12/1996 | |
| JP | 2000048618 A | 2/2000 | |
| JP | 2000200049 A | 7/2000 | |
| JP | 2001093321 A | 4/2001 | |
| JP | 2001281456 | 10/2001 | |
| JP | 2002049004 A | 2/2002 | |
| JP | 2003215349 A | 7/2003 | |
| JP | 2003215705 A | 7/2003 | |
| JP | 2004319364 A | 11/2004 | |
| JP | 2005116266 | 4/2005 | |
| JP | 2005135844 A | 5/2005 | |
| JP | 2005183030 A | 7/2005 | |
| JP | 2005259361 A | 9/2005 | |
| JP | 2006004877 A | 1/2006 | |
| JP | 2006031941 A | 2/2006 | |
| JP | 206310269 A | 11/2006 | |
| JP | 3968742 | 8/2007 | |
| JP | H3968742 | 8/2007 | |
| JP | 2007273288 A | 10/2007 | |
| JP | 2007286652 | 11/2007 | |
| JP | 2008204874 A | 9/2008 | |
| JP | 2010160527 A | 7/2010 | |
| JP | 20110216281 | 10/2011 | |
| JP | 2013015619 | 1/2013 | |
| JP | 2013502693 | 1/2013 | |
| JP | 2013540083 | 10/2013 | |
| KR | 20030064258 | 7/2003 | |
| KR | 20090932304 | 12/2009 | |
| KR | 20110006773 A | 1/2011 | |
| KR | 20110017918 A | 2/2011 | |
| KR | 20110067534 A | 6/2011 | |
| KR | 20120048301 A | 5/2012 | |
| KR | 20120049890 A | 5/2012 | |
| KR | 20130002646 A | 1/2013 | |
| KR | 20140139730 | 12/2014 | |
| TW | 200528780 A | 9/2005 | |
| WO | 1994006249 B1 | 4/1994 | |
| WO | 1995020811 A1 | 8/1995 | |
| WO | 1995027915 A1 | 10/1995 | |
| WO | 1998021620 A1 | 5/1998 | |
| WO | 1999011074 A1 | 3/1999 | |
| WO | 2001027528 A1 | 4/2001 | |
| WO | 2001061241 A1 | 8/2001 | |
| WO | 2001079923 A1 | 10/2001 | |
| WO | 2011020962 A1 | 2/2011 | |
| WO | 2011022342 A2 | 2/2011 | |
| WO | 2011068907 A1 | 6/2011 | |
| WO | 2011149739 A2 | 12/2011 | |

OTHER PUBLICATIONS

AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action dated Jul. 14, 2016.
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063055.0 Chinese 1st Office Action of the State Intellectual Property Office of P.R. dated Jun. 23, 2016.
CN-201480023023.2 Office action dated Aug. 12, 2016.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-13844510.1 European Extended Search Report of European Patent Office dated May 13, 2016.
EP-16150248.9 European Extended Search Report of European Patent Office dated Jun. 16, 2016.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
JP-2009538527 Reasons for rejection dated Jul. 17, 2012 with translation.
JP-200980150139.1 1st Office Action dated Feb. 11, 2014.
JP-200980150139.1 2d Office Action dated Apr. 5, 2015.
JP-2013540083 Notice of reasons for rejection of dated Jun. 30, 2015.
JP-2013540083 Notice of reasons for rejection with translation dated Jun. 21, 2016.

(56) References Cited

OTHER PUBLICATIONS

Kalantar, et al. "Backlight Unit With Double Surface Light Emission," J. Soc. Inf. Display, vol. 12, Issue 4, pp. 379-387 (Dec. 2004).
KR-20117010839 1st Office action (translated) dated Aug. 28, 2015.
KR-20117010839 2d Office action (translated) dated Apr. 28, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Marjanovic, M.,"Interlace, Interleave, and Field Dominance," http://www.mir.com/DMG/interl.html, pp. 1-5 (2001).
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041237 International search report and written opinion of international searching authority dated May 15, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2016/027297 International search report and written opinion of international searching authority dated Jul. 26, 2017.
PCT/US2016/027350 International search report and written opinion of the international searching authority dated Jul. 25, 2016.
PCT/US2016/034418 International search report and written opinion of the international searching authority dated Sep. 7, 2016.
Robinson et al., U.S. Appl. No. 14/751,878 entitled "Directional privacy display" filed Jun. 26, 2015.
Robinson et al., U.S. Appl. No. 15/097,750 entitled "Wide angle imaging directional backlights" filed April 13, 2016.
Robinson et al., U.S. Appl. No. 15/098,084 entitled "Wide angle imaging directional backlights" filed April 13, 2016.
Robinson, U.S. Appl. No. 13/300,293 entitled "Directional flat illuminators" filed Nov. 18, 2011.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Robinson, U.S. Appl. No. 62/146,648 entitled "Wide Angle Imaging Directional Backlights" filed Apr. 13, 2015.
Robinson, U.S. Appl. No. 62/154,932 entitled "Wide Angle Imaging Directional Backlights:" filed Apr. 30, 2015.
Woodgate, U.S. Appl. No. 62/167,185 entitled "Wide Angle Imaging Directional Backlights" filed May 27, 2015.
Robinson, U.S. Appl. No. 62/017,337 entitled "Directional Privacy display" filed Jun. 26, 2014.
Robinson, U.S. Appl. No. 13/839,552 entitled "Wide angle imaging directional backlights" filed Mar. 15, 2013.
Robinson, U.S. Appl. No. 13/897,102 entitled "Source conditioning for imaging directional backlights" filed May 17, 2013.
Robinson, U.S. Appl. No. 13/836,443 entitled Crosstalk suppression in a directional backlight: filed Mar. 15, 2013.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13822472.0 European Extended Search Report of European Patent Office dated Mar. 2, 2016.
Ep-13843659.7 European Extended Search Report of European Patent Office dated May 10, 2016.

(56) References Cited

OTHER PUBLICATIONS

EP-13865893.5 European Extended Search Report of European Patent Office dated Oct. 6, 2016.
PCT/DE98/02576 International search report and written opinion of the international searching authority dated Mar. 4, 1999 (WO99/11074).

* cited by examiner

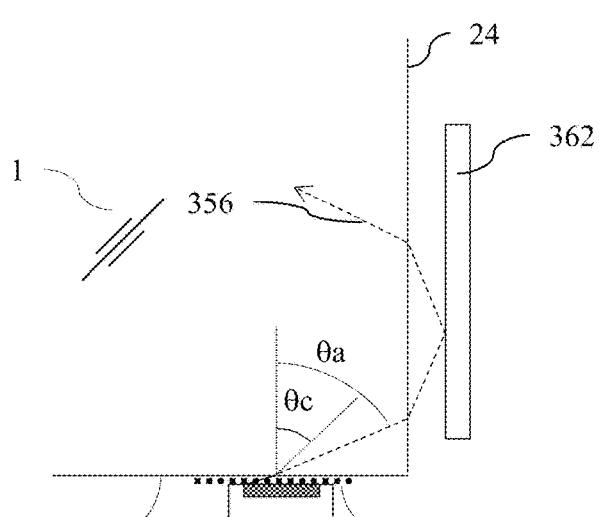
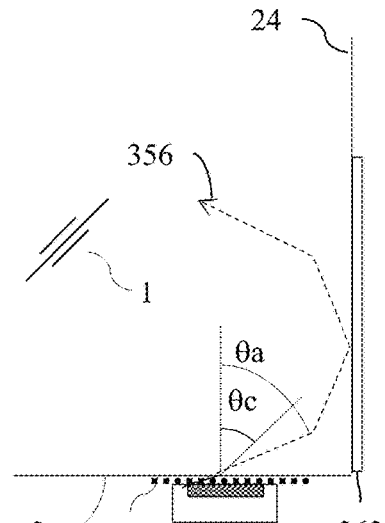
FIG. 19A
FIG. 19B
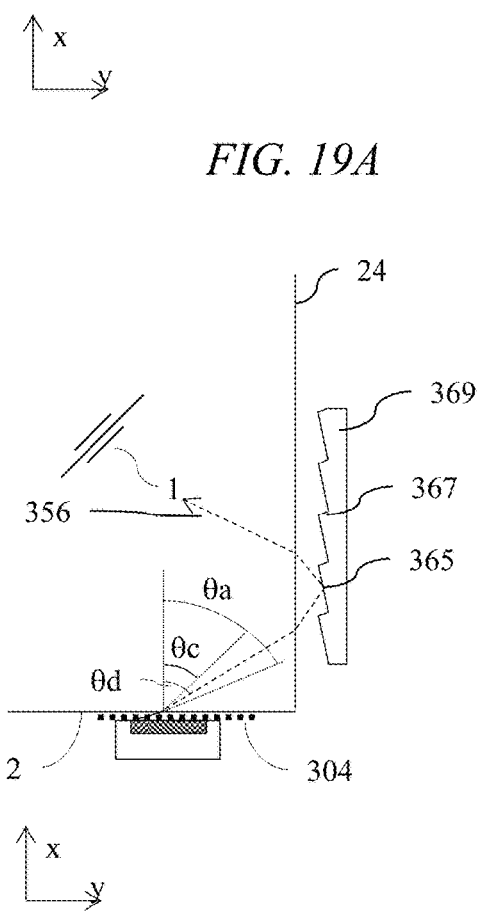
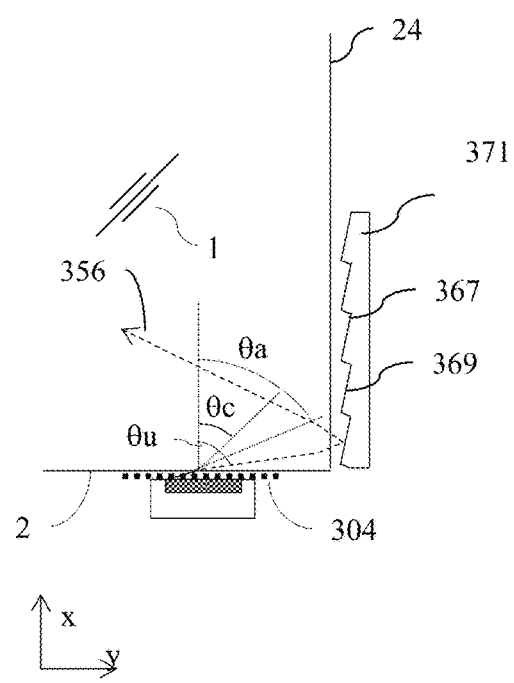
FIG. 20A
FIG. 20B ellipse parabola hyperbola

WIDE ANGLE IMAGING DIRECTIONAL BACKLIGHTS

CROSS-REFERENCE TO RELATED APPLICATIONS

This application claims priority to U.S. Provisional Patent Appl. No. 62/255,248, entitled "Wide angle imaging directional backlights" filed Nov. 13, 2015, which is herein incorporated by reference in its entirety.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to the present disclosure, a directional illumination apparatus may include an imaging directional backlight for directing light, an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293 (U.S. Patent Publ. No. 2012/0127573), which is herein incorporated by reference in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. Ideally, no light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure there may be provided a directional backlight for a transmissive spatial light modulator, comprising: a waveguide comprising an input end; and an array of light sources at different input positions in a lateral direction across the input end, the light sources being arranged to input light into the waveguide through the input end, the light sources having light emitting areas with respective lateral extents, the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources, wherein across a lateral extent of the input end aligned with the light emitting area of at least one of light sources, the input end is shaped in the lateral direction as an array of teeth that are each shaped with a convex curved section on one side the tooth and a concave curved section on the other side of the tooth.

Advantageously improved lateral uniformity can be achieved for a head on viewing position in comparison to a planar input end. Further, improved uniformity for off-axis viewing positions can be achieved by enhanced void filling. Further reduced streaking and increased uniformity can be achieved for stray light in off axis viewing of a display operating in privacy mode. Further, a linear lightbar can be used in cooperation with the waveguide input end in order to improve lightbar alignment tolerances and reduce cost.

At cusps between the convex curved sections and the concave curved sections, each of the convex curved sections and the concave curved sections may have a shallow angle at the cusp at one end thereof in a range from 0° to 20° and/or may have a steep angle at the cusp at the other end thereof in a range from 45° to 90°.

Said teeth may be identical. The light sources may have light emitting areas with respective lateral extents that are separated, and the input end may comprise plural reflection reduction regions arranged between the lateral extents of the light sources. The array of light sources may be at different input positions in a lateral direction across a central part of the input end, and the input end may comprise reflection reduction regions outside the central part of the input end.

Advantageously reflections from the input end can be reduced to reduce stray light in privacy operation for off-axis viewing, and improve privacy uniformity.

The first guide surface may be arranged to guide light by total internal reflection and the second guide surface may comprise a plurality of light extraction features oriented to direct light reflected by the reflected end in directions allowing exit through the first guide surface as the output light and intermediate regions between the light extraction features that are arranged to guide light along the waveguide. The light extraction features and the intermediate regions may alternate with one another in a stepped shape. The light extraction features may have positive optical power in the lateral direction. Said at least one of light sources may be at an input position offset from the optical axis of the reflective end. The waveguide may further comprise sides, extending between the input end and the reflective end and between the guiding surfaces, that are arranged to reflect light from the light sources.

The directional backlight may further comprise a control system arranged to control the light sources. The control system may be arranged, on selective operation of a first light source to direct light into an optical window, to simultaneously operate a second light source that directs light reflected by the reflective end and then by a side of the waveguide into an outer portion of the waveguide that fails to be illuminated by the first light source.

Advantageously illumination voids can be compensated and uniformity improved for off axis viewing in a wide angle mode of operation.

According to a second aspect of the present disclosure there may be provided a directional display device comprising: a directional backlight according the first aspect; and a transmissive spatial light modulator arranged to receive the output light from the waveguide and to modulate it to display an image.

Advantageously a directional privacy display may be provided with high uniformity for on-axis and off-axis viewing positions, while low levels of stray light for off-axis viewing positions in a privacy mode of operation.

According to a third aspect of the present disclosure there may be provided a directional backlight for a transmissive spatial light modulator, comprising: a waveguide comprising an input end; and an array of light sources at different input positions in a lateral direction across the input end, the light sources being arranged to input light into the waveguide through the input end, the light sources having light emitting areas with respective lateral extents, the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources, wherein the light sources include at least one pair of adjacent light sources arranged at input positions offset from the optical axis of the reflective end, wherein, within the pair, the light source closest to said optical axis is inclined with the normal to the lateral extent of its light emitting area inclined towards said optical axis and the light source furthest from said optical axis is inclined with the normal to the lateral extent of its light emitting area inclined away from said optical axis.

Advantageously improved lateral uniformity can be achieved for a head on viewing position in comparison to a planar input end. Further, improved uniformity for off-axis viewing positions can be achieved by enhanced void filling. Further reduced streaking and increased uniformity can be achieved for stray light in off axis viewing of a display operating in privacy mode. Further a single radius diamond may be used to form the optical microstructure, reducing cost and complexity of a tooling step.

The input end of the waveguide may comprise a pair of inclined input facets extending across the light emitting areas of the respective light sources of said pair.

Advantageously luminous intensity in directions that optimize void filling can be provided, achieving increased uniformity for high angle uniformity.

Said input facets may be each shaped as an array of curved sections having cusps therebetween, and the angles of the curved sections at the cusps, with respect to a direction along the light emitting area of the light source across which the input facet extends, may be in a range from a first lower limit of 15° to a first upper limit of 60°. The first lower limit may be 35°. The first upper limit may be 50°. The input end may include an intermediate facet extending between the inclined input facets.

Advantageously curved sections with different cusp angles may be achieved with a single mold cutting tool, reducing cost and complexity while providing control of luminous intensity distributions.

Said intermediate facet may be each shaped as an array of curved sections having cusps therebetween, and the angles of the curved sections at the cusps, with respect to the lateral direction, are in a range from a second lower limit of 15° to a second upper limit of 34°. The second lower limit may be 20°. The second upper limit may be 30°. The curved sections may be concave with respect to the light guide. The curved sections may be convex with respect to the light guide. The waveguide may further comprise sides, extending between the input end and the reflective end and between the guiding surfaces, that are arranged to reflect light from the light sources.

The directional backlight may further comprise a control system arranged to control the light sources. The control system may be arranged, on selective operation of a first light source to direct light into an optical window, to simultaneously operate a second light source that directs light reflected by the reflective end and then by a side of the waveguide into an outer portion of the waveguide that fails to be illuminated by the first light source.

Advantageously illumination voids can be compensated and uniformity improved for off axis viewing in a wide angle mode of operation.

According to a fourth aspect of the present disclosure there may be provided a directional display device comprising: a directional backlight according to the third aspect; and a transmissive spatial light modulator arranged to receive the output light from the waveguide and to modulate it to display an image.

Advantageously a directional privacy display may be provided with high uniformity for on-axis and off-axis viewing positions, while low levels of stray light for off-axis viewing positions in a privacy mode of operation.

According to a fifth aspect of the present disclosure there may be provided a directional backlight for a transmissive spatial light modulator, comprising: a waveguide comprising an input end; and an array of light sources at different input positions in a lateral direction across the input end, the light sources being arranged to input light into the waveguide through the input end, the light sources having light emitting areas with respective lateral extents; the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources, wherein across a lateral extent of the input end aligned with the light emitting area of at least one of light sources, the input end is shaped in the lateral direction as an array of curved sections having cusps therebetween, the array of curved sections including asymmetric curved sections having different angles at the cusps on either side thereof, with respect to a direction along the aligned light emitting area of the light source, the higher of said different angles being in a range from a first lower limit of 35° to first upper limit of 90°, and the lower of said different angles being in a range from a second lower limit of 15° to a second upper limit of 34°.

Advantageously improved lateral uniformity can be achieved for a head on viewing position in comparison to a planar input end. Further, improved uniformity for off-axis viewing positions can be achieved by enhanced void filling. Further reduced streaking and increased uniformity can be achieved for stray light in off axis viewing of a display operating in privacy mode. Further a single radius diamond may be used to form the optical microstructure, reducing cost and complexity of a tooling step. Further, a linear lightbar can be used in cooperation with the waveguide input end in order to improve lightbar alignment tolerances and reduce cost.

The first lower limit may be 45°, or may be 60°. The first upper limit may be 85°. The second lower limit may be 20°. The second upper limit may be 30°. The asymmetric curved sections may be divided into first asymmetric curved sections wherein the higher of said different angles is on a first side of the asymmetric curved sections and second asymmetric curved sections wherein the higher of said different angles is on a second, opposite side of the asymmetric curved sections.

The first asymmetric curved sections and the second asymmetric curved sections may alternate with each other across the array of curved sections. The upper of said different angles and the lower of said different angles may be identical for each asymmetric curved section. The array of curved sections may include further curved sections, interspersed with the asymmetric curved sections, the angles of the further curved sections at the cusps with respect to the lateral direction may be in a range from the first lower limit to the first upper limit. The curved sections may be concave with respect to the light guide. The curved sections may be convex with respect to the light guide.

The light sources may have light emitting areas with respective lateral extents that are separated, and the input end may comprise plural reflection reduction regions arranged between the lateral extents of the light sources. The array of light sources may be at different input positions in a lateral direction across a central part of the input end, and the input end may comprise reflection reduction regions outside the central part of the input end.

The first guide surface may be arranged to guide light by total internal reflection and the second guide surface may comprise a plurality of light extraction features oriented to direct light reflected by the reflected end in directions allowing exit through the first guide surface as the output light and intermediate regions between the light extraction features that are arranged to guide light along the waveguide. The light extraction features and the intermediate regions may alternate with one another in a stepped shape. The light extraction features may have positive optical power in the lateral direction. Said at least one of light sources may be at an input position offset from the optical axis of the reflective end. The waveguide may further comprise sides, extending between the input end and the reflective end and between the guiding surfaces, that are arranged to reflect light from the light sources.

The directional backlight may further comprise a control system arranged to control the light sources. The control system may be arranged, on selective operation of a first light source to direct light into an optical window, to simultaneously operate a second light source that directs light reflected by the reflective end and then by a side of the waveguide into an outer portion of the waveguide that fails to be illuminated by the first light source.

Advantageously illumination voids can be compensated and uniformity improved for off axis viewing in a wide angle mode of operation.

According to a sixth aspect of the present disclosure there may be provided a directional display device comprising: a directional backlight according to the fifth aspect; and a transmissive spatial light modulator arranged to receive the output light from the waveguide and to modulate it to display an image.

Advantageously a directional privacy display may be provided with high uniformity for on-axis and off-axis viewing positions, while low levels of stray light for off-axis viewing positions in a privacy mode of operation.

According to a seventh aspect of the present disclosure there may be provided a directional backlight for a transmissive spatial light modulator, comprising: a waveguide comprising an input end; and an array of light sources at different input positions in a lateral direction across the input end, the light sources being arranged to input light into the waveguide through the input end, the light sources having light emitting areas with respective lateral extents that do not cover the entirety of the input end in the lateral direction, the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources, wherein the input end comprises at least one reflection reduction region in the lateral direction, outside the lateral extents of the light emitting areas of the light sources, within which the input end is shaped in the lateral direction as an array of curved sections having cusps therebetween, the angles of the curved sections at the cusps with respect to the lateral direction being in a range from a lower limit of 15° to an upper limit of 34°.

Advantageously the reflections from the input side in regions between light sources may be reduced so that privacy mode uniformity and luminance is reduced for off axis viewing positions when operated in privacy mode of operation.

The lower limit may be 20°. The upper limit may be 30°. The curved sections may be concave with respect to the light guide. The curved sections may be convex with respect to the light guide. The curved sections may be identical. The light sources may have light emitting areas with respective lateral extents that are separated, and the input end may comprise plural reflection reduction regions arranged between the lateral extents of the light sources. The array of light sources may be at different input positions in a lateral direction across a central part of the input end, and the input end comprises reflection reduction regions outside the central part of the input end.

The first guide surface may be arranged to guide light by total internal reflection and the second guide surface may comprise a plurality of light extraction features oriented to direct light reflected by the reflected end in directions allowing exit through the first guide surface as the output light and intermediate regions between the light extraction features that are arranged to guide light along the waveguide. The light extraction features and the intermediate regions may alternate with one another in a stepped shape. The light extraction features may have positive optical power in the lateral direction. Said at least one of light sources may be at an input position offset from the optical axis of the reflective end. The waveguide may further comprise sides, extending between the input end and the reflective end and between the guiding surfaces, that are arranged to reflect light from the light sources.

According to an eighth aspect of the present disclosure there may be provided a directional display device comprising: a directional backlight according the seventh aspect; and a transmissive spatial light modulator arranged to receive the output light from the waveguide and to modulate it to display an image.

According to a ninth aspect of the present disclosure there may be provided a directional backlight for a transmissive spatial light modulator, comprising: a waveguide comprising an input end; and an array of light sources at different input positions in a lateral direction across the input end, the light sources being arranged to input light into the waveguide through the input end, the light sources having light emitting areas with respective lateral extents, the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources, wherein across a lateral extent of the input end aligned with the light emitting area of at least one of light sources, the input end is shaped in the lateral direction as an array of curved sections having cusps therebetween, the angles of the curved sections at the cusps with respect to the lateral direction being in a range from a lower limit of 35° to an upper limit of 90°.

Advantageously lateral uniformity of a display apparatus may be improved in comparison to a planar input. Compensation for lateral efficiency profile of a Fresnel mirror may be provided, achieving desirable uniformity in a waveguide with reduced height in comparison to a domed mirror. Such microstructures may be provided by a tool such as a diamond with the same curvature as other microstructures arranged to provide off-axis uniformity.

The lower limit may be 45° and/or the upper limit may be 75°. The curved sections may be curved sections. The curved sections may be concave with respect to the light guide or may be convex with respect to the light guide.

The light sources may have light emitting areas with respective lateral extents that are separated. In that case, the input end may comprise at least one reflection reduction region arranged outside the lateral extents of the light emitting areas, within which the input end is shaped in the lateral direction as an array of curved sections having cusps therebetween, the angles of the curved sections at the cusps with respect to the lateral direction being in a range from a lower limit of 15° to an upper limit of 34°.

The first guide surface may be arranged to guide light by total internal reflection and the second guide surface may comprise a plurality of light extraction features oriented to direct light reflected by the reflected end in directions allowing exit through the first guide surface as the output light and intermediate regions between the light extraction features that are arranged to guide light along the waveguide. The light extraction features and the intermediate regions may alternate with one another in a stepped shape. The light extraction features may have positive optical power in the lateral direction.

The directional backlight may further comprise a control system arranged to control the light sources. The control system may be arranged, on selective operation of a first light source to direct light into an optical window, to simultaneously operate a second light source that directs light reflected by the reflective end and then by a side of the waveguide into an outer portion of the waveguide that fails to be illuminated by the first light source.

According to a tenth aspect of the present disclosure there may be provided a directional display device comprising: a directional backlight according the ninth aspect; and a transmissive spatial light modulator arranged to receive the output light from the waveguide and to modulate it to display an image.

Advantageously a directional privacy display may be provided with low levels of stray light for off-axis viewing positions in a privacy mode of operation.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

Herein, there is disclosed the possibility that the input end of a waveguide the input end is shaped in the lateral direction as an array of curved sections which may have cusps therebetween. Where such curved sections are provided, they may have any or all of the following properties.

The curved sections permit light to be transmitted therethrough while controlling the light reflected therefrom from inside the waveguide. In general, the curved sections may have a variety of shapes, but may be conic sections. Conic sections provide the advantage of ease of manufacture. The curved sections may be curved in the lateral direction without an inflection. The curved sections may be smoothly curved, that is with no discontinuity in gradient.

The curved sections may be concave with respect to the waveguide or may be convex with respect to the waveguide.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 19A and FIG. 19B are schematic diagrams illustrating in front view, a detail of illumination of planar side mirrors for illumination of void A, in accordance with the present disclosure;

FIG. 20A and FIG. 20B are schematic diagrams illustrating in front view, details of illumination of faceted side mirrors for illumination of void A, in accordance with the present disclosure;

DETAILED DESCRIPTION

Figure 1A:
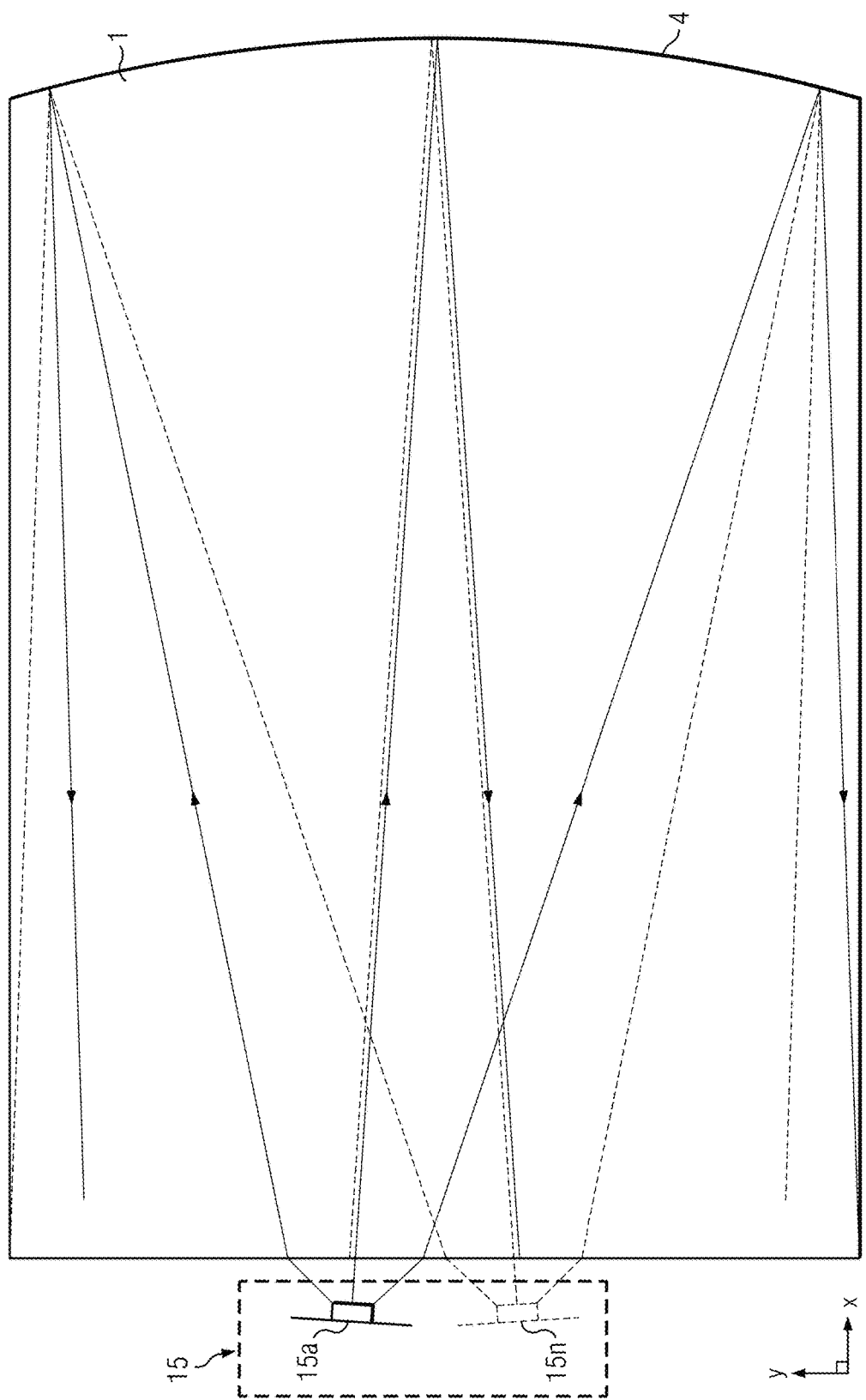
FIG. 1A is a schematic diagram illustrating a front view of light propagation in one embodiment of a directional display device, in accordance with the present disclosure.

The various features of the waveguides and display devices described herein may be combined in any combination. Although different reference numerals are used for clarity, the description of common elements applies to all embodiments where the common elements are present.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 (U.S. Patent Publ. No. 2012/0127573), which is herein incorporated by reference in its entirety, advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (Dec. 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293 (U.S. Patent Publ. No. 2012/0127573), which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight," by ReaID, for example U.S. patent application Ser. No. 13/300,293 (U.S. Patent Publ. No. 2012/0127573), which may be referred to herein as an "optical valve" or "optical valve directional backlight," all of which are herein incorporated by reference in their entireties.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
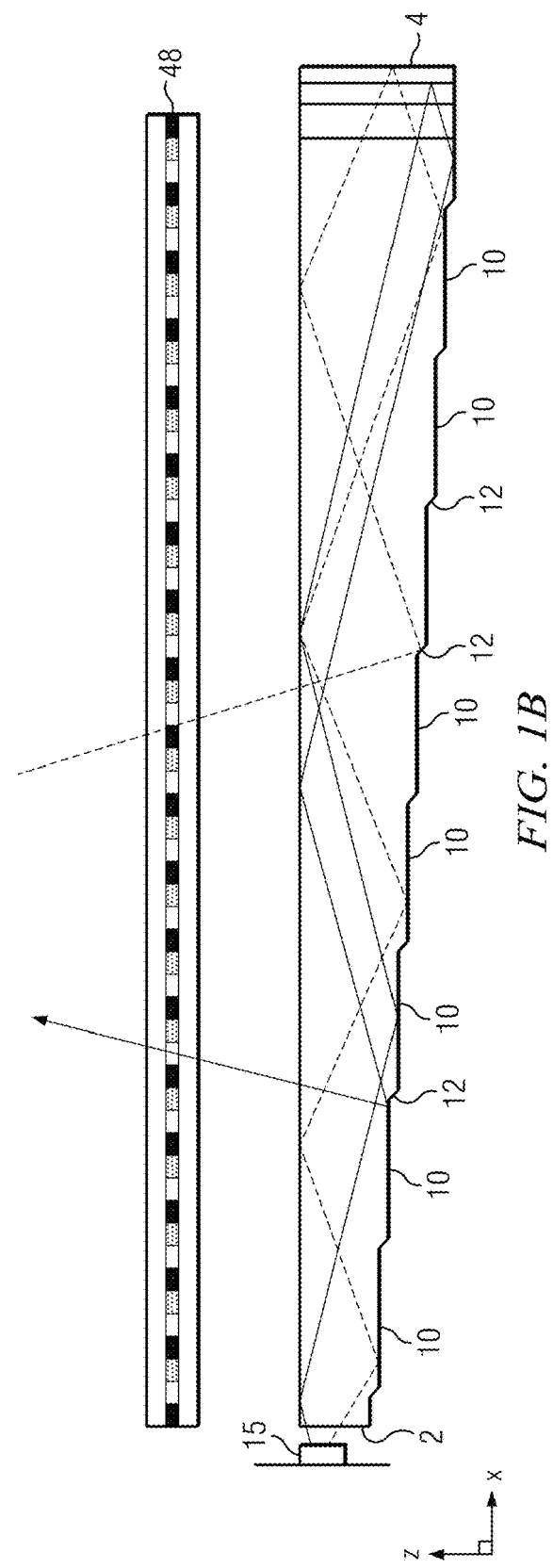
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end end 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
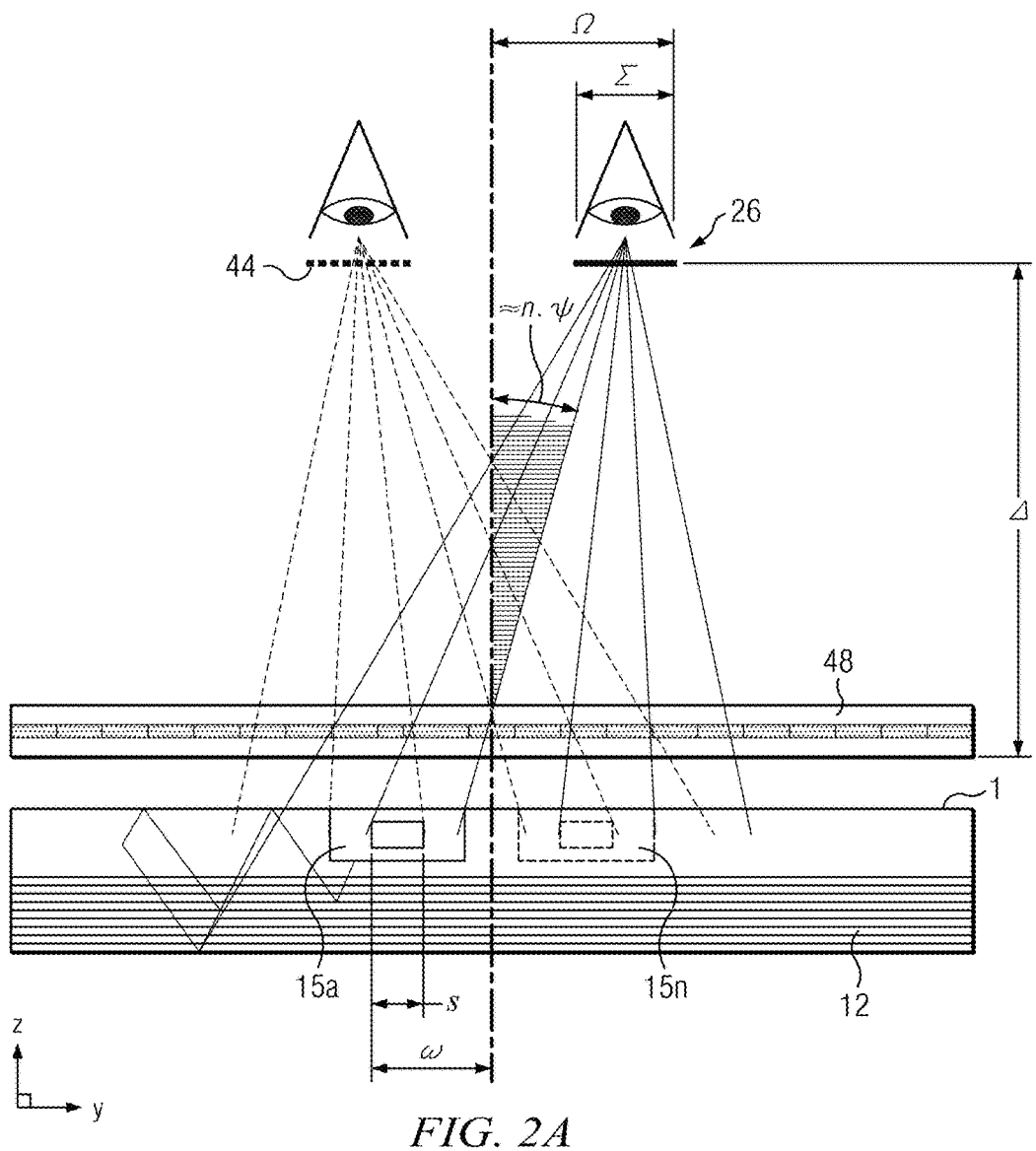
FIG. 2A is a schematic diagram illustrating in a top view of light propagation in another embodiment of a directional display device, in accordance with the present disclosure.
Figure 2B:
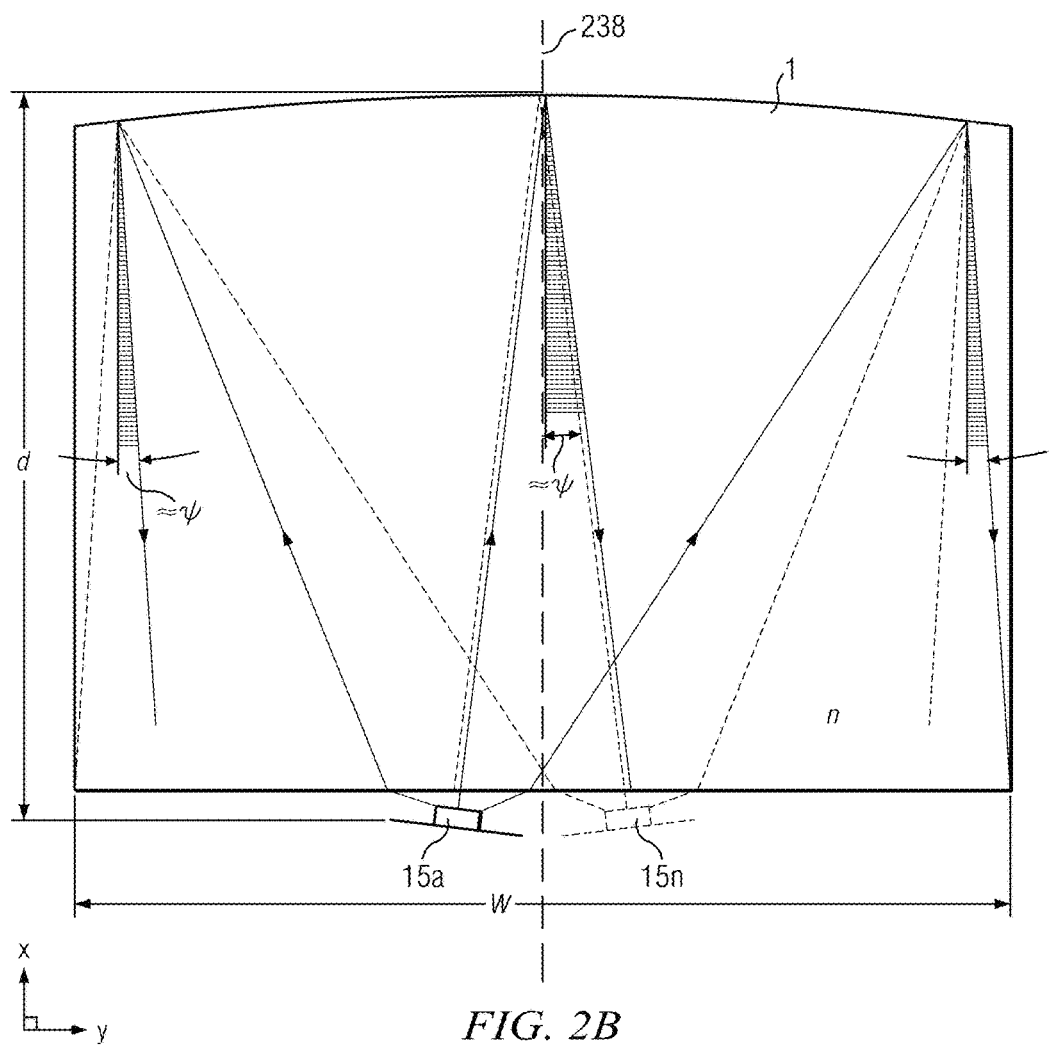
FIG. 2B is a schematic diagram illustrating light propagation in a front view of the directional display device of FIG. 2A, in accordance with the present disclosure.
Figure 2C:
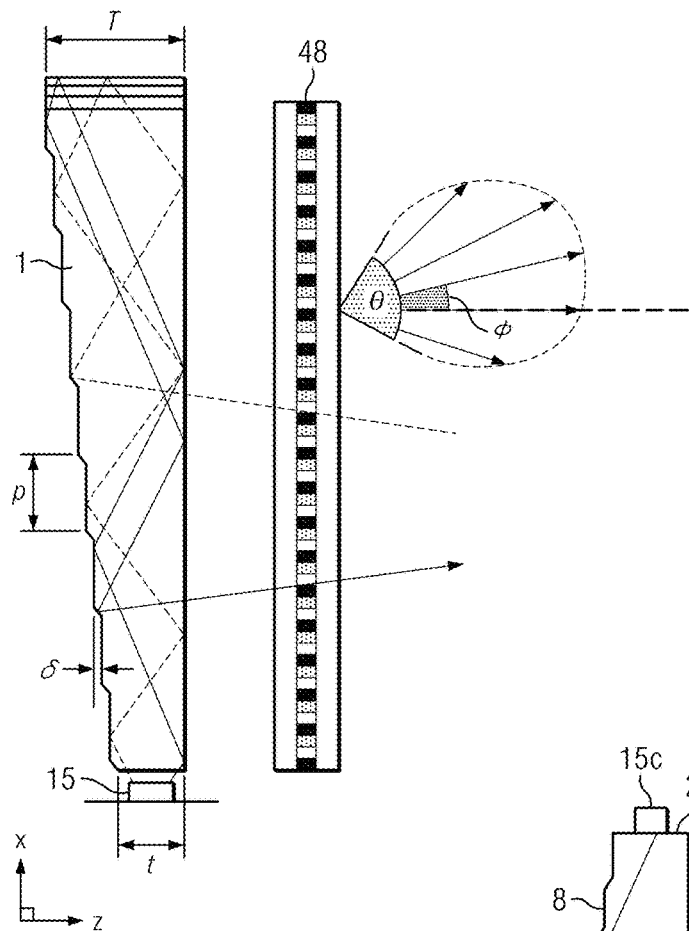
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
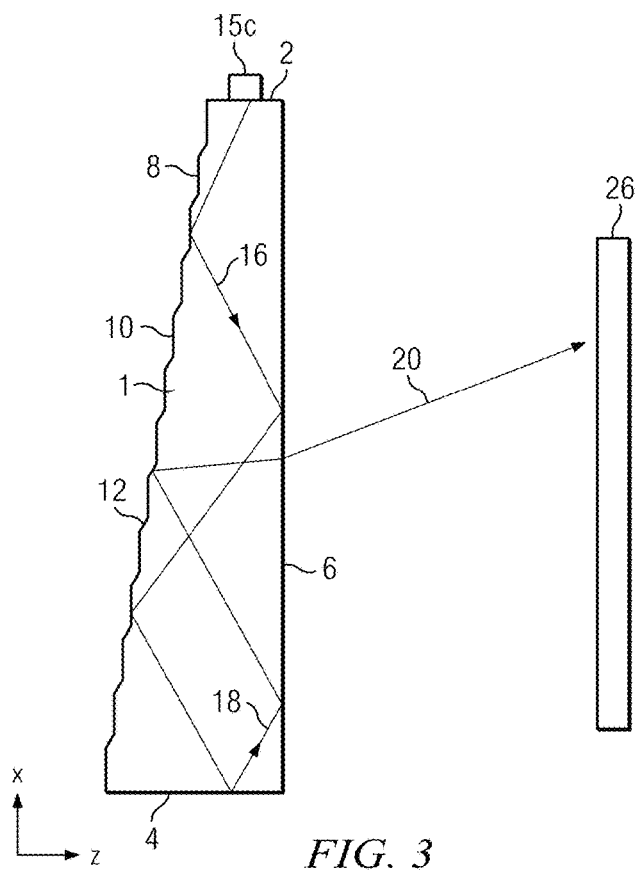
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input end 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the spatial light modulator 48 that intersect with a plane at the nominal viewing distance.

Figure 4A:
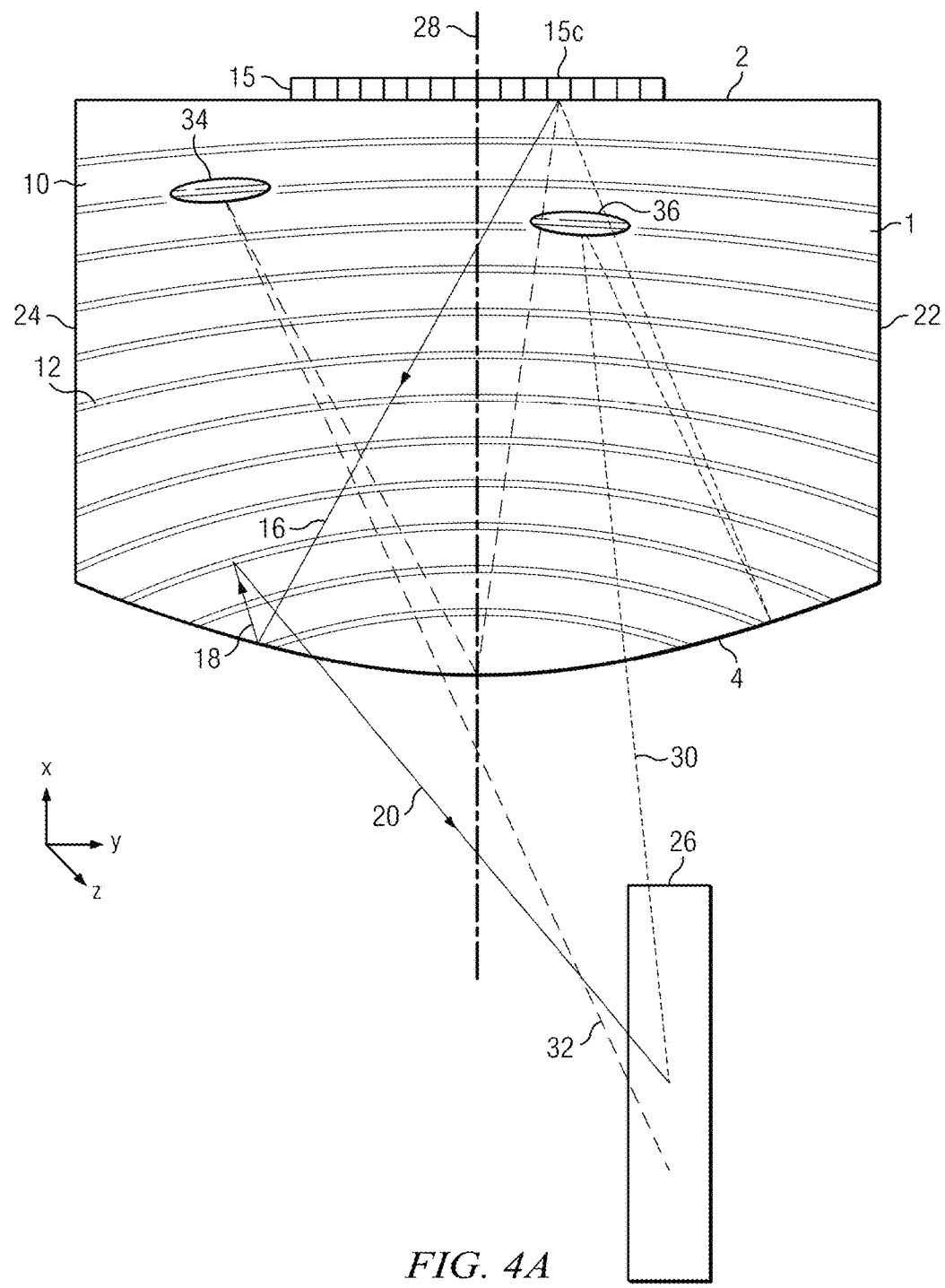
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
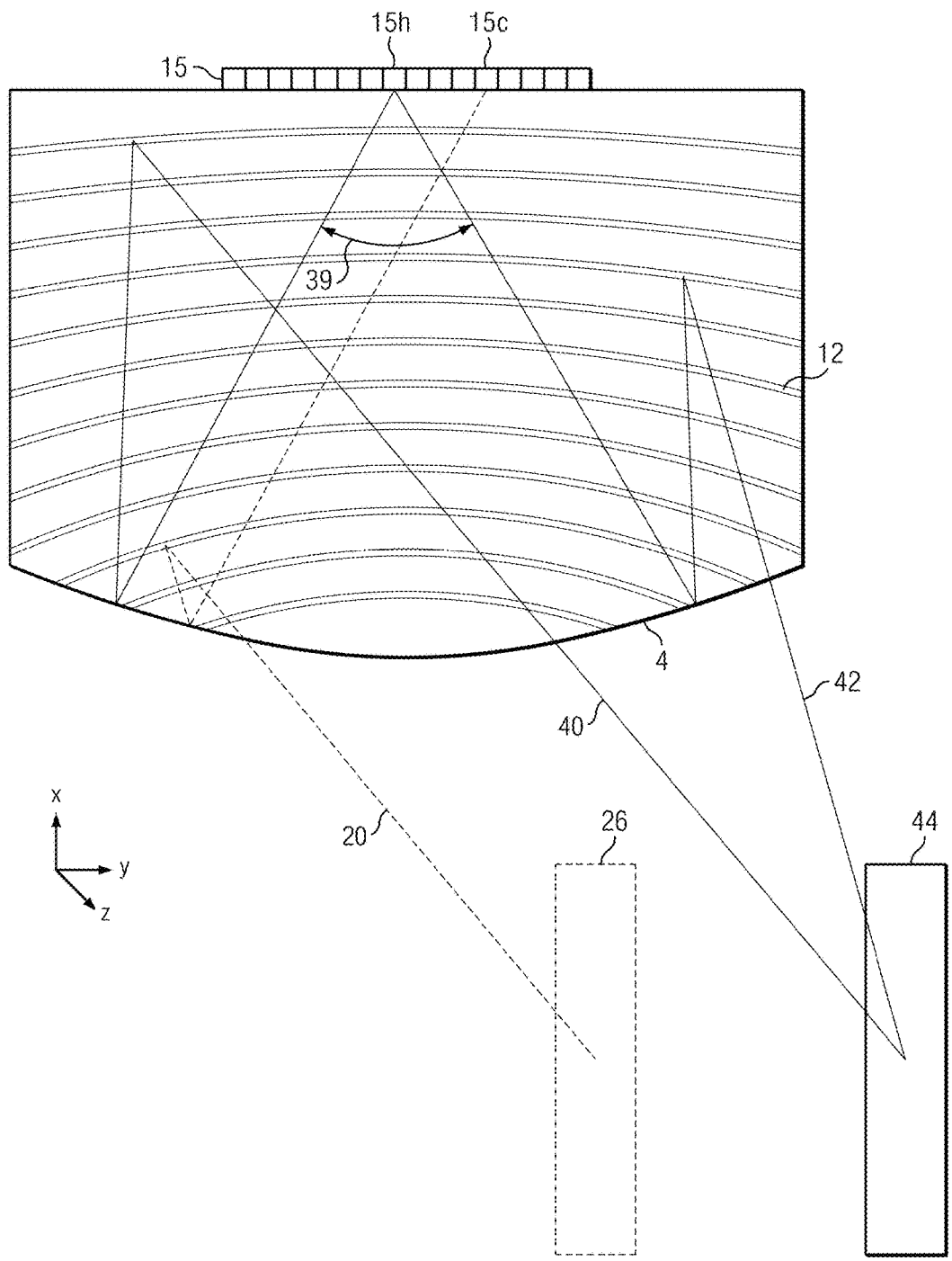
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15*h*.

Advantageously, the arrangement illustrated in FIG. 4B may provide a real image of the illuminator element 15*c* at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15*c* to lateral positions in viewing window 26. Improved aberrations may achieve an extended viewing freedom for an autostereoscopic display while achieving low cross talk levels.

Figure 5:
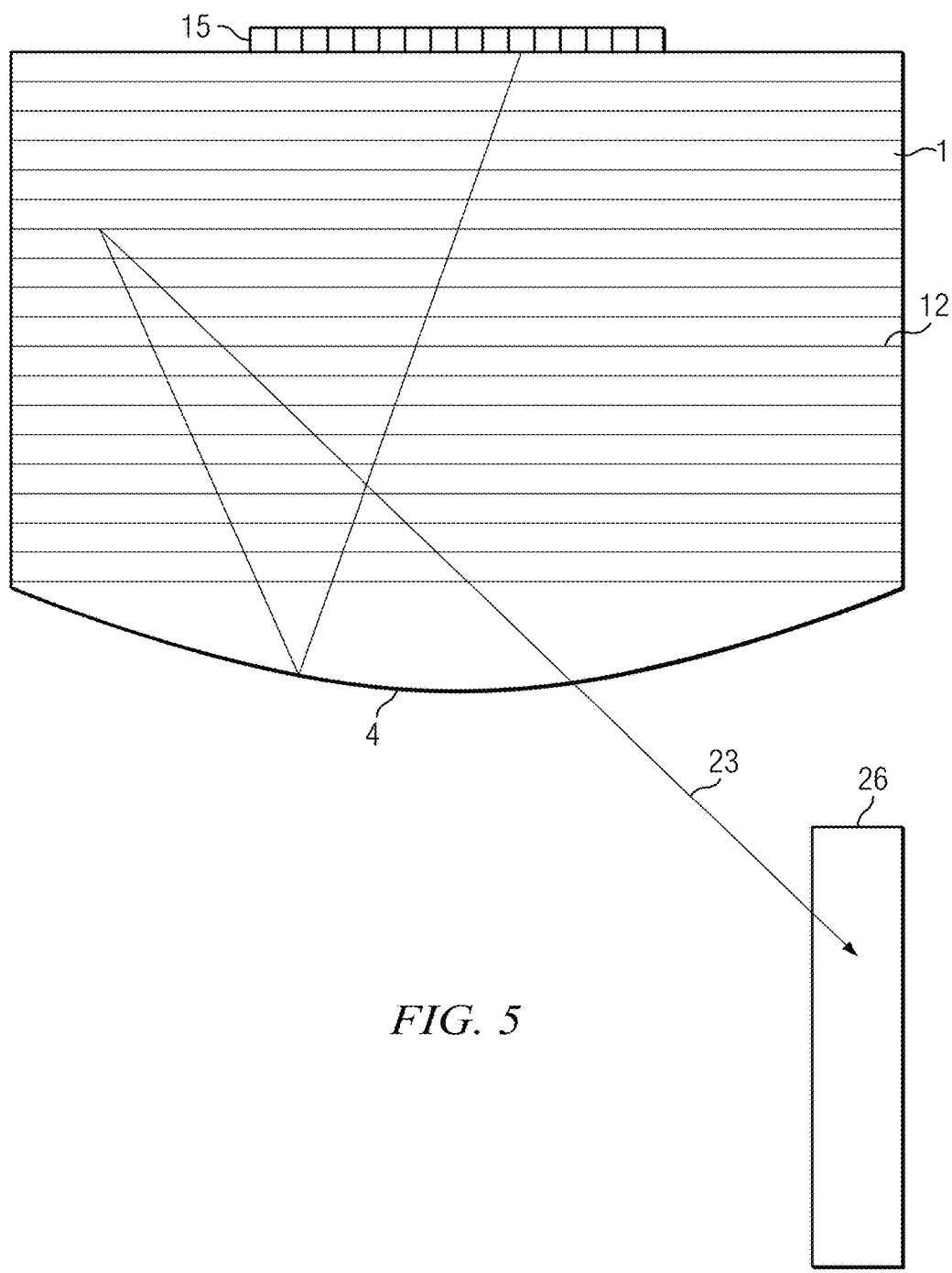
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
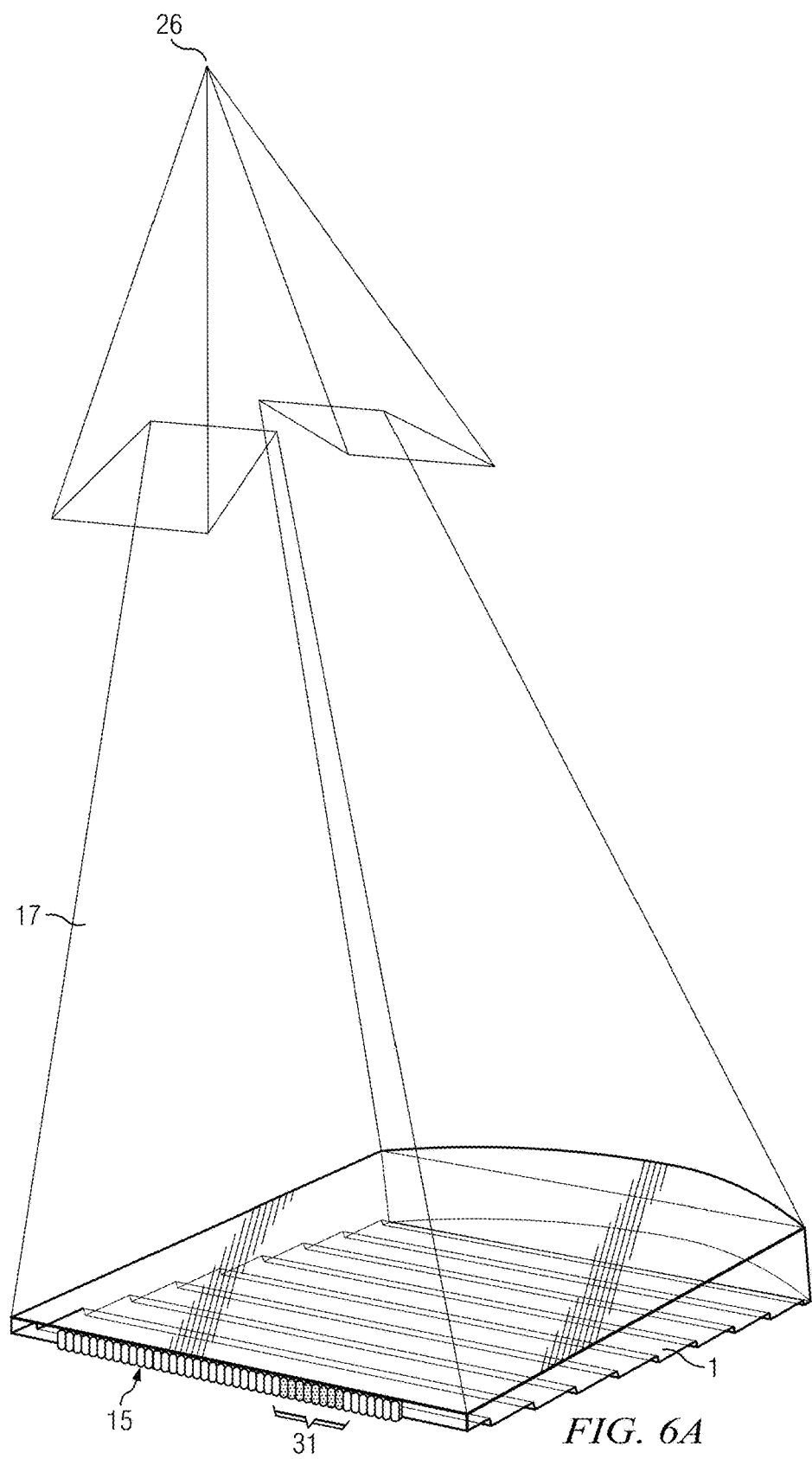
FIG. 6A is a schematic diagram illustrating one embodiment of the generation of a first viewing window in a time multiplexed directional display device in a first time slot, in accordance with the present disclosure.
Figure 6B:
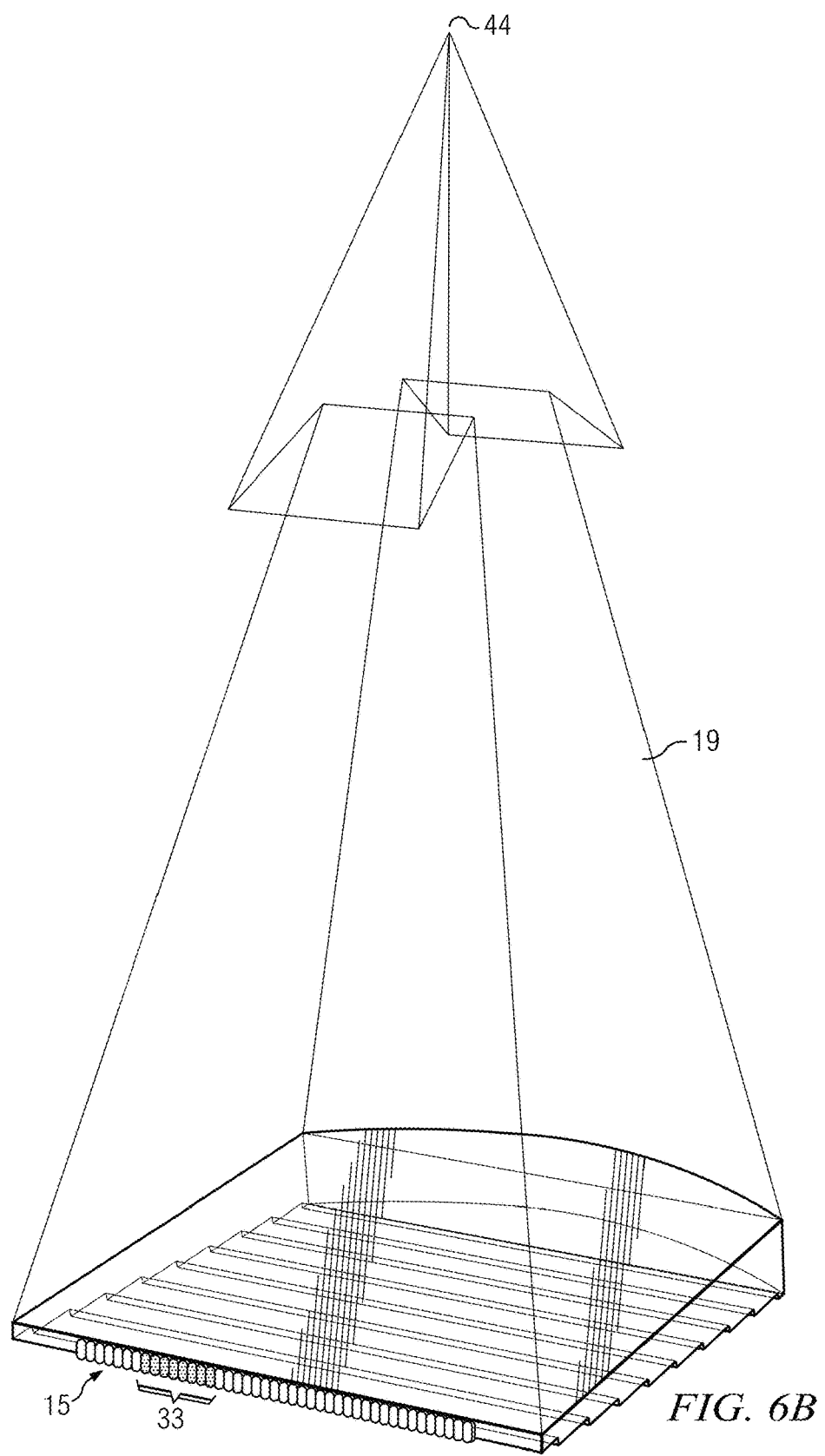
FIG. 6B is a schematic diagram illustrating another embodiment of the generation of a second viewing window in a time multiplexed directional display device in a second time slot, in accordance with the present disclosure.
Figure 6C:
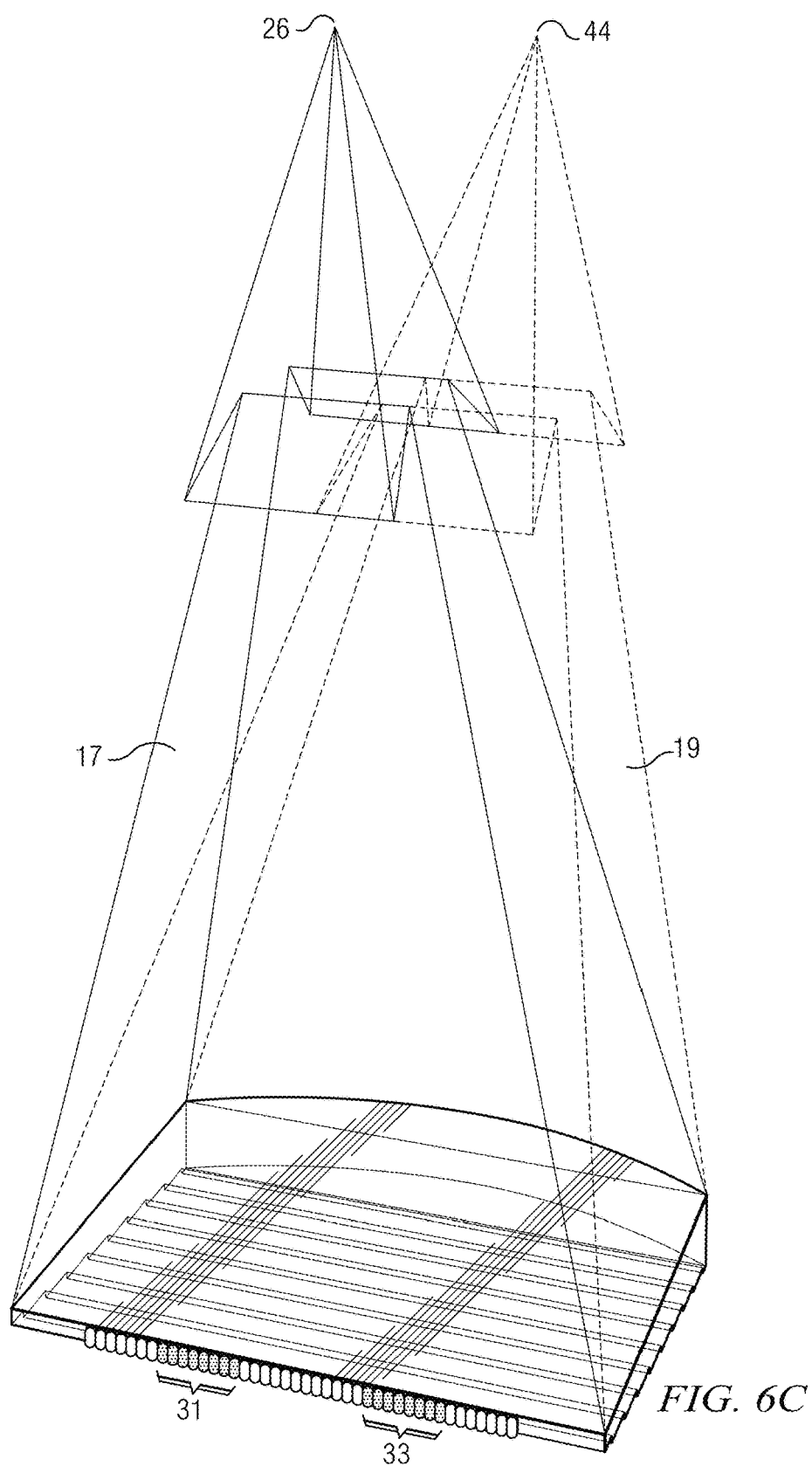
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15*a* to 15*n*, where n is an integer greater than one.

Figure 7:
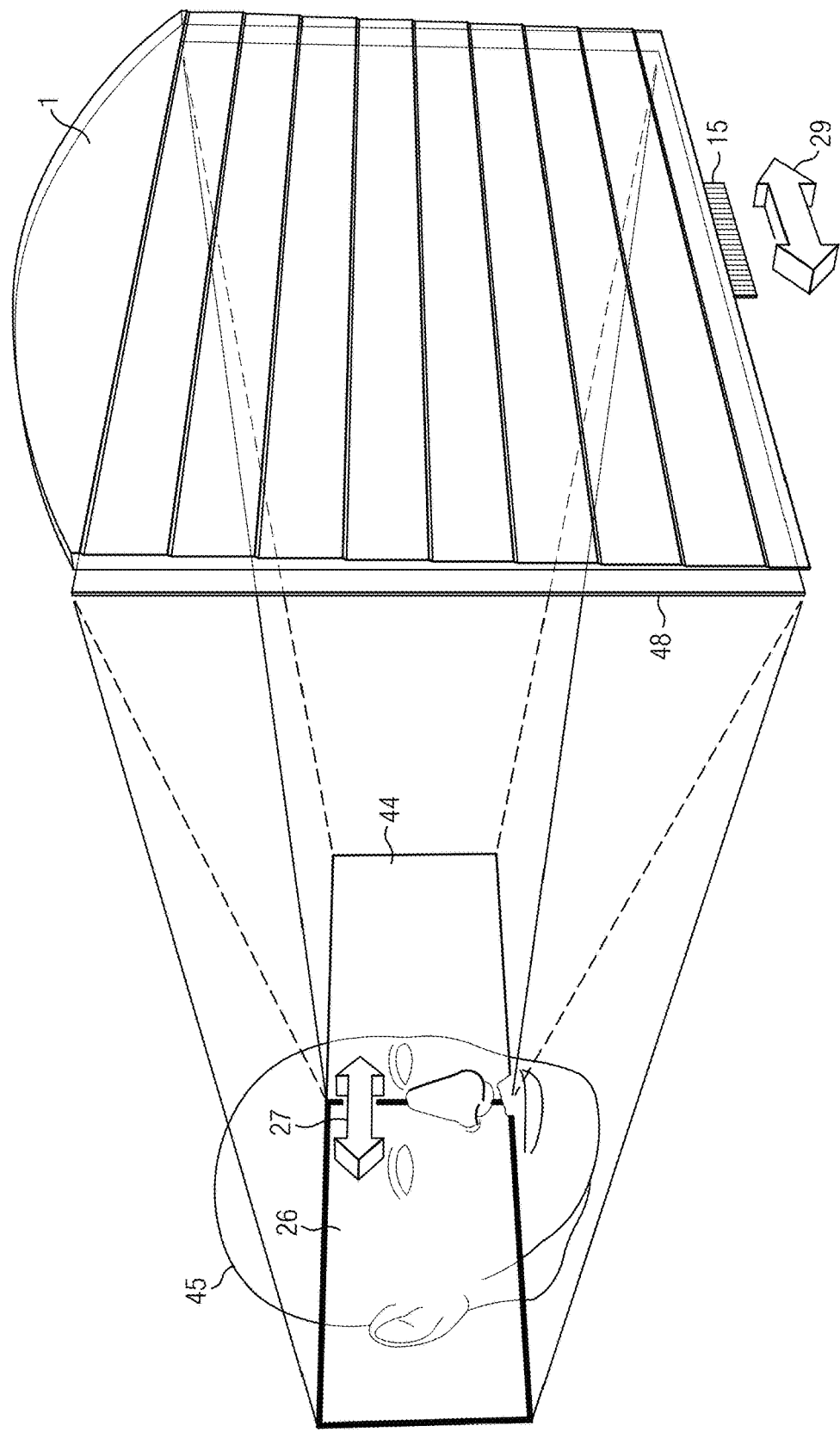
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15*a* to 15*n* along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights described herein.

Figure 8:
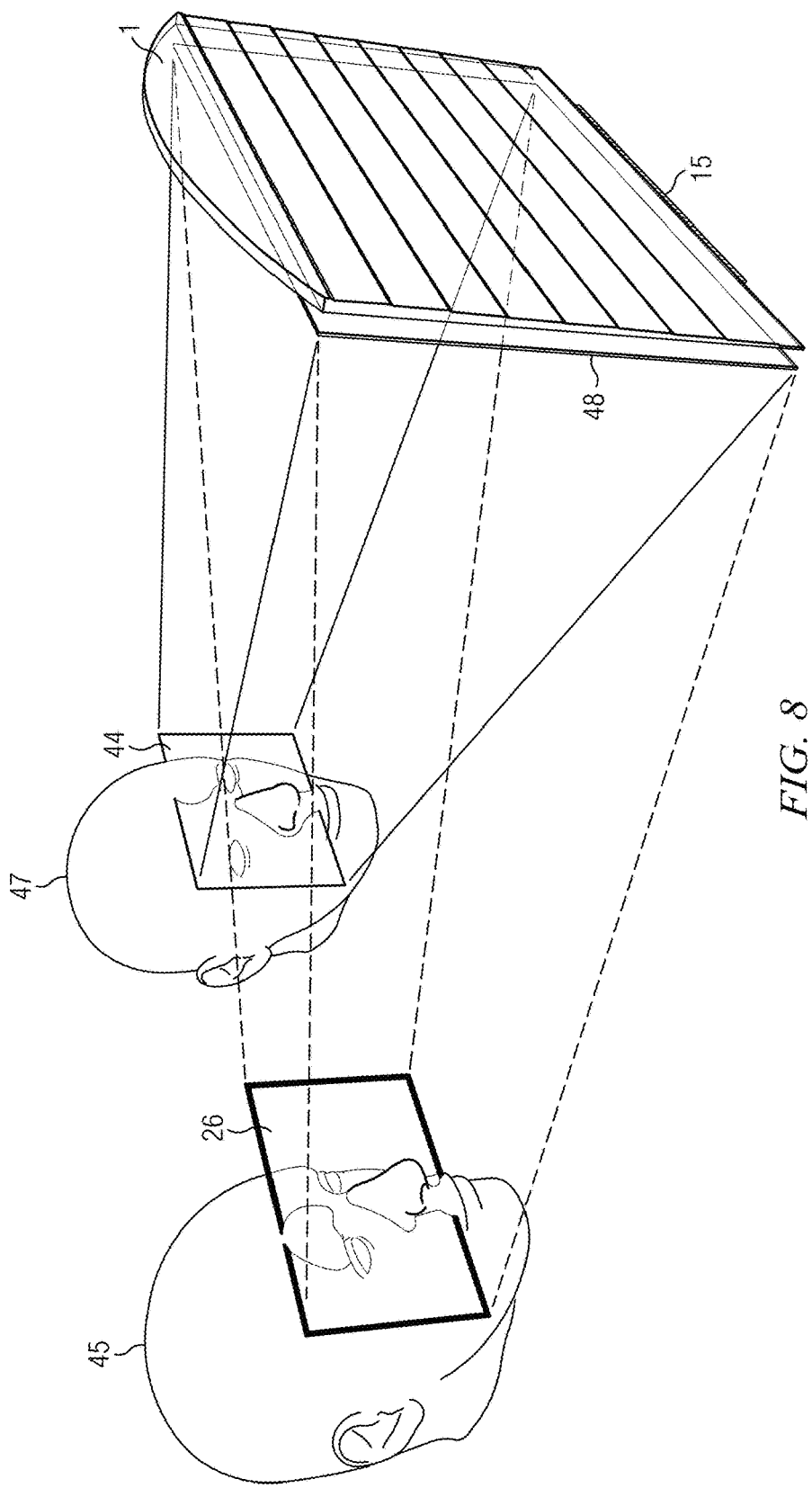
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
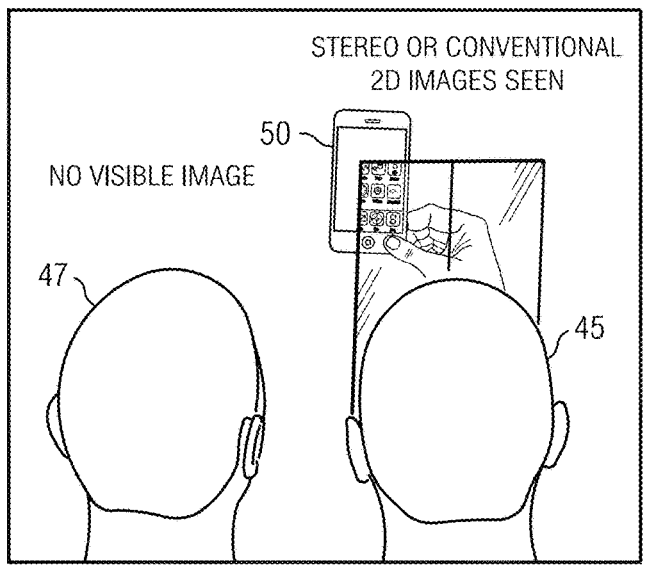
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
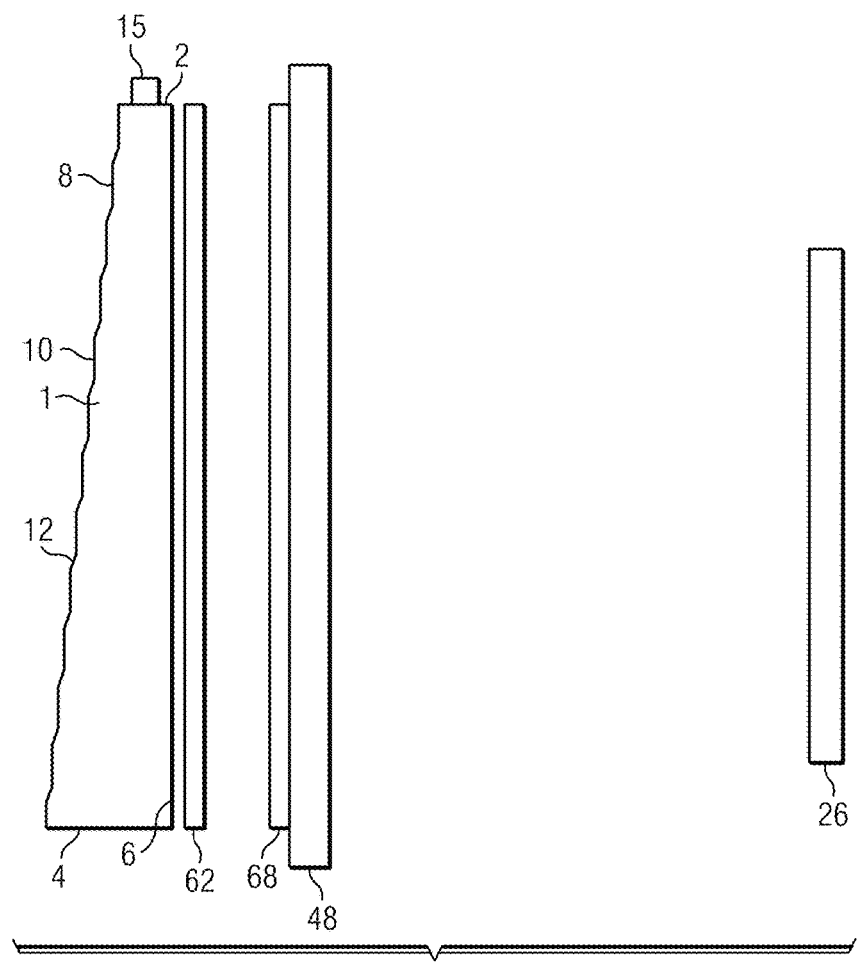
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11:
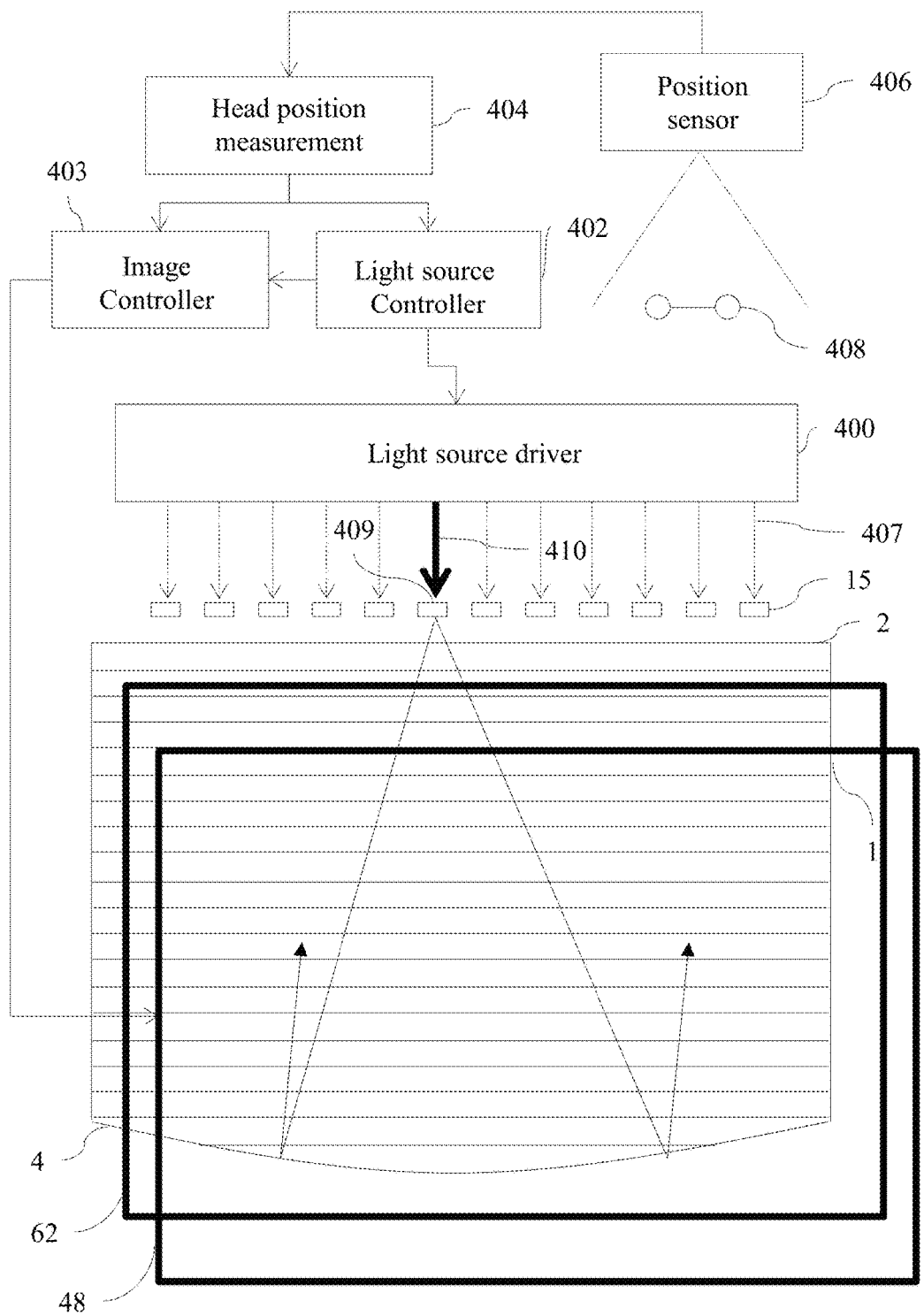
FIG. 11 is a schematic diagram illustrating a directional display apparatus comprising a directional display device and a control system, in accordance with the present disclosure.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronisation with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Figure 12:
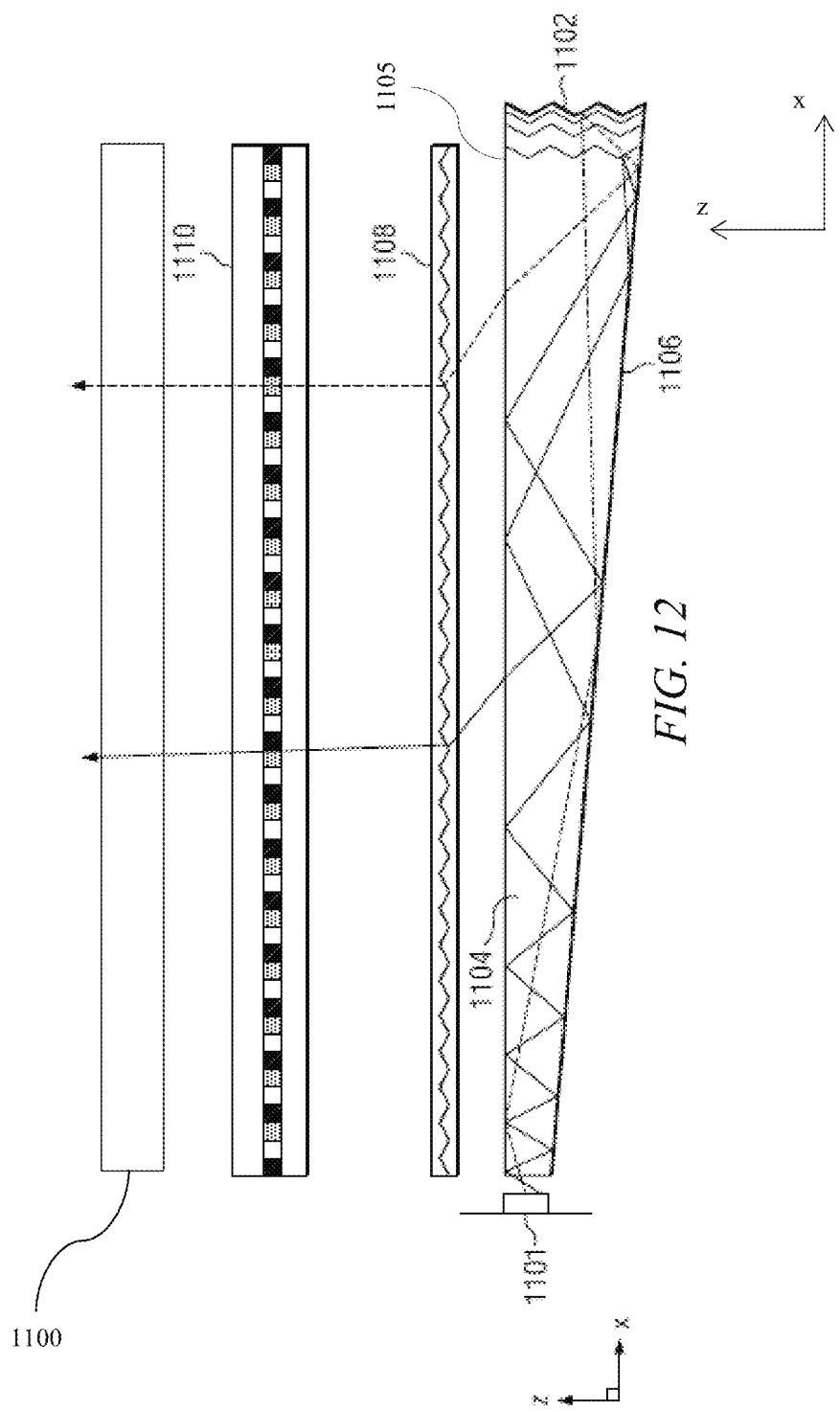
FIG. 12 is a schematic diagram illustrating in side view, the structure of a directional display device comprising a wedge waveguide, in accordance with the present disclosure.

FIG. 12 is a schematic diagram illustrating in side view, the structure of a directional display device comprising a wedge directional backlight comprising a wedge waveguide 1104 with faceted mirror end 1102. The first guide surface 1105 of the waveguide 1104 is arranged to guide light by total internal reflection and the second guide surface 1106 is substantially planar and inclined at an angle to direct light in directions that break the total internal reflection for outputting light through the first guide surface 1105. The display device further comprises a deflection element 1108 extending across the first guide surface 1105 of the waveguide 1104 for deflecting light from array 1101 of light sources towards the normal to the first guide surface 1105. Further the waveguide 1104 may further comprise a reflective end 1102 for reflecting input light back through the waveguide 1104, the second guide 1106 surface being arranged to deflect light as output light through the first guide surface 1105 after reflection from the reflective end 1102. The reflective end has positive optical power in the lateral direction (y-axis) in a similar manner to the reflective end shown in FIG. 5 for example. Further facets in the reflective end 1102 deflect the reflected light cones within the waveguide 1104 to achieve output coupling on the return path. Thus viewing windows are produced in a similar manner to that shown in FIG. 11. Further the directional display may comprise a spatial light modulator 1110 and parallax element 1100 aligned to the spatial light modulator 1110 that is further arranged to provide optical windows. A control system 72 similar to that shown in FIG. 11 may be arranged to provide control of directional illumination providing viewing windows 26 and windows 109 from the parallax element and aligned spatial light modulator.

Thus a first guide surface may be arranged to guide light by total internal reflection and the second guide surface may be substantially planar and inclined at an angle to direct light in directions that break that total internal reflection for outputting light through the first guide surface, and the display device may further comprise a deflection element extending across the first guide surface of the waveguide for deflecting light towards the normal to the first guide surface.

Figure 13:
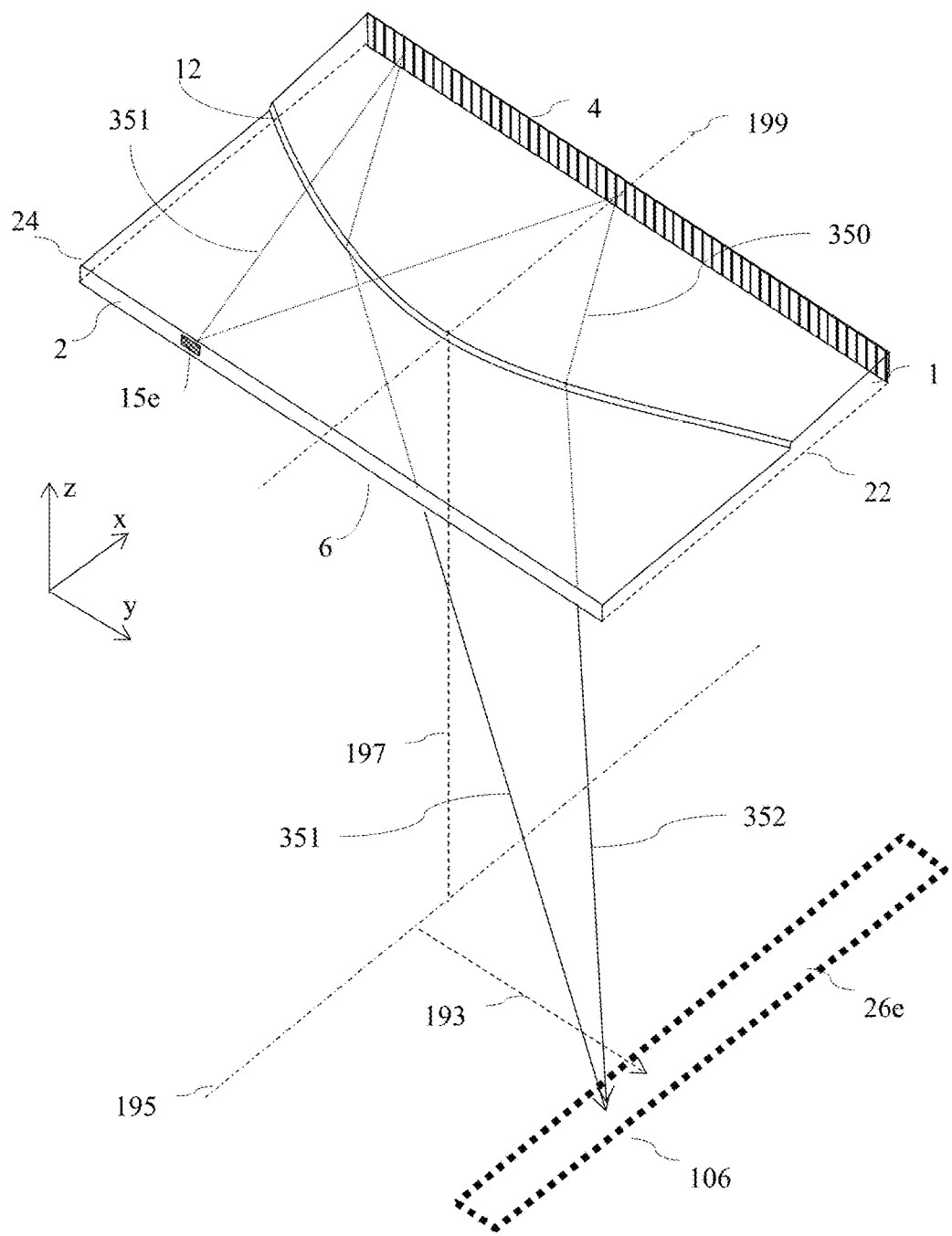
FIG. 13 is a schematic diagram illustrating in perspective view, illumination of a directional waveguide and formation of an off-axis optical window, in accordance with the present disclosure.

FIG. 13 is a schematic diagram illustrating in perspective view, illumination of a directional waveguide 1 and formation of an off-axis optical window 26. Thus light ray 350 provided by input light source 15*e* is directed to reflective end 4, and directed within the waveguide to extraction feature 12 by means of total internal reflection within the waveguide 1. After reflection ray 352 is directed in the z-direction to optical window 26*e* that is offset by from axis 197 by distance 193 from centerline 195 in the window plane 106. Further rays 351 are directed to optical window 26*e* from light source 15*e*, thus optical window 26*e* is an image in the lateral direction (y-axis) of the light source 15*e*.

Thus at least one of light sources of the array 15*a-n* is at an input position offset from the optical axis 199 of the reflective end 4.

Figure 14:
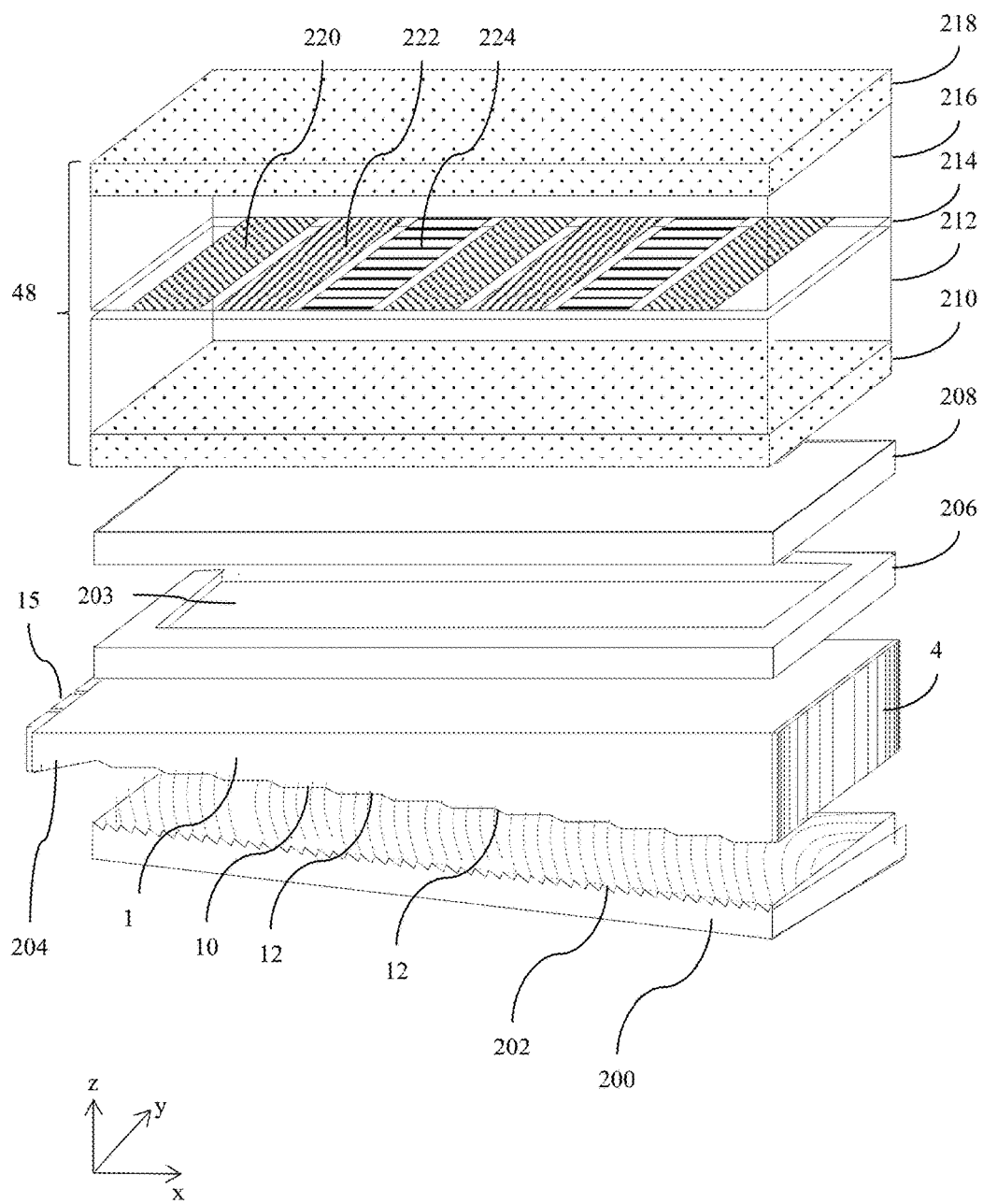
FIG. 14 is a schematic diagram illustrating in perspective view, an arrangement of display apparatus comprising a directional waveguide and rear reflector, in accordance with the present disclosure.

FIG. 14 is a schematic diagram illustrating in perspective view, an arrangement of display apparatus comprising a directional waveguide 1, rear reflector 200 and spatial light modulator 48.

Reflective end 4 may be provided by a Fresnel mirror. Taper region 204 may be arranged at the input to the waveguide 1 to modify the input cone angle from the light sources 15*a*-15*n* of the array of illuminator elements 15 and to increase illumination uniformity. Shading layer 206 with aperture 203 may be arranged to hide light scattering regions at the edge of the waveguide 1. Rear reflector 200 may comprise facets 202 that are curved and arranged to provide viewing windows 26 from groups of optical windows provided by imaging light sources of the array 15 to the window plane 106. Optical stack 208 may comprise reflective polarizers, retarder layers and diffusers. Rear reflectors 200 and optical stack 2208 are described further in U.S. patent application Ser. No. 14/186,862, filed Feb. 21, 2014, entitled "Directional backlight" (U.S. Patent Publ. No. 2014/0240828; incorporated herein by reference in its entirety.

Spatial light modulator 48 may comprise a liquid crystal display that may comprise an input polarizer 210, TFT glass substrate 212, liquid crystal layer 214, color filter glass substrate 216 and output polarizer 218. Red pixels 220, green pixels 222 and blue pixels 224 may be arranged in an array at the liquid crystal layer 214. White, yellow, additional green or other color pixels (not shown) may be further arranged in the liquid crystal layer to increase transmission efficiency, color gamut or perceived image resolution.

Thus a directional display device may comprise a directional backlight comprising at least waveguide 1, rear reflector 200 and light source array 15; and a transmissive spatial light modulator 48 arranged to receive the output light from the waveguide 1 and to modulate it to display an image.

It would be desirable to provide a directional display with high uniformity from a wide range of viewing positions. It would be further desirable to provide low stray light for off axis viewing in a Privacy mode of operation.

Figure 15A:
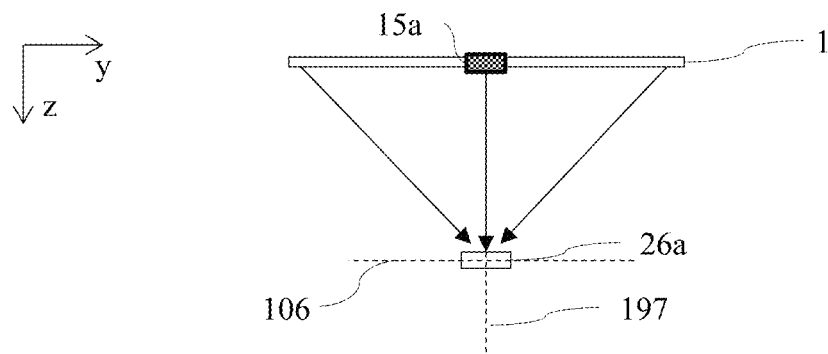
FIG. 15A is a schematic diagram illustrating in top view, an on-axis viewing position for a directional waveguide, in accordance with the present disclosure.

FIG. 15A is a schematic diagram illustrating in top view, an on-axis viewing position in optical window 26*a* for a directional waveguide 1. Optical window 26*a* is an image of light source 15*a* and arranged on axis 197 in window plane 106.

Figure 15B:
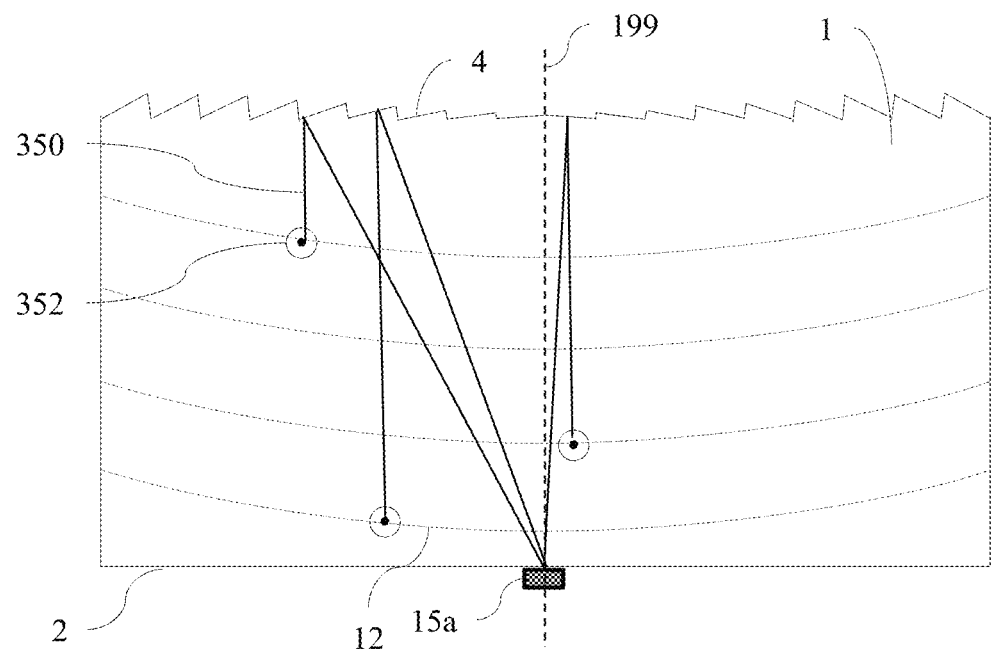
FIG. 15B is a schematic diagram illustrating in front view, light rays in a directional waveguide for the viewing direction of FIG. 15A, in accordance with the present disclosure.

FIG. 15B is a schematic diagram illustrating in front view, light rays in a directional waveguide for the viewing direction of FIG. 15A. Light rays 350, 352 are directed to optical window 26*a* from across the width of the waveguide 1. The light extraction features 12 may be curved have positive optical power in the lateral direction.

It would be desirable to provide light input to the waveguide to optimize lateral display uniformity.

Figure 16A:
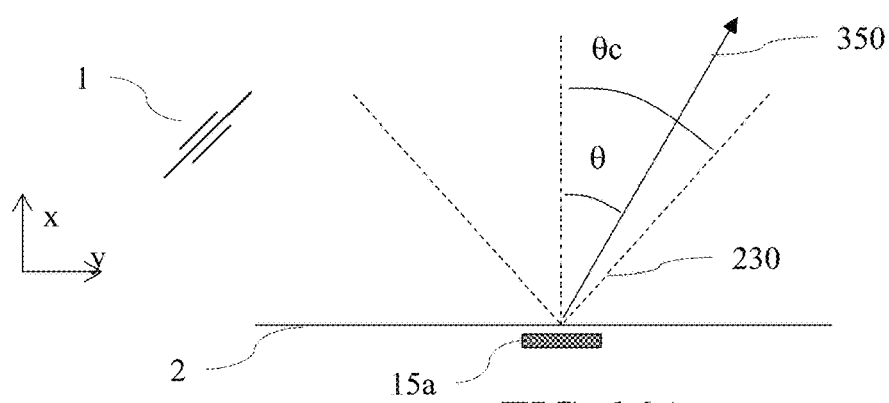
FIG. 16A is a schematic diagram illustrating in top view, a light source illuminating the input of a directional waveguide comprising a planar input side, in accordance with the present disclosure.

FIG. 16A is a schematic diagram illustrating in top view, a light source 15*a* illuminating the input of a directional waveguide 1 comprising a planar input side. Light rays 350 are provided within a light cone 230 determined by the critical angle θc within the material of the waveguide 1.

Figure 16B:
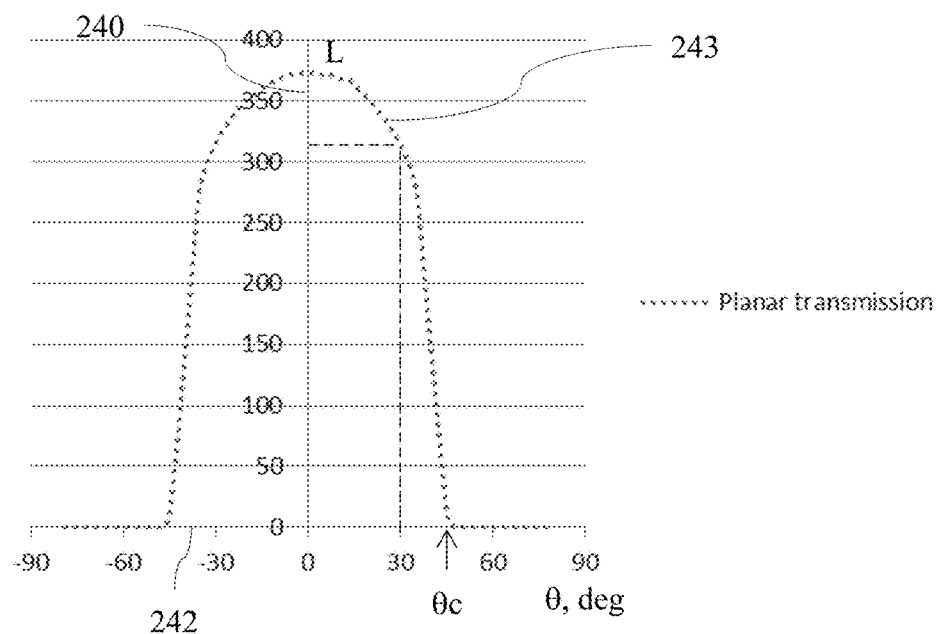
FIG. 16B is a schematic graph illustrating the angular variation of transmitted luminous intensity L against input direction θ in the waveguide in the arrangement of FIG. 16A, in accordance with the present disclosure.

FIG. 16B is a schematic graph illustrating the angular profile 243 of transmitted luminous intensity L, 240 against input direction θ, 242 in the waveguide 1 in the arrangement of FIG. 16A, for a Lambertian output in air of the light source 15*a*. Thus the luminous intensity rolls off with angle.

Figure 16C:
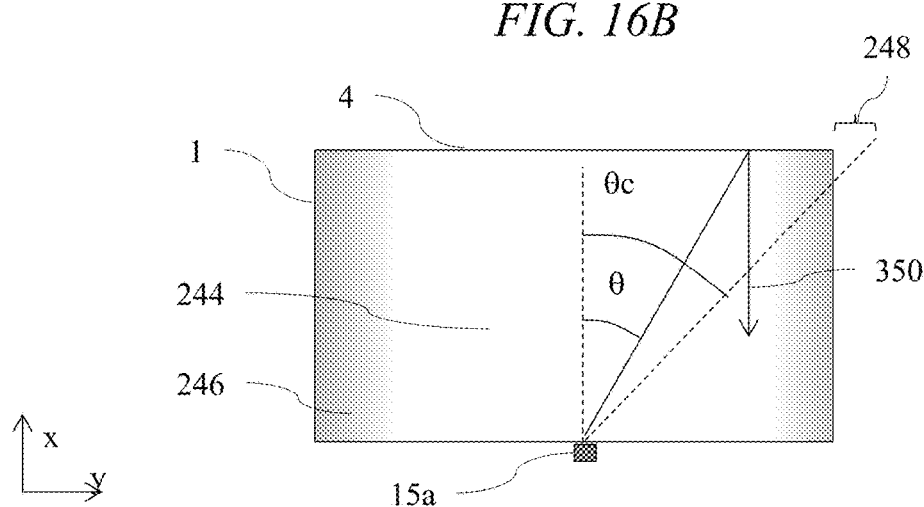
FIG. 16C is a schematic diagram illustrating in front view, the appearance of uniformity in a directional waveguide illuminated by the arrangement of FIG. 16A, in accordance with the present disclosure.

FIG. 16C is a schematic diagram illustrating in front view, the appearance of uniformity in a directional waveguide illuminated by the arrangement of FIG. 16A. The luminous intensity rolls off as cos θ, thus for a perfect spherical reflector at end 4, substantially uniform lateral uniformity may be achieved (that is the variation of luminance with lateral position (y-axis direction)). In practice, the reflective end 4 usually comprises a Fresnel mirror as shown for example in FIG. 17B. As described in U.S. patent application Ser. No. 15/097,750, entitled "Wide angle imaging directional backlights" filed Apr. 13, 2016, which is herein incorporated by reference in its entirety, Fresnel reflectors have a reflectivity that reduces in the lateral direction due to shading from the facets of the reflector. Thus the lateral uniformity appearance appears to have a luminance roll-off in the lateral direction as shown in FIG. 16C. The centre region 244 of the image may have higher luminance than the edge region 246. However, a planar input surface 2 efficiently fills the lateral width of the reflector for a 16:9 aspect ratio waveguide 1, with only small overfill 248.

It would be desirable to reduce the difference in luminance between regions 244 and 246.

Figure 17A:
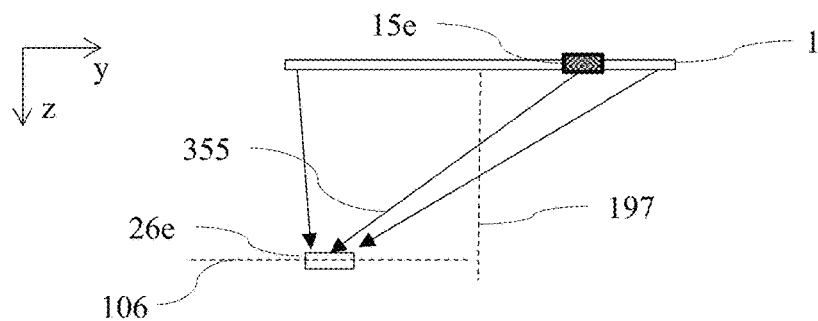
FIG. 17A is a schematic diagram illustrating in top view, an off-axis viewing position for a directional waveguide, in accordance with the present disclosure.

FIG. 17A is a schematic diagram illustrating in top view, an off-axis viewing position in optical window 26*e* provided as an image of light source 15*e*, for a directional waveguide 1. Thus window 26*e* is an off-axis optical window.

Figure 17B:
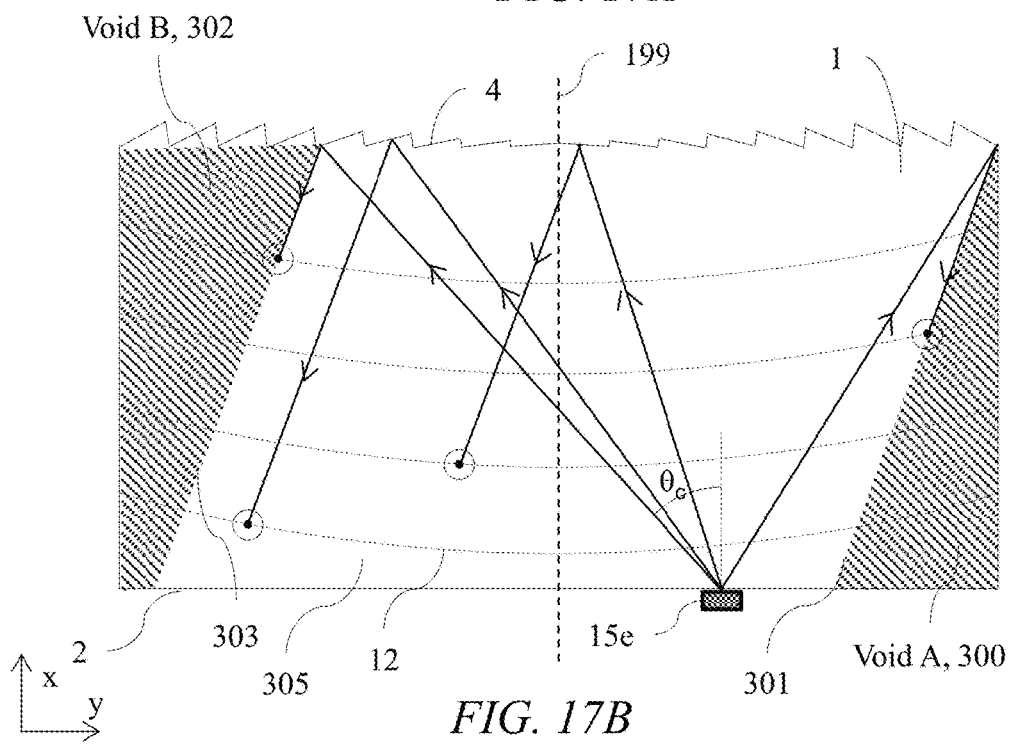
FIG. 17B is a schematic diagram illustrating in front view, illumination of a directional waveguide for illumination of an off-axis viewing position comprising a planar input side, in accordance with the present disclosure.

FIG. 17B is a schematic diagram illustrating in front view, illumination of a directional waveguide for illumination of an off-axis viewing position comprising a planar input side. The origin of illumination void non-uniformities in a directional waveguide 1 are illustrated.

Void A, 300 is provided by light that is outside a cone angle subtended by the light source 15*e* and adjacent edge of the Fresnel reflector at reflective end 4. Boundary 301 separates void A from the main illumination region 305. Void B, 302 is provided by light rays that are outside the critical angle θc of the light entering the waveguide for a light source in air. Boundary 303 separates void B from the main illumination region. Both voids create or contribute to undesirable non-uniformities for off-axis viewing positions such as from optical window 26*e*.

Figure 17C:
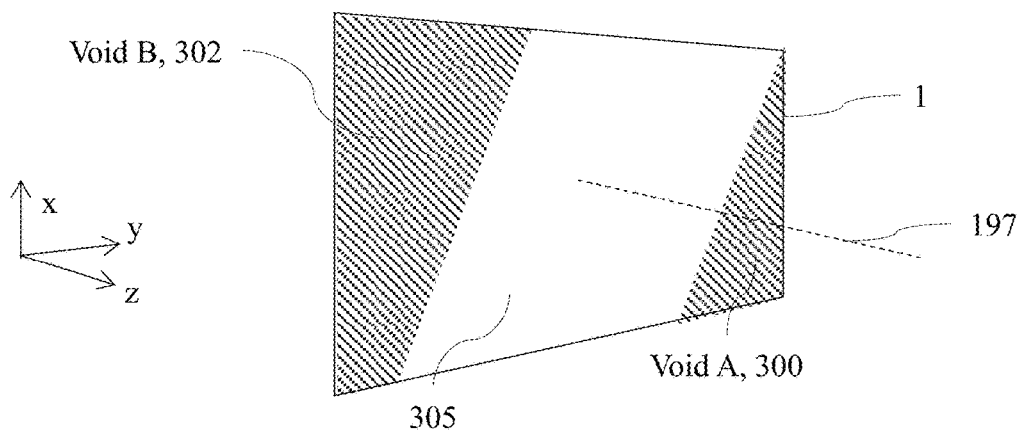
FIG. 17C is a schematic diagram illustrating in perspective view from the viewing position illustrated in FIG. 17A, the appearance of uniformity in a directional waveguide illuminated by the arrangement of FIG. 17B, in accordance with the present disclosure.

FIG. 17C is a schematic diagram illustrating in a perspective view from the viewing position illustrated in FIG. 17A, the appearance of uniformity in a directional waveguide illuminated by the arrangement of FIG. 17B. Thus the appearance of illumination voids 300, 302 for an off-axis observer in optical window 26e are shown with perspective.

It would be desirable to minimize the appearance of voids 300, 302.

Figure 18A:
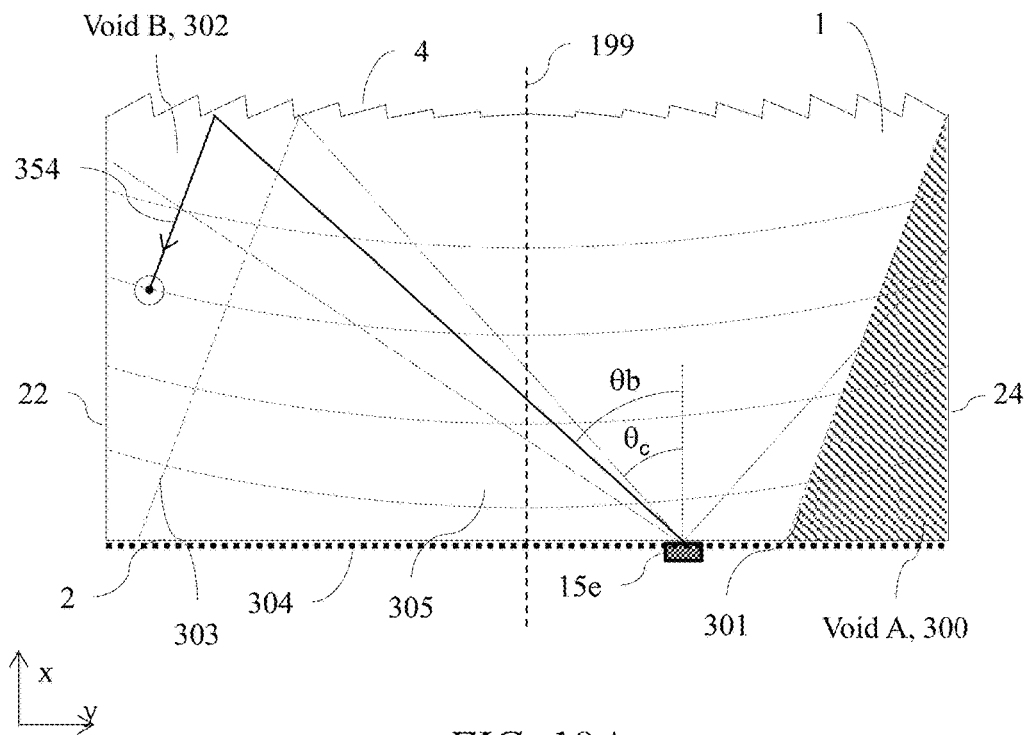
FIG. 18A is a schematic diagram illustrating in front view, illumination of a directional waveguide for illumination of an off-axis viewing position comprising an input side arranged to illuminate void B, in accordance with the present disclosure.
Figure 18B:
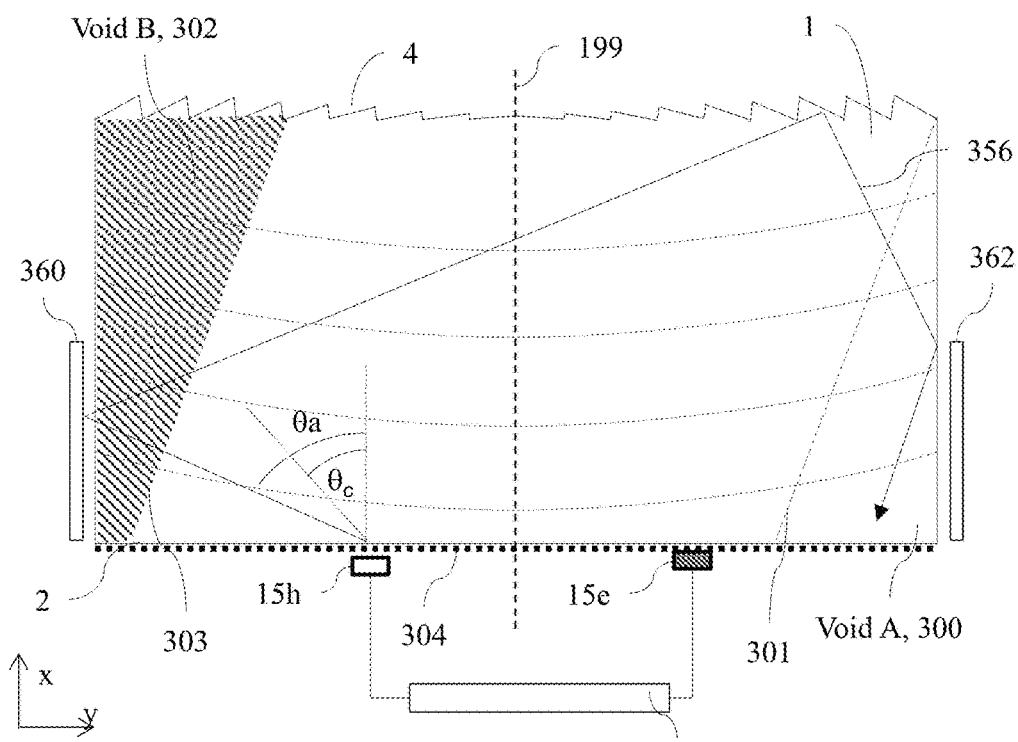
FIG. 18B is a schematic diagram illustrating in front view, illumination of a directional waveguide for illumination of an off-axis viewing position comprising an input side arranged to illuminate void A, in accordance with the present disclosure.

FIG. 18A is a schematic diagram illustrating in front view, illumination of a directional waveguide for illumination of an off-axis viewing position comprising an input side arranged to illuminate void B 302 and FIG. 18B is a schematic diagram illustrating in front view, illumination of a directional waveguide for illumination of an off-axis viewing position comprising an input side arranged to illuminate void A 300.

The waveguide 1 may further comprise sides 22, 24, extending between the input end 2 and the reflective end 4 and between the guiding surfaces 6,8, that are arranged to reflect light from the light sources 15a-n.

The removal of voids A and B is described in further detail in U.S. patent application Ser. No. 13/839,552, entitled "Wide angle imaging directional backlights" filed Mar. 15, 2013 (U.S. Patent Publ. No. 2013/0307831; and in U.S. patent application Ser. No. 15/097,750, entitled "Wide angle imaging directional backlights" filed Apr. 13, 2016, which are both herein incorporated by reference in their entireties.

As shown in FIG. 18A, void B 302 can be filled by modification of the structure of the input end, illustrated by schematic microstructure input 304. Ray 354 may be provided by the input microstructure 304 at input angle θb that is greater than the critical angle θc, and reflected from the Fresnel mirror structure at reflective end 4 before extraction by a light extraction feature 12.

As shown in FIG. 18B, void A 300 created by input light source 15e on the right side of the optical axis 199 can be may be filled by ray 356 from light source 15h arranged on the left side of the optical axis 199. Ray 356 may be provided by the input microstructure 304 at input angle θa that is greater than the critical angle θc, and reflected from left mirror 360 on the left end 22, then by Fresnel mirror structure at reflective end 4 and by end 24 (by TIR or reflector 362) on the right side of the waveguide 1 before extraction by a light extraction feature 12. Structures suitable for input end 304 to provide void A 300 filling are described in further detail herein.

Further the apparatus may comprise a control system 299 arranged to control the light sources 15a-n, the control system 299 being arranged, on selective operation of a first light source 15e to direct light into an optical window 26e, to simultaneously operate a second light source 15h that directs light reflected by the reflective end 4 and then by ends 22, 24 of the waveguide 1 into an outer portion 300 of the waveguide 1 that fail to be illuminated by the first light source 15e.

In the present disclosure, luminous intensity is a measure of the wavelength-weighted power emitted by a light source in a particular direction per unit solid angle and has units of candela, cd.

It would be desirable to provide side mirror arrangements that provide control of luminous intensity for filling of void A, 300.

FIGS. 19A-B are schematic diagrams illustrating in front view, a detail of illumination of planar side mirrors at end 24 for illumination of void A 300.

In FIG. 19A an external planar mirror 362 is arranged to reflect light ray after transmission through end 24. FIG. 19B illustrates a coating 363 arranged to provide light rays 356. Advantageously FIG. 19A may provide a less complex arrangement and may not provide coupling losses between the external mirror 362 and end 24 of FIG. 19A.

In both arrangements, light ray 356 may be at an angle θa that is greater than the critical angle θc and have a luminous intensity in direction θa determined by refraction at the microstructure 304 at the input end 2 and input light source luminous intensity distribution, which may typically be Lambertian.

It would be desirable to provide structures suitable for input end 304 to provide filling of void A 300 and void B 302. Such structures will be described herein below.

It would be desirable to provide further modification of the luminous intensity of the ray 356 to achieve improved uniformity of the filled void A 300 in comparison to the main illumination region 305.

FIGS. 20A-B are schematic diagrams illustrating in front view, details of illumination of faceted side mirrors 369, 371 for illumination of void A 300. Side mirrors 369, 371 may be provided respectively with draft facets 367 and reflective facets 365, 369 that are arranged to deflect the directional output from the input microstructure, and thus modify the luminous intensity of ray 356. The inclination of reflective facets 365, 369 may arranged to deflect the directional output from the input microstructure 304, and thus modify the luminous intensity of ray 356. Thus ray 356 may be provided respectively by rays at angles θd, θu after input from microstructure 304 and deflection by facets 365, 369. The variation of luminous intensity of ray 356 with angle will be described herein.

Advantageously uniformity of void A 300 in comparison to the main illumination region 305 may be improved by control of angle of reflective facets 365, 367.

It would be desirable to provide a privacy mode of operation of a directional display wherein the luminance of the display for an off-axis viewing position is substantially lower than the head-on luminance.

Figure 21A:
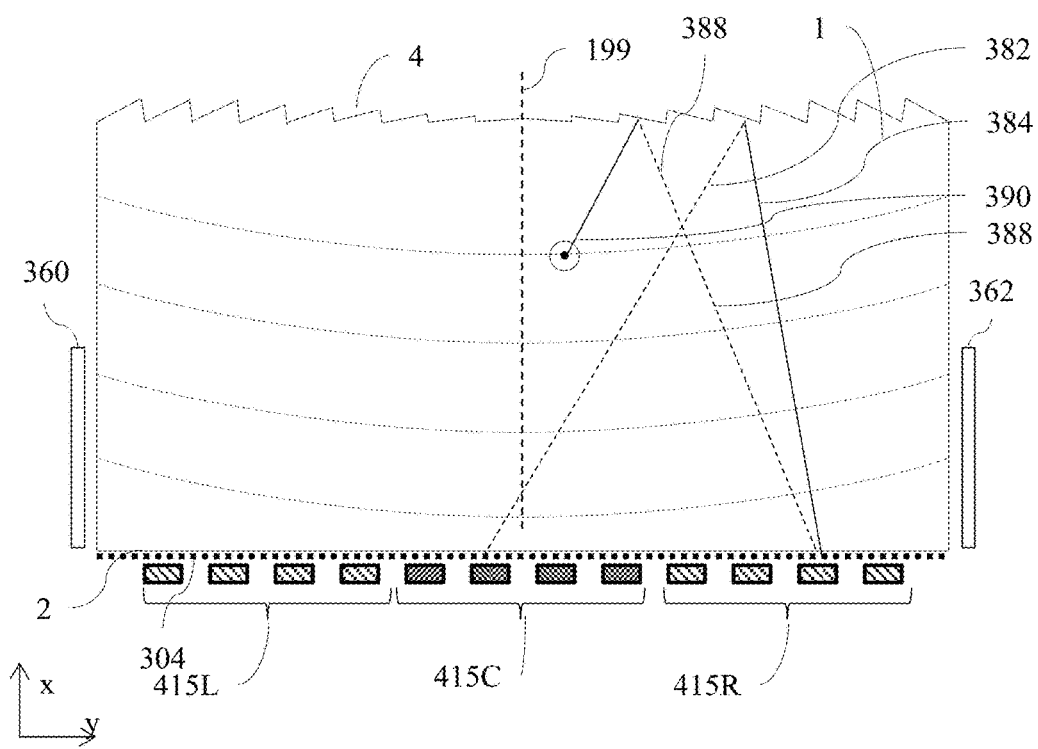
FIG. 21A is a schematic diagram illustrating in front view, light sources arranged for a switchable Privacy operation, in accordance with the present disclosure.

FIG. 21A is a schematic diagram illustrating in front view, light sources arranged for with a directional waveguide 1, for a switchable privacy operation. Light source array across part 415C of the input end 2 is arranged to illuminate the directional waveguide 1, whereas light source arrays in parts 415R and 415L are not activated during privacy operation. Alternatively light source arrays in parts 415R and 415L may be operated in antiphase to light source arrays 415C to reduce contrast of images viewed from the side viewing positions and described in U.S. patent application Ser. No. 14/751,878, entitled "Directional privacy display" filed Jun. 26, 2015 (U.S. Patent Publ. No. 2015/0378085; which is herein incorporated by reference in its entirety.

Figure 21B:
FIG. 21B and FIG. 21C are schematic diagrams illustrating in front and perspective views from the viewing positions illustrated in FIGS. 15A and 17A respectively, the desired appearance of a directional display comprising a directional waveguide illuminated by the arrangement of FIG. 21A, in accordance with the present disclosure.
Figure 21C:
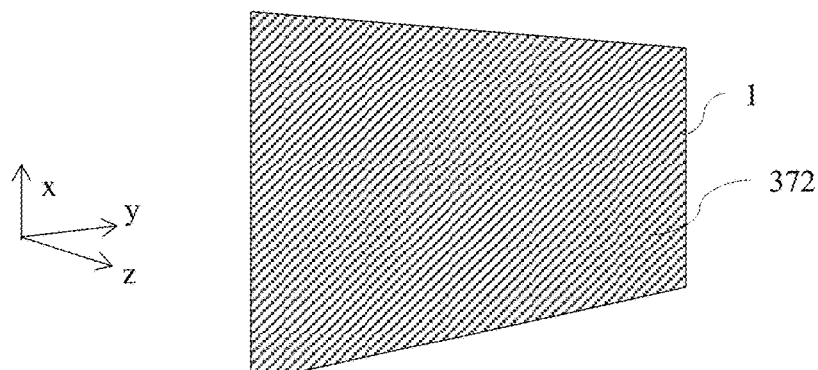

FIGS. 21B-C are schematic diagrams illustrating in front and perspective views from the viewing positions illustrated in FIGS. 15A and 17A respectively, the desired appearance of a directional display comprising a directional waveguide illuminated by the arrangement of FIG. 21A. In wide angle modes, arrays in parts 415R and 415L may be arranged to provide illumination of wider viewing angles to achieve a display that can be seen comfortably by off-axis observers.

Advantageously a display user can observe a substantially uniformly illuminated image of high luminance whereas an off-axis observer may see an image with substantially lower luminance, achieving a privacy function.

It would be desirable to minimize stray light in the privacy mode of operation.

Figure 22:
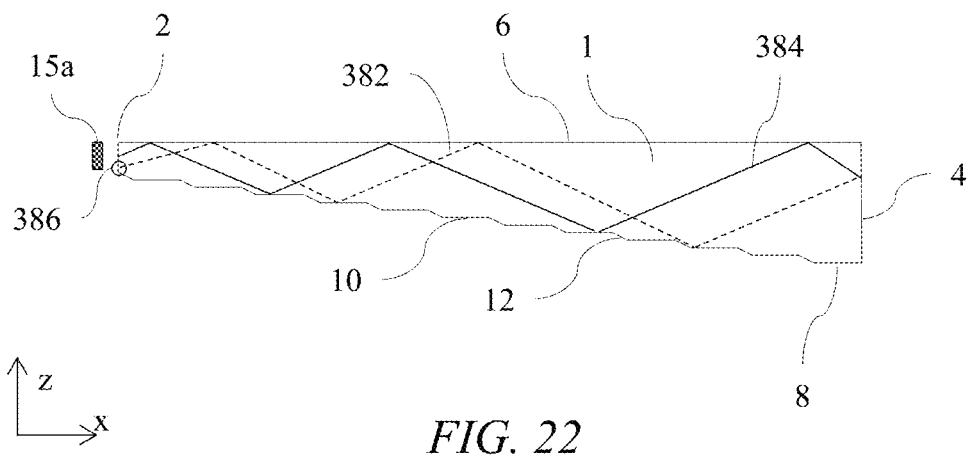
FIG. 22 is a schematic diagram illustrating in side view, light guiding in a stepped directional waveguide from an input side to a reflective end and back to the input side, in accordance with the present disclosure.
Figure 23:
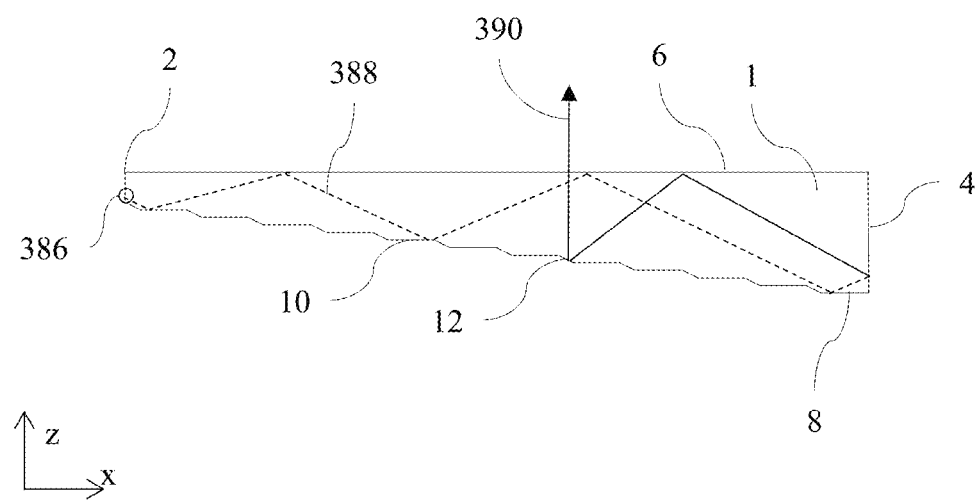
FIG. 23 is a schematic diagram illustrating in side view, the formation of stray light viewing windows by light reflected from the input side, in accordance with the present disclosure.

FIG. 22 is a schematic diagram illustrating in side view light guiding in a stepped directional waveguide 1 from an input end 2 to a reflective end 4 and back to the input side and FIG. 23 is a schematic diagram illustrating in side view, the formation of stray light viewing windows by light reflected from the input side.

The first guide surface 6 may be arranged to guide light by total internal reflection and the second guide surface 8 may comprise a plurality of light extraction features 12 oriented to direct light reflected by the reflected end 4 in directions allowing exit through the first guide surface 6 as the output light and intermediate regions 10 between the light extraction features that are arranged to guide light along the waveguide 1. The light extraction features 12 and the intermediate regions 10 alternate with one another in a stepped shape.

In an example ray path, light ray 382 from light sources in part 415C of the input end 2 is reflected as ray 384 at the reflective end 4 towards the input end 2 with microstructure 304. Some light, for example 4% for a material refractive index 1.5 in air is reflected as ray 388 at input end 2 and directed towards reflective end 4 where reflected ray 390 may be extracted by feature 12. As the ray 388 appears to originate from the input side in the region of array 415R then, ray 390 will be directed to an off axis viewing position and provide stray light in the desired privacy viewing positions.

It would be desirable to provide an input microstructure that can provide filling of voids A 300 and B 302 when arrays in parts 415L, 415R are illuminated for wide angle mode, and low levels of reflected illumination for off axis observers when arrays in parts 415L, 415R are not illuminated.

The illumination of off-axis optical windows by the input microstructure in privacy mode of operation will now be described.

Figure 24A:
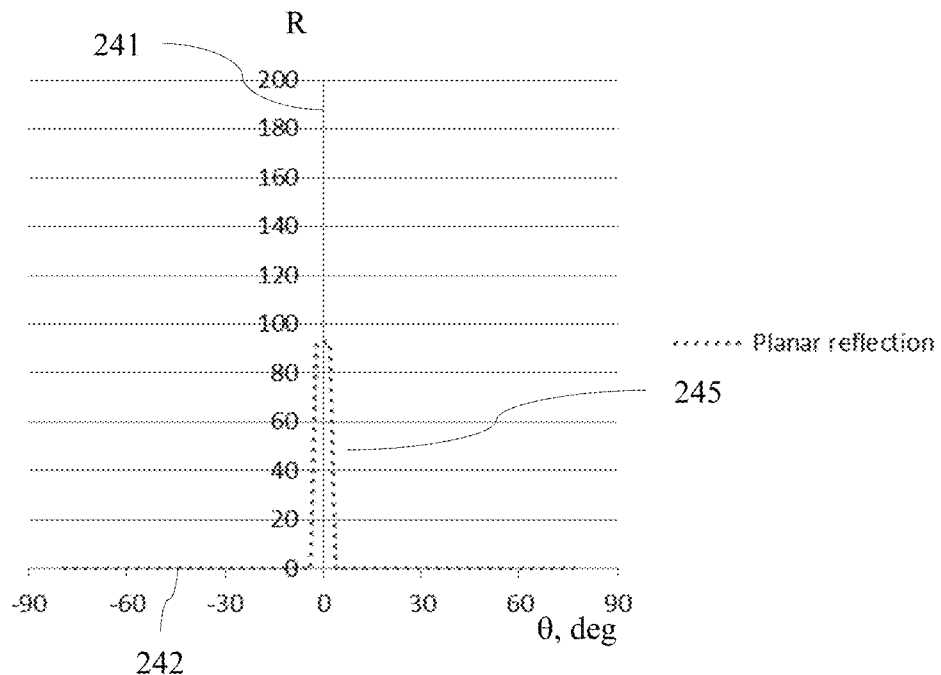
FIG. 24A is a schematic graph illustrating the angular variation of reflected luminous intensity R against input direction θ in the waveguide in the arrangement of FIG. 23 for a single light source, in accordance with the present disclosure.
Figure 24B:
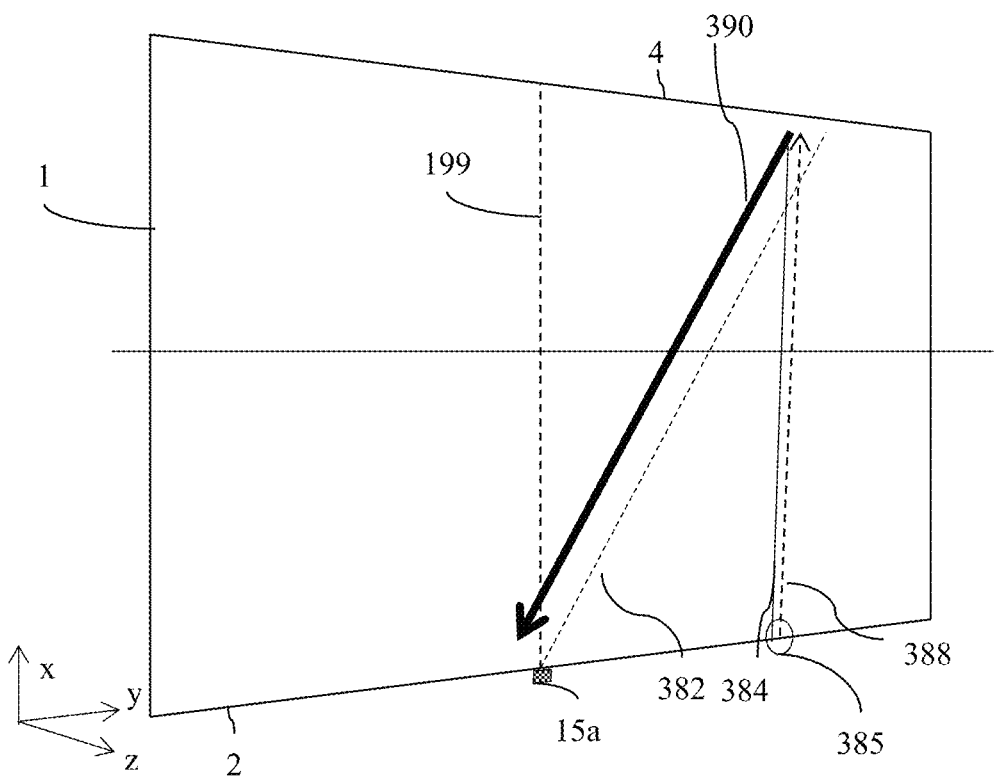
FIG. 24B is a schematic diagram illustrating perspective view the appearance of stray light streak originating from reflection from a planar input side as illustrated in FIG. 24A, in accordance with the present disclosure.

FIG. 24A is a schematic graph illustrating the angular variation of reflected luminous intensity R 241 against input direction θ 242 in the waveguide 1 comprising a planar input end 2 for a single operating light source array in part 415C of the input end 2. FIGURE 24B is a schematic diagram illustrating perspective view the appearance of stray light streak originating from reflection from a planar input side as illustrated in FIG. 24A.

In operation, light rays 384 from a central light source after reflection from reflective end 4 is reflected by the plane input end 2. Light ray 388 is directed from the reflective end to a region close to the input light source in part 415C of the input end. As the location 385 of the reflected light 388 is in an off-axis position, extracted light 390 will form a visible inclined streak in the off-axis viewing position. Such a streak may be clearly visible to an observer from privacy viewing directions such as shown in FIG. 17A.

It would be desirable to increase the number of light sources in the array in part 415C of the input end 2 to achieve increased head on lateral viewing freedom, and improve display uniformity.

Figure 25A:
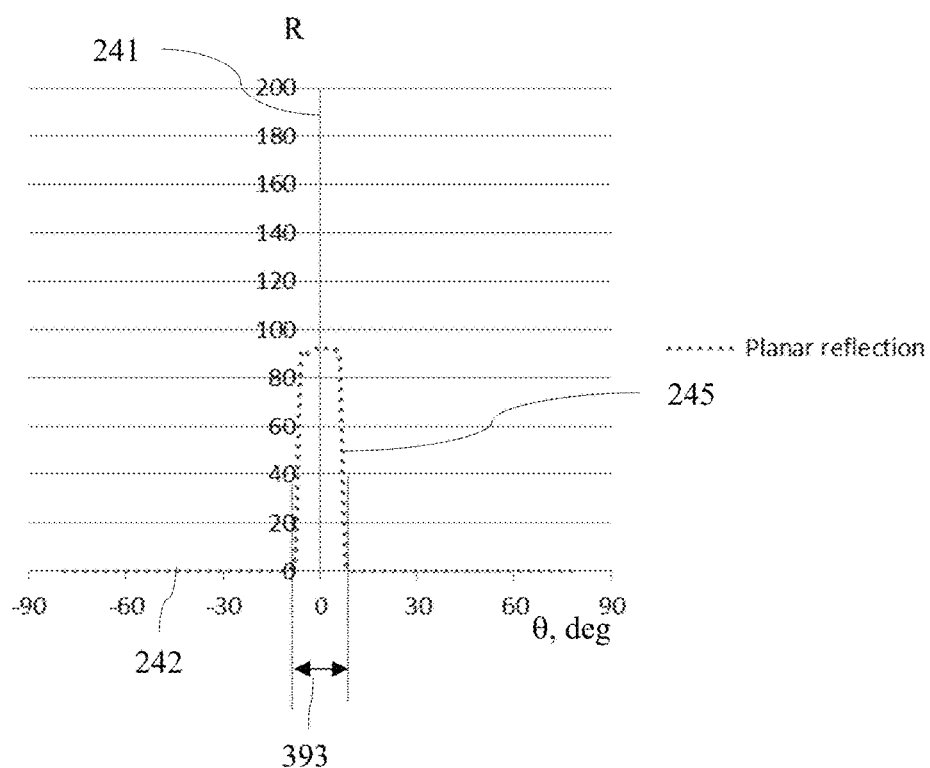
FIG. 25A is a schematic graph illustrating the angular variation of reflected luminous intensity R against input direction θ in the waveguide in the arrangement of FIG. 23 for an array of light sources extended in the lateral direction, in accordance with the present disclosure.

FIG. 25A is a schematic graph illustrating the angular variation of reflected luminous intensity R against input direction θ in the waveguide for an extended width array of light sources such as illustrated by array in part 415C of the input end 2 in FIG. 21A. For convenience, the light sources of array in part 415C of the input end 2 are illustrated as continuous. Such continuous light sources may be provided by an array of discrete sources and diffuser elements at the reflective end and in the optical stack, such as in layer 208 of FIG. 14.

Figure 25B:
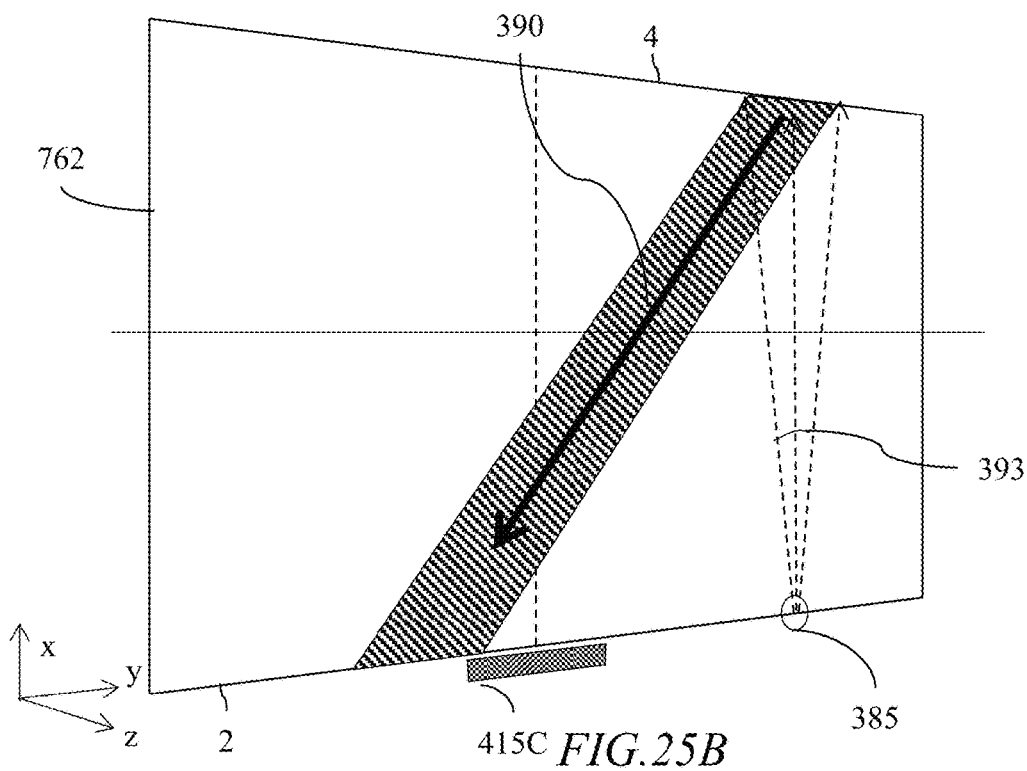
FIG. 25B is a schematic diagram illustrating in perspective view the appearance of stray light streak originating from reflection from a planar input side as illustrated in FIG. 25A, in accordance with the present disclosure.

FIG. 25B is a schematic diagram illustrating perspective view the appearance of stray light streak originating from reflection from a planar input side as illustrated in FIG. 25A. In comparison to FIG. 24B, the angular cone width 393 in FIG. 25A is increased width of the streak from rays 390.

It would be desirable to reduce or remove the inclined streak artefact created by rays 390 in off-axis viewing positions. Further it would be desirable to reduce stray light created by reflection from off-axis light emitting elements that may not be emitting during privacy operation.

Figure 26:
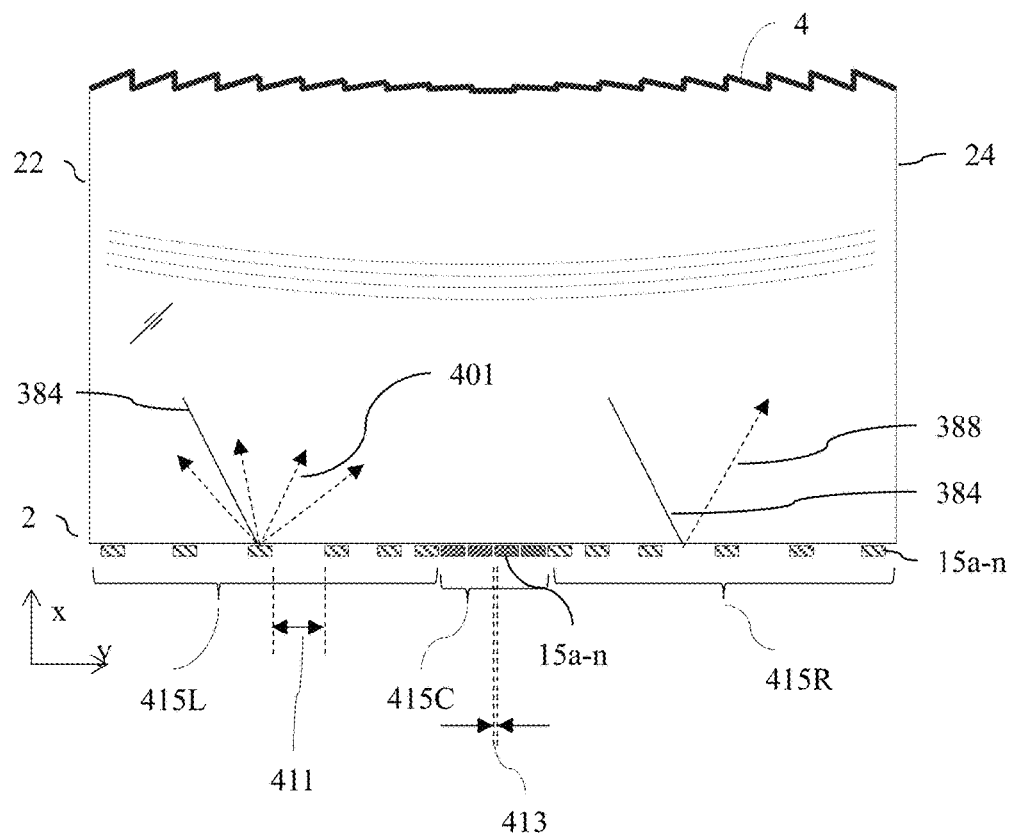
FIG. 26 is a schematic diagram illustrating in front view, a directional waveguide and array of light sources arranged to reduce stray light luminance in a privacy mode of operation, in accordance with the present disclosure.

FIG. 26 is a schematic diagram illustrating in front view, a directional waveguide and array of light sources 15*a-n* arranged to reduce stray light luminance in a privacy mode of operation. Some reflected light ray 384 may be scattered as rays 401 by the light emitting package of array 15*a-n*. Gaps between light emitting elements will reflect light rays 388 that may provide streaks such as illustrated in FIG. 25B. Thus in outer regions such as at least part of array in parts 415L, 415R of the input end 2, gap 411 between adjacent light emitting elements may be larger than gap 413 in central region for array in part 415C of the input end 2.

Advantageously, stray light arising from reflection of light from light sources of array in parts 415L, 415R in outer regions of the input end 2 may be reduced.

As will be illustrated, input microstructures that are provided with angular luminous intensity profile to achieve desirable filling of voids A 300 and B 302 may have reflectivities that may create streak artefacts in off axis viewing of a privacy display.

It would be desirable to minimize input microstructure reflectivity.

Figure 27:
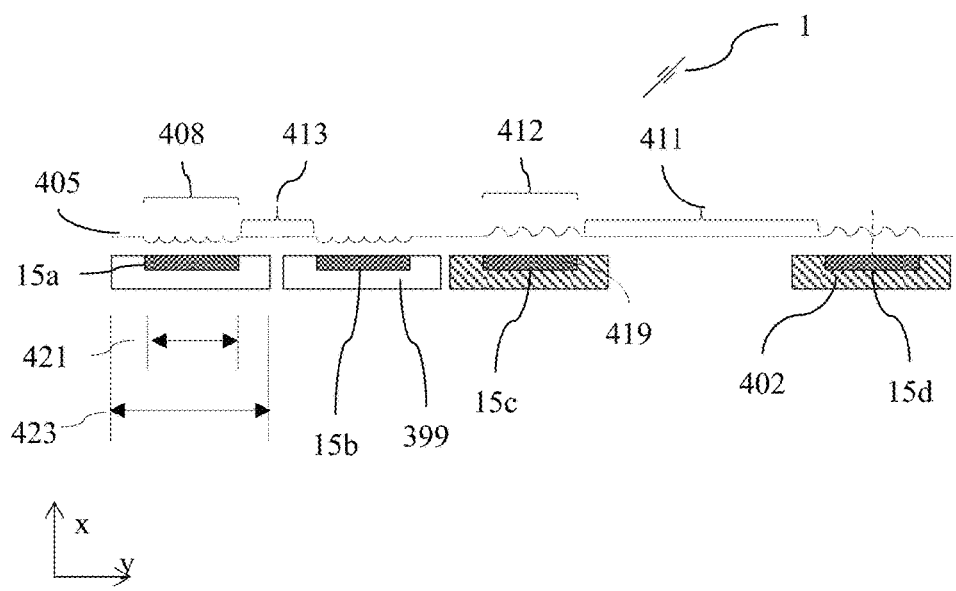
FIG. 27 is a schematic diagram illustrating in front view, an array of light sources for a directional waveguide comprising at least two different input microstructures aligned with each illumination region of the input light sources, in accordance with the present disclosure.

FIG. 27 is a schematic diagram illustrating in front view, an array of light sources 15*a*, 15*b*, 15*c*, 15*d* for a directional waveguide 1 comprising at least two different input microstructures 408, 412 aligned with each illumination region of the input light sources. The light sources may be provided within a package 399 of material that may be reflective such as a white package material or material 402 that may have reduced reflectivity such as a black plastic material. The light sources 15*a-n* may have light emitting areas 419 with respective lateral extents 421. The packages 399 may have lateral extent 423.

Microstructure regions 408, 412 may be substantially aligned with light emitting apertures 15*a-d*. Gaps 413, 411 may be provided with different microstructures that will be described further herein.

Thus a directional backlight for a transmissive spatial light modulator 48, may comprise a waveguide 1 comprising an input end 2; and an array 15 of light sources at different input positions in a lateral direction across the input end 2, the light sources being arranged to input light into the waveguide 1 through the input end 2, the light sources having light emitting areas 419 with respective lateral extents 421, the waveguide 1 further comprising first and second, opposed guide surfaces 6,8 for guiding the input light 382 along the waveguide 1, and a reflective end 4 facing the input end 2 for reflecting the input light guided from the input end back through the waveguide 1 as ray 384, wherein the second guide surface 8 is arranged to deflect light reflected from the reflective end 4 through the first guide surface 6 as output light, the reflective end 4 has positive optical power in the lateral direction, and the waveguide 1 is arranged to image the light sources 15*a-n* in the lateral direction so that the output light from the light sources 15*a-n* is directed into respective optical windows 26*a-n* that are distributed in the lateral direction in dependence on the input positions of the light sources 15*a-n*.

The light sources 15*a-n* may have light emitting areas 419 with respective lateral extents 421 that are separated.

Advantageously reflectivity of input end 2 may be minimized and stray light reduced in privacy operation. Further display uniformity may be optimized for wide angle operation in a switchable privacy display.

Figure 28A:
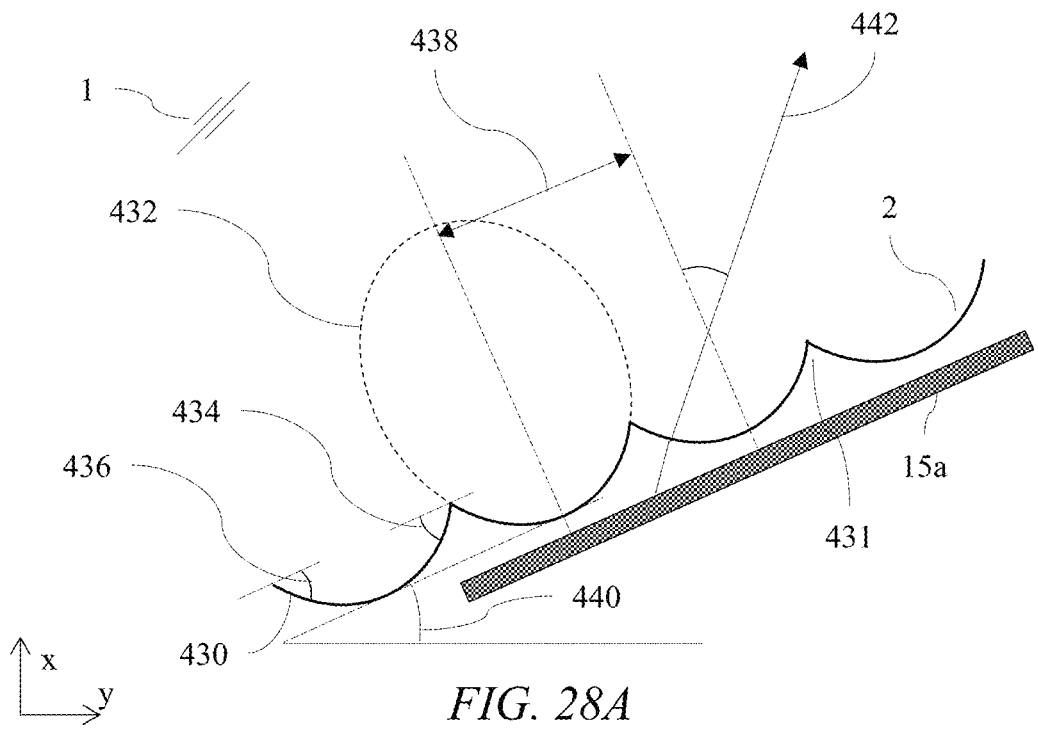
FIG. 28A is a schematic diagram illustrating in front view, an input microstructure comprising an inclined array of elongate curved sections, in accordance with the present disclosure.
Figure 28B:
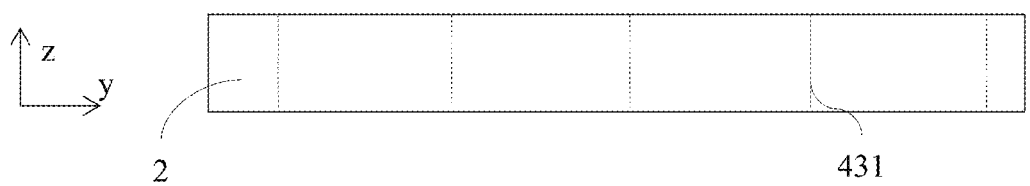
FIG. 28B is a schematic diagram illustrating end view, an input microstructure comprising an inclined array of elongate curved sections, in accordance with the present disclosure.

FIG. 28A is a schematic diagram illustrating in front view, an input microstructure on input end 2 of the waveguide 1 comprising an inclined array of elongate curved sections and FIG. 28B is a schematic diagram illustrating end view. The input end comprises an input microstructure wherein the input end is shaped in the lateral direction as an inclined array of elongate curved sections 430 having cusps 431 therebetween. Such a microstructure may be applied to any of the curved sections described herein, including cases where the curved sections are not inclined with respect to the lateral direction (i.e. inclination angle 440 is zero).

In FIG. 28A the curved sections are convex with respect to the waveguide 1. However, in FIG. 28A and where other microstructures described herein curved sections that are convex, then the curved sections may alternatively be concave with respect to the waveguide 1.

The curved sections 430 may have angles 436, 434 at the cusps 431 with respect to the extent of the curved sections 430, which is the lateral direction in the case that the curved sections are not inclined with respect to the lateral direction. The curved sections 430 may be conic sections formed from conics 432 that may be inclined at angles 440 to the lateral direction. More generally, the curved sections may have a variety of shapes, including shapes other than conic sections, although conic sections provide for ease of manufacture. The curved sections 430 may be curved without an inflection. The curved sections may be smoothly curved, that is with no discontinuity in gradient.

The pitch 438 of the curved sections 430 may be arranged to provide appropriate cusp angles 436, 434 to achieve desirable angular profiles as will be further described herein.

Figure 28C:
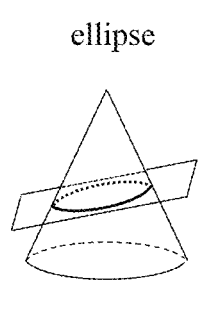
FIG. 28C, FIG. 28D, and FIG. 28E are schematic diagrams illustrating in perspective view, various curved sections, in accordance with the present disclosure.
Figure 28D:
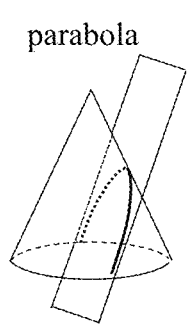
Figure 28E:
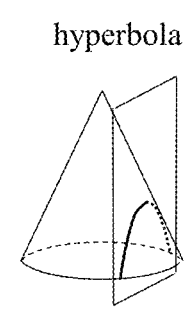

FIGS. 28C-E are schematic diagrams illustrating in perspective view, various conic sections that may be applied to the curved sections 430, including elliptical, parabolic and most generally hyperbolic sections. As will be described, surfaces may comprise combinations of profiles including concave and convex curved sections. Most typically surfaces may be planar and circular cross sectional profiles.

Figure 29:
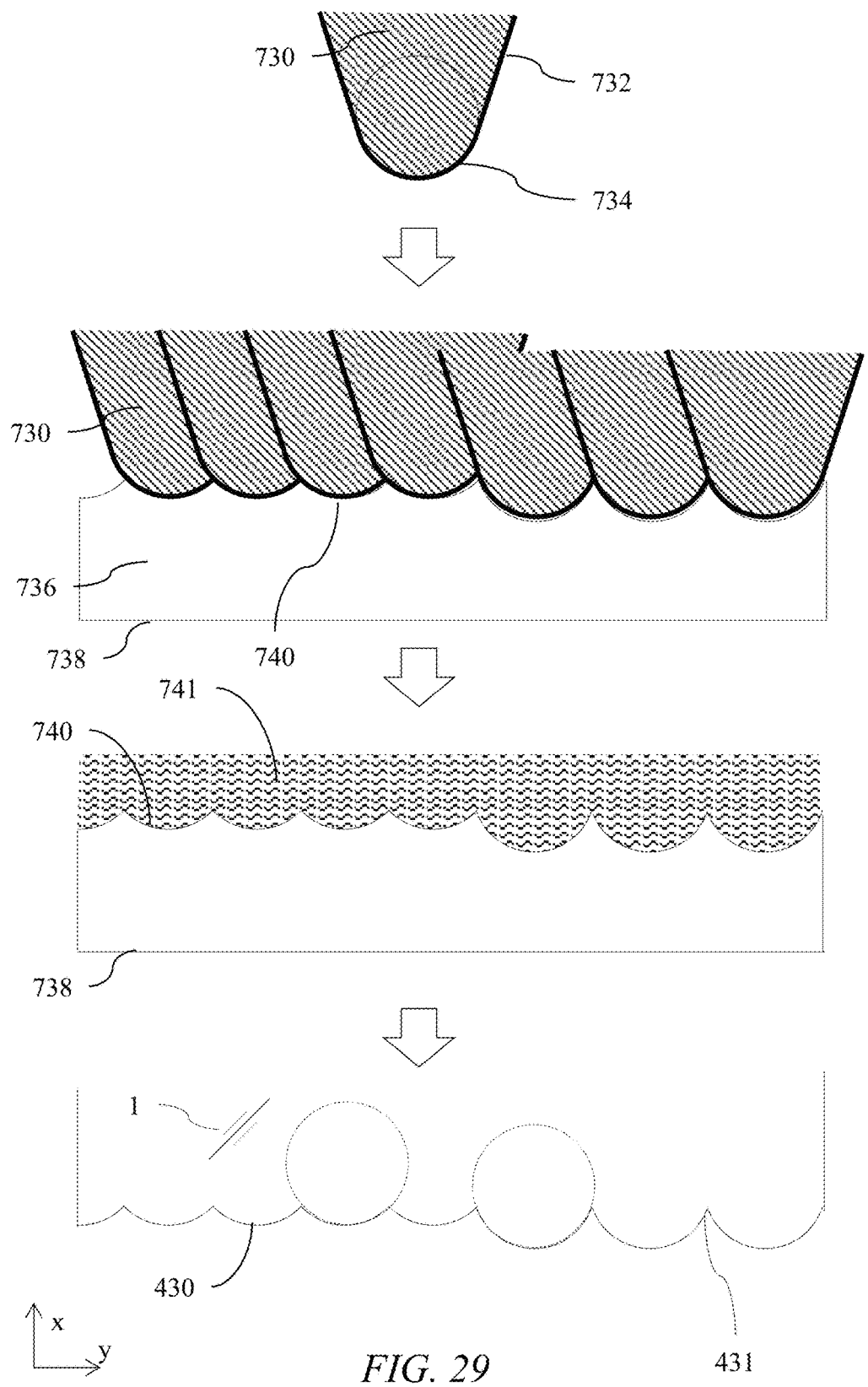
FIG. 29 is a schematic diagram illustrating in front view, a method to provide a waveguide input microstructure, in accordance with the present disclosure.

FIG. 29 is a schematic diagram illustrating in front view, a method to provide a microstructure for the input end 2 of the waveguide that may be applied to the microstructure shown in FIG. 28A or any other microstructure described herein. In a first step a diamond 730 is provided, for example by polishing, with a curved section 734 and optionally planar or other cutting surfaces 732.

In a second step the diamond may be used to scribe in the z direction a groove, providing a curved section cut a mold material 736, providing tool 738 with surface 740. The height and spacing of the diamond 730 in adjacent cuts may be adjusted to provide different cusp 431 profile across surface 740.

In a third step a material 741 such as a curable polymer is provided in a mold with the tool 738 and cured. Cured polymer material may be PMMA, PC, COP, COC, acrylate or other known optically transparent waveguide materials.

In a fourth step, waveguide 1 is removed from the tool 738, comprising microstructured surface 430. Typically, diamond 730 has a convex diamond surface, and waveguide 1 has a corresponding convex polymer surface.

Various input microstructures will now be described to achieve desirable properties of high uniformity and efficiency in wide angle mode and low stray light streak visibility in privacy mode.

Figure 30A:
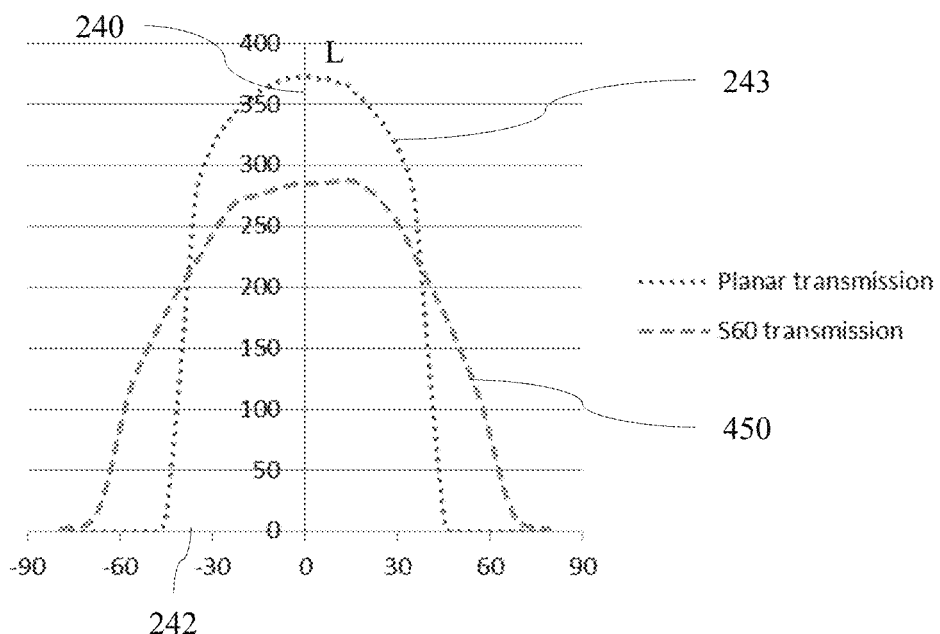
FIG. 30A and FIG. 30B are schematic graphs illustrating the angular variation of respectively transmitted luminous intensity L and reflected luminous intensity R against direction θ in the waveguide in the arrangement of FIG. 28A, in accordance with the present disclosure.
Figure 30B:
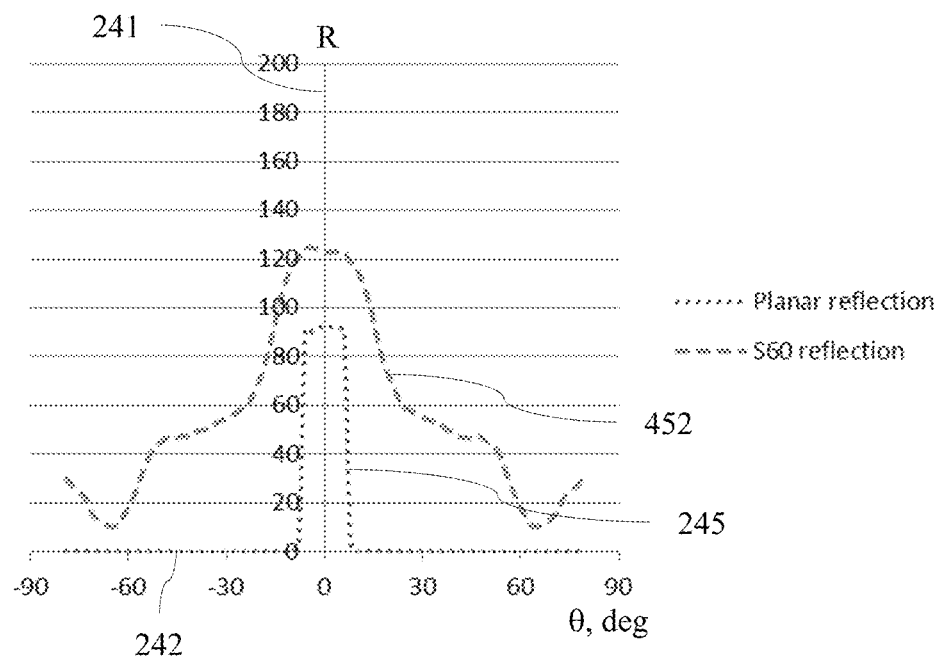

FIGS. 30A-B are schematic graphs illustrating the angular variation of respectively transmitted luminous intensity L 240 and reflected luminous intensity R 241 against direction θ 242 in the waveguide 1 in the arrangement of FIG. 28A when the angle 440 is 0 degrees and the angles 434, 436 are 60 degrees. For convenience such a structure is termed S60, describing the cusp angle of 60 degrees. In comparison to a planar input, profile 450 provides more light at higher angle, at the expense of lower head on efficiency.

Advantageously said higher angle light may be used to compensate for losses at the Fresnel mirror at the reflective end. Advantageously, the high reflection of the S60 microstructure may provide increased luminance from light sources of array 15 in the central part 415C of the input end. Thus S60 may be provided continuously across centrally located light sources of the array 15a-n, including in gaps between light sources.

By comparison with a planar input, reflected light profile 452 from S60 has a higher head on luminance than a planar input. Further light is spread at higher angles. In privacy viewing, the display will have a broad non-uniform light streak, that degrades privacy operation.

It would be desirable to reduce the stray light from S60 to improve privacy performance.

Figure 31:
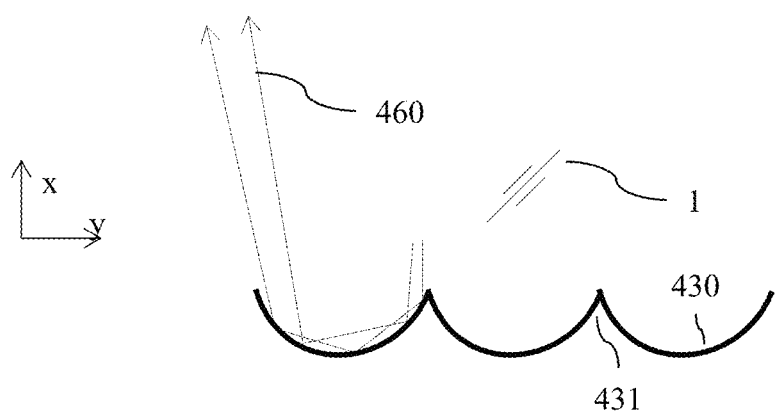
FIG. 31 is a schematic diagram illustrating in front view, reflection of light by an input microstructure, in accordance with the present disclosure.
Figure 32:
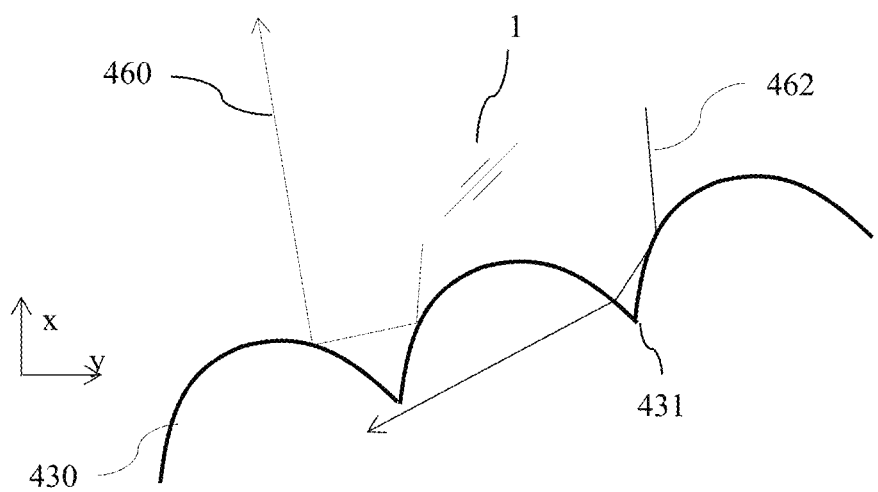
FIG. 32 is a schematic diagram illustrating in front view, an input microstructure, in accordance with the present disclosure.

FIG. 31 is a schematic diagram illustrating in front view, reflection of light by an input microstructure wherein the curved sections 430 are convex with respect to the waveguide 1. FIG. 32 is a schematic diagram illustrating in front view, an input S60 microstructure comprising concave curved section microstructures in the waveguide 1 material wherein the curved sections 430 are concave with respect to the waveguide 1.

In comparison with a planar surface, S60 structures provide double TIR rays 460 that have high luminous intensity due to the internal reflection from the high angle cusps 431.

Such ray 460 provide at least part of the higher levels of reflectivity that are illustrated in FIG. 30B.

Figure 33:
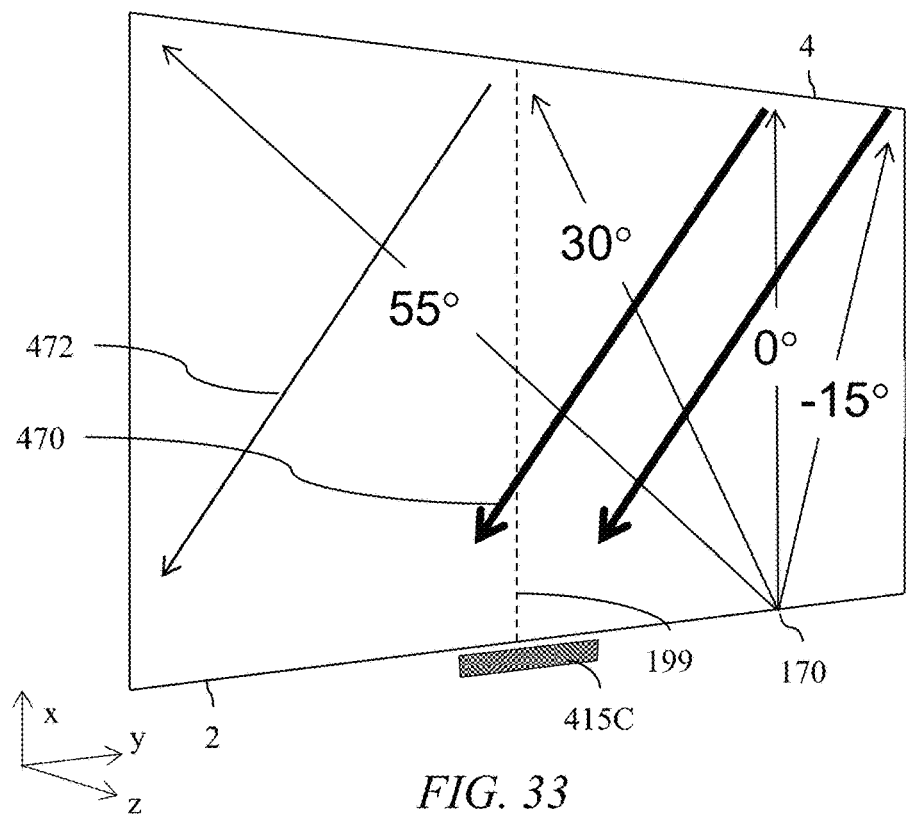
FIG. 33 and FIG. 34 are schematic diagrams illustrating in perspective view the appearance of stray light streak originating from reflection from a micro-structured input side as illustrated in FIG. 30, in accordance with the present disclosure.
Figure 34:
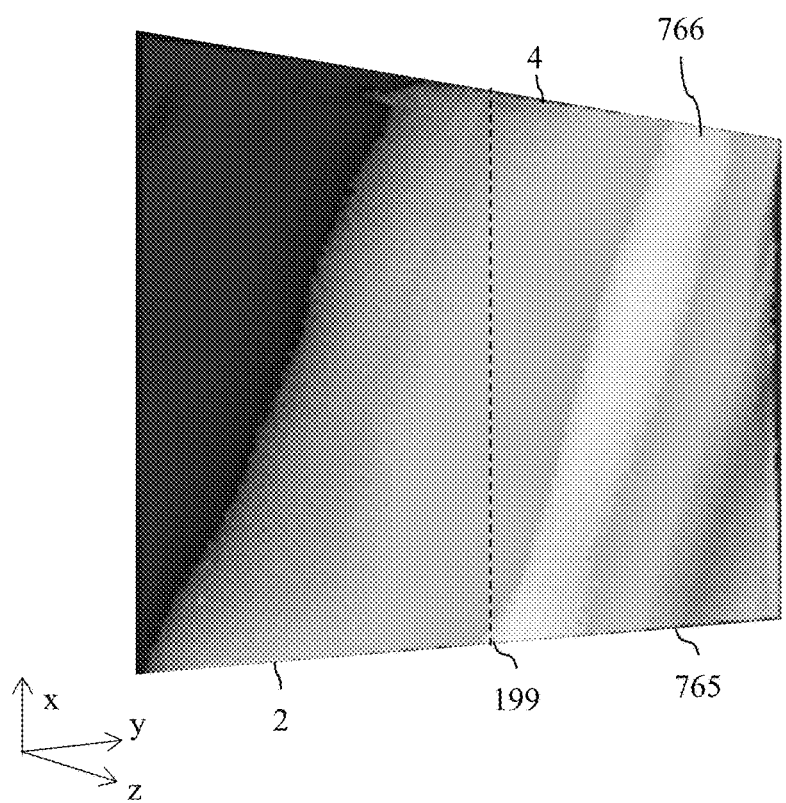

FIGS. 33-34 are schematic diagrams illustrating in perspective view the appearance of stray light streak originating from reflection from an S60 micro-structured input end 2 as illustrated in FIG. 30B. S60 microstructures arranged at location 170 may provide a wide streak of stray light as illustrated by rays 470, 472.

It would be desirable to provide an input microstructure with similar uniformity and void filling characteristics to S60, with reduced reflectivity.

Figure 35A:
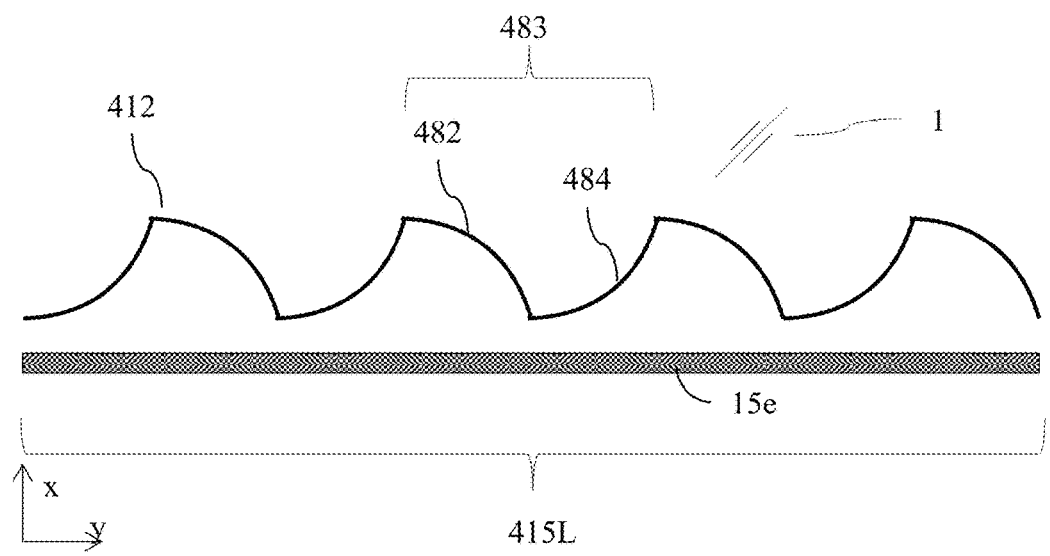
FIG. 35A and FIG. 35B are schematic diagrams illustrating in front view, input microstructures comprising alternative convex and concave facets, in accordance with the present disclosure.
Figure 35B:
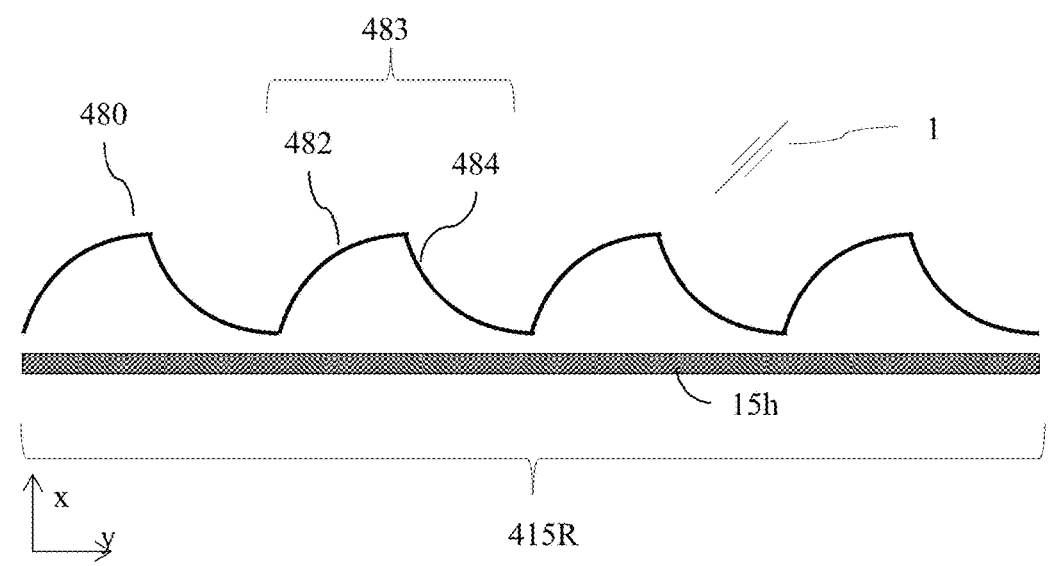

FIGS. 35A-B are schematic diagrams illustrating in front view, input microstructures comprising microstructure 412 with alternative convex facets 482 and concave facets 482 that may be arranged in alignment with at least some light sources of array in parts 415L and 415R respectively as shown in FIG. 26.

Thus across a lateral extent of the input end 2 aligned with the light emitting area 419 of at least one of light sources 15a-n, the input end 2 is shaped in the lateral direction as an array of teeth 483 that are each shaped with a convex curved section 484 on one side the tooth and a concave curved section 482 on the other side of the tooth 483. Said curved sections 482, 484 may be conic sections. Said teeth 483 may be identical.

At cusps between the convex curved sections 484 and the concave curved sections 482, each of the convex curved sections 484 and the concave curved sections 482 may have a shallow angle at the cusp at one end thereof in a range from 0° to 20°, for example 0° in some embodiments, and/or may have a steep angle at the cusp at the other end thereof in a range from 45° to 90°, preferably in a range from 60° to 85°, for example 85° in some embodiments.

Figure 36:
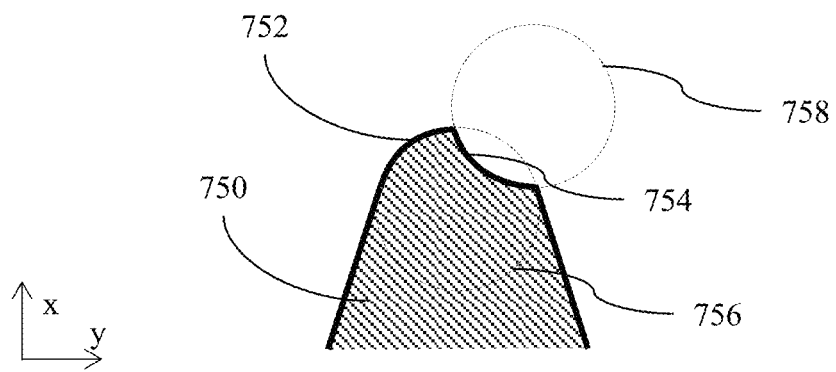
FIG. 36 is a schematic diagram illustrating in front view, a method to form a diamond for cutting the microstructures of FIGS. 35A and 35B, in accordance with the present disclosure.

FIG. 36 is a schematic diagram illustrating in front view, a method to form a diamond for cutting the microstructures of FIGS. 35A-B. A tooth diamond 750 of similar form to that shown in FIG. 29 may have a further concave facet 754 provided with curved section 758 that is removed by a polishing process.

Figure 37:
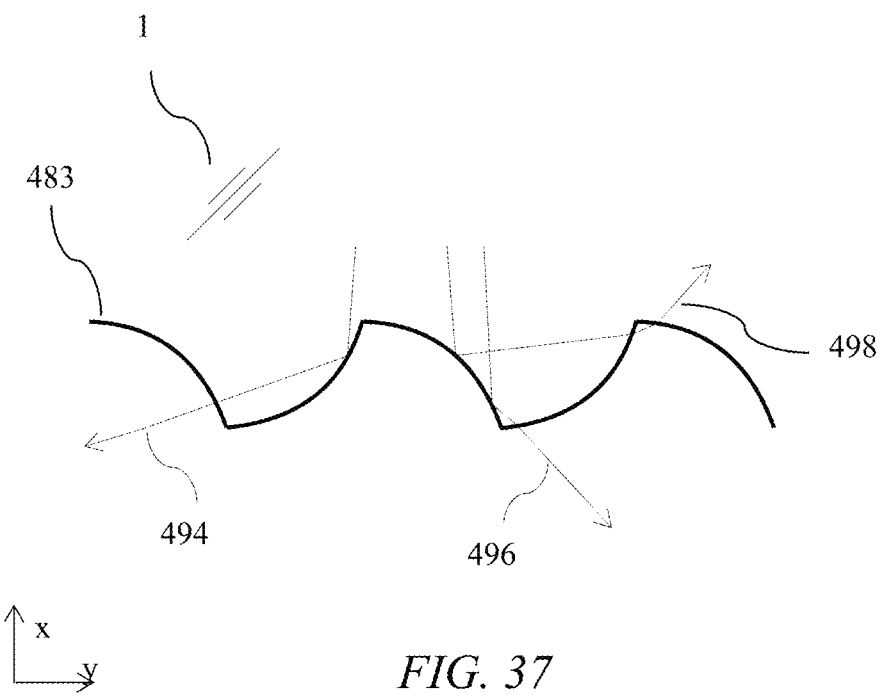
FIG. 37 is a schematic diagram illustrating in front view, reflection of light from an input microstructure, in accordance with the present disclosure.

FIG. 37 is a schematic diagram illustrating in front view, reflection of light from an input microstructure illustrated in FIG. 35A. In comparison to FIGS. 31 and 32, rays 494 undergo a single total internal reflection (TIR) and escape through the adjacent facet that has the opposite shape.

Figure 38:
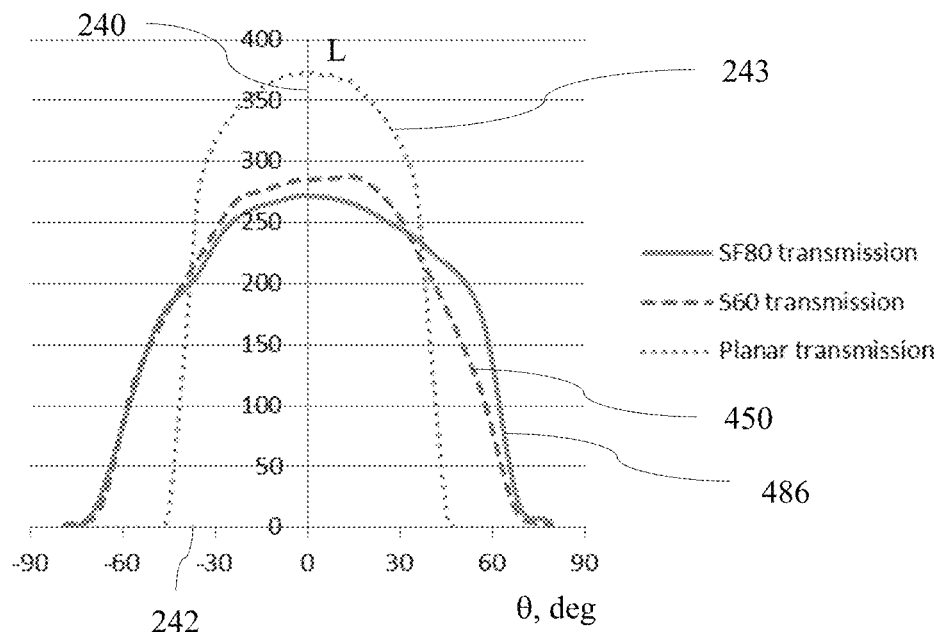
FIG. 38 and FIG. 39 are schematic graphs illustrating the angular variation of respectively transmitted luminous intensity L and reflected luminous intensity R against direction θ in the waveguide in the arrangement of FIG. 35, in accordance with the present disclosure.
Figure 39:
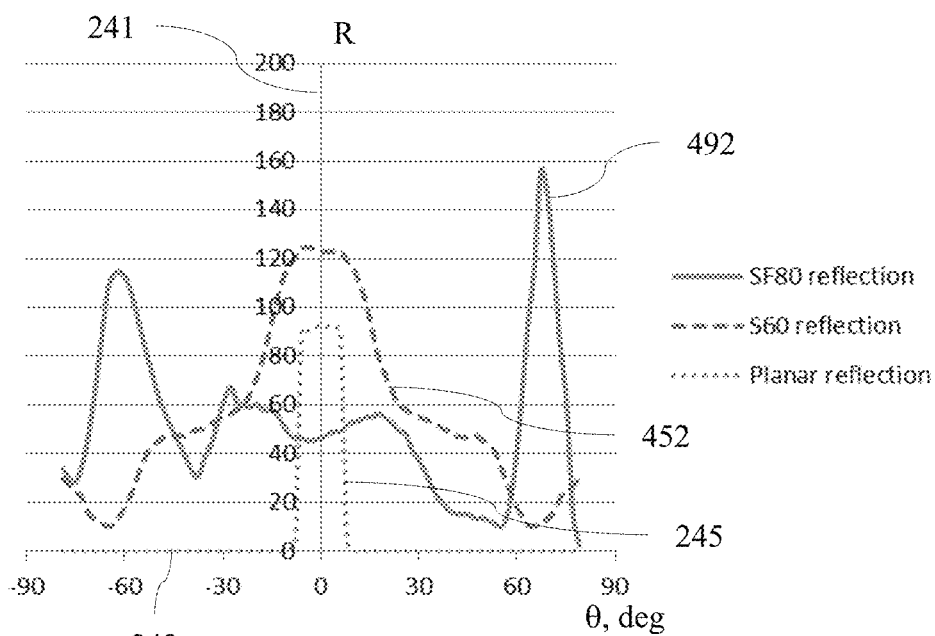

Advantageously the teeth 483 have lower reflectivity and thus stray light may be reduced in comparison to S60 structures, as illustrated in FIGS. 38-39 which are schematic graphs illustrating the angular variation of respectively transmitted luminous intensity L 240 and reflected luminous intensity R 241 against direction θ 242 in the waveguide 1 in the arrangement of FIG. 35A.

Transmission profile 486 for teeth 483 are similar to S60, however with a bias towards illumination of the right end 24 (for teeth in part 415R of the input end 2). Increased luminous intensity can be provided for void A 300 by increasing the luminous intensity that contributes to void filling. Advantageously uniformity can be increased in wide angle mode. For the arrangement of FIG. 35B, the profiles 486, 492 are reflected about the zero degree axis.

Reflection profile 492 may achieve reduced head on reflection luminance, and a larger spread of reflected light, thus achieving a more uniform background privacy level. Advantageously, privacy uniformity can be improved.

Further, such structures may be arranged with a linear array of light sources, thus simplifying mechanical and thermal design of the light coupling arrangement between the light sources and waveguide 1 input end 2.

It would be desirable to achieve higher levels of luminous intensity for void filling and reduced levels of reflectivity for privacy performance in comparison to the arrangement of FIG. 35A.

Figure 40:
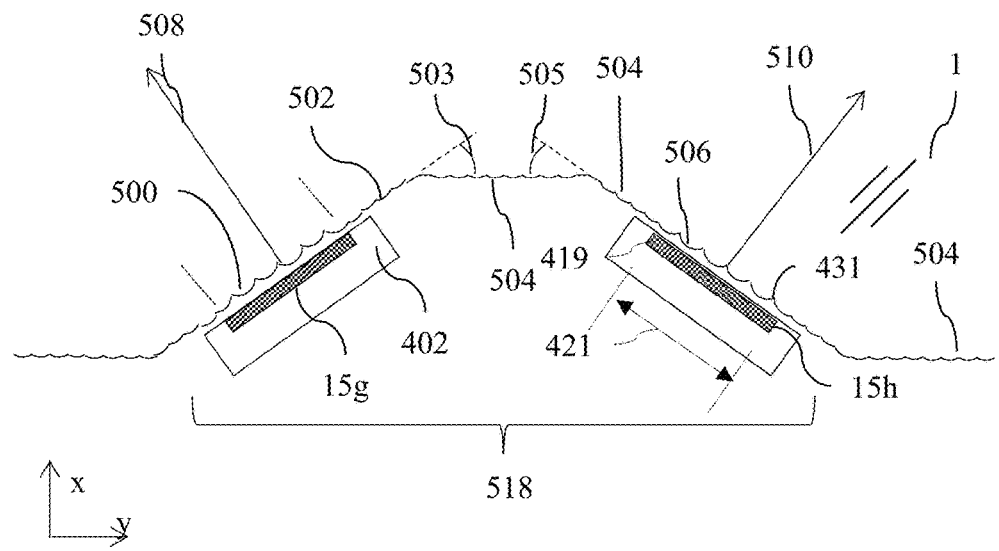
FIG. 40 and FIG. 41 are schematic diagrams illustrating in front view, an input microstructure and aligned light source array, in accordance with the present disclosure.
Figure 41:
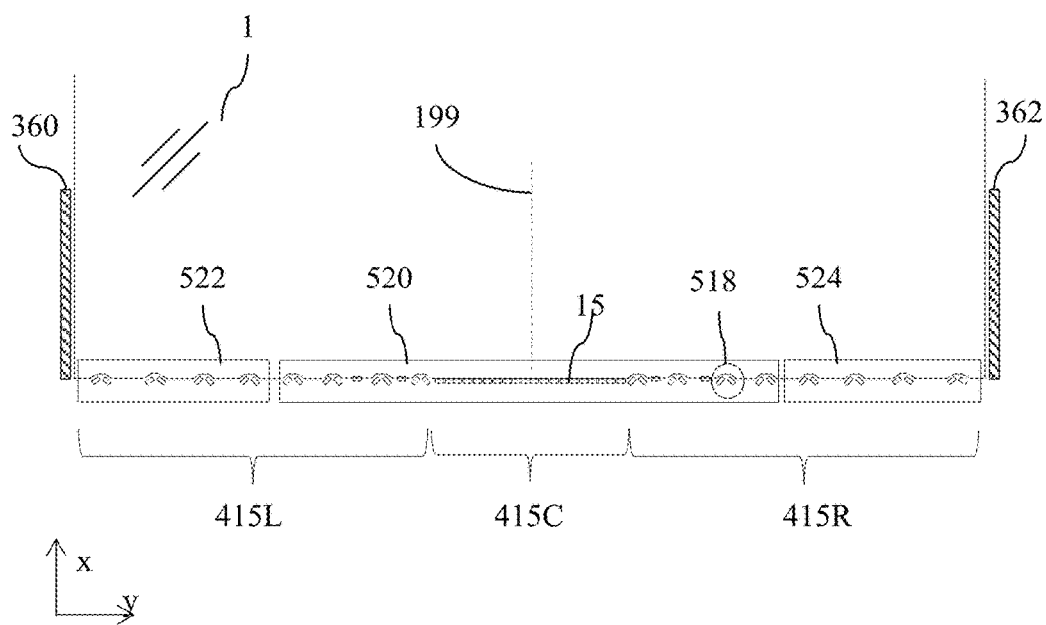

FIGS. 40-41 are schematic diagrams illustrating in front view, an input microstructure and aligned light source array.

Thus, the light sources include at least one pair 518 of adjacent light sources 15h, 15g arranged at input positions offset from the optical axis 199 of the reflective end 4, wherein, within the pair 518, the light source 15g closest to said optical axis 199 is inclined with the normal to the lateral extent 421 of its light emitting area 419 inclined towards said optical axis 199 and the light source 15h furthest from said optical axis 199 is inclined with the normal to the lateral extent 421 of its light emitting area 419 inclined away from said optical axis 199.

The normal to the lateral extent of the light emitting areas 419 of the inclined light sources 15g and 15h may be inclined at angles to the lateral direction in a range from 30° to 45°, for example 35°.

Further the input end 2 of the waveguide 1 may comprises a pair of inclined input facets 500, 506 extending across the light emitting areas 419 of the respective light sources 15g, 15h of said pair 518.

Said input facets 500, 506 may be each shaped as an array of curved sections having cusps 431 therebetween. The input facets 500, 506 may have angles 503, 505 to the lateral direction of 35 degrees for example. The angles 434, 436 (as illustrated in FIG. 28A) of the curved sections at the cusps 431, with respect to a direction along the light emitting area 419 of the light source 15g across which the input facet 506 extends, may be in a range from a first lower limit of 35° to a first upper limit of 60°. Alternatively, the first lower limit may be 38°. Instead or as well, the first upper limit may be 50°. In one embodiment, the angles 434, 436 are 40°.

The input end 2 may include an intermediate facet 504 extending between the inclined input facets 500, 506. Said intermediate facet 504 may be each shaped as an array of curved sections having cusps 431 therebetween, and the angles 434, 436 of the curved sections at the cusps 431, with respect to the lateral direction, are in a range from a second lower limit of 15° to a second upper limit of 34°. The second lower limit may be 20° or the second upper limit may be 30°. Said curved sections may be conic sections. The curved sections may be concave with respect to the light guide 1.

As described with reference to FIG. 29 the curved sections are typically convex with respect to the light guide 1.

FIG. 41 further describes arrangement of lightbar that may comprise sections 520, 522, 524 to reduce the effect of thermal expansion between the waveguide 1 and array 15 of light sources during operation.

Figure 42:
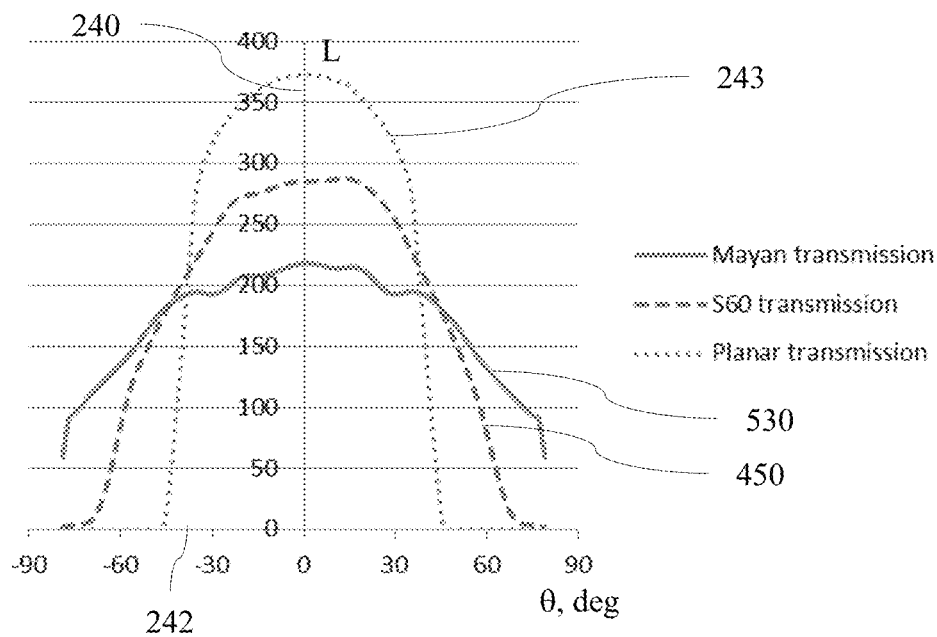
FIG. 42 and FIG. 43 are schematic graphs illustrating the angular variation of respectively transmitted luminous intensity L and reflected luminous intensity R against direction θ in the waveguide in the arrangement of FIG. 40, in accordance with the present disclosure.
Figure 43:
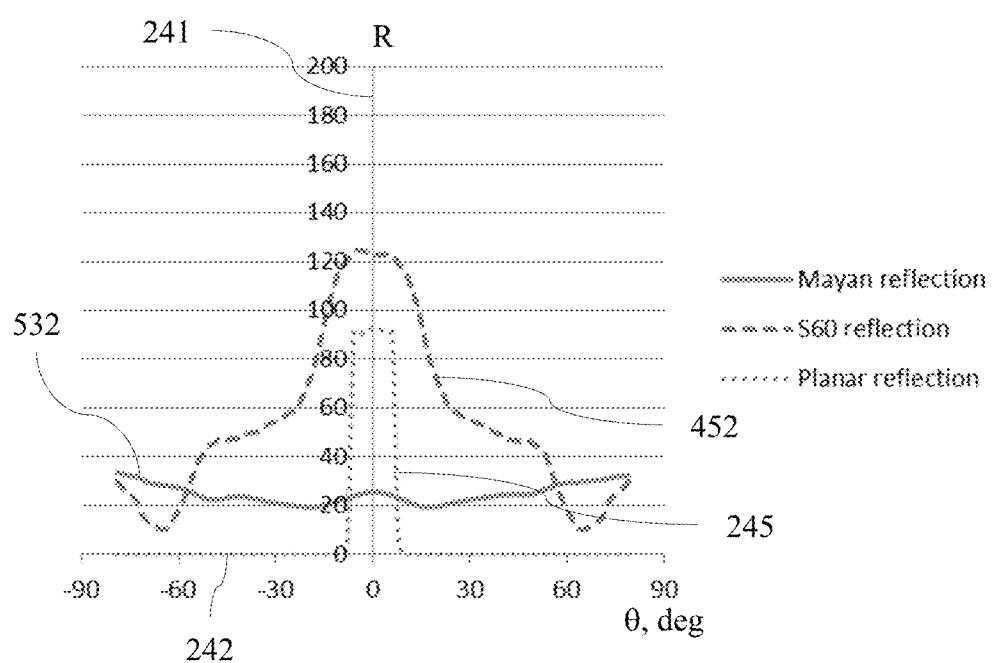

FIGS. 42-43 are schematic graphs illustrating the angular variation of respectively transmitted luminous intensity L and reflected luminous intensity R against direction θ in the waveguide in the arrangement of FIG. 40.

In operation, pairs 218 (that may be referred to as "Mayan" structures) typically provide output profiles 530 in transmission that further increase luminance at high angle for void filling purposes. Further the reflection profile 532 of the pairs 518 is substantially reduced with respect to the S60 profile 452.

Advantageously uniformity in wide angle mode and privacy level in privacy mode is improved.

It would be desirable to provide (i) an input microstructure with a linear lightbar, (ii) a single cutting tool end radius similar to that shown in FIG. 29; and (iii) desirable angular transmission and reflection characteristics for wide angle uniformity and privacy mode stray light reduction.

FIGS. 44A-E are schematic diagrams illustrating in front view, an input microstructure 550 and aligned light emitting region 419.

Across a lateral extent of the input end 2 aligned with the light emitting area of at least one of light sources 15h, the input end 2 is shaped in the lateral direction as an array 550 of curved sections having cusps 431 therebetween. The array 550 of curved sections may including asymmetric curved sections 554, 564 having different angles 434, 436 at the cusps on either side thereof, with respect to a direction along the aligned light emitting area of the light source 15h. The higher of said different angles 436 being in a range from a first lower limit of 35° to first upper limit of 90°, and the lower of said different angles 434 being in a range from a second lower limit of 15° to a second upper limit of 34°.

The first and second lower limits may alternatively have the following values, which may be applied or not in any combination. The first lower limit may be 45°, or may be 60°. The first upper limit may be 85°. The second lower limit may be 20°. The second upper limit may be 30°. In one type of embodiment, the lower of said different angles 434 is 20°.

The asymmetric curved sections 554, 564 may be divided into first asymmetric curved sections 554 wherein the higher of said different angles 436 is on a first side of the asymmetric curved sections and second asymmetric curved sections 564 wherein the higher of said different angles 436 is on a second, opposite side of the asymmetric curved sections.

Figure 44A:
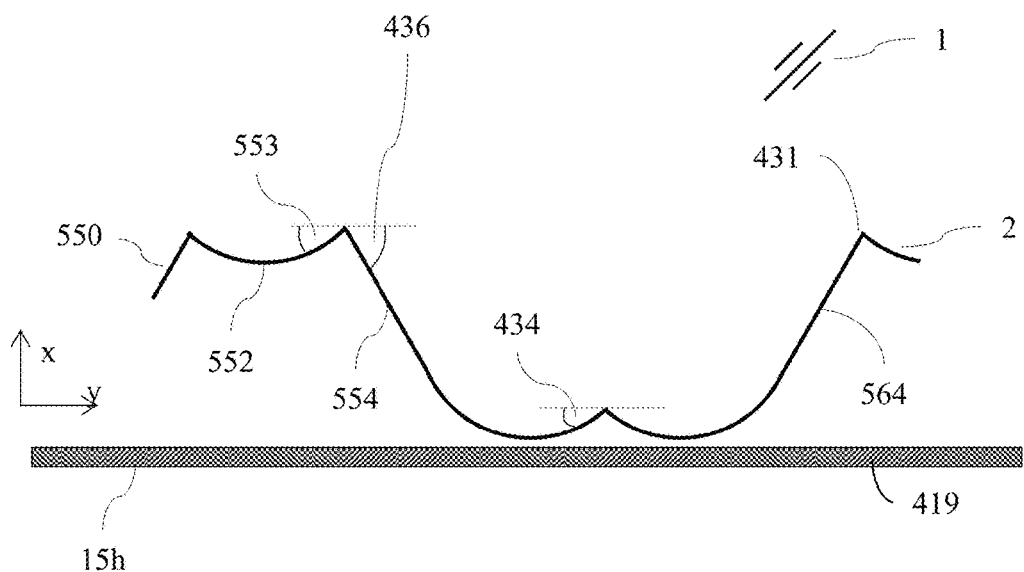
FIG. 44A, FIG. 44B, FIG. 44C, FIG. 44D, and FIG. 44E are schematic diagrams illustrating in front view, an input microstructure and aligned light source array, in accordance with the present disclosure.
Figure 44B:
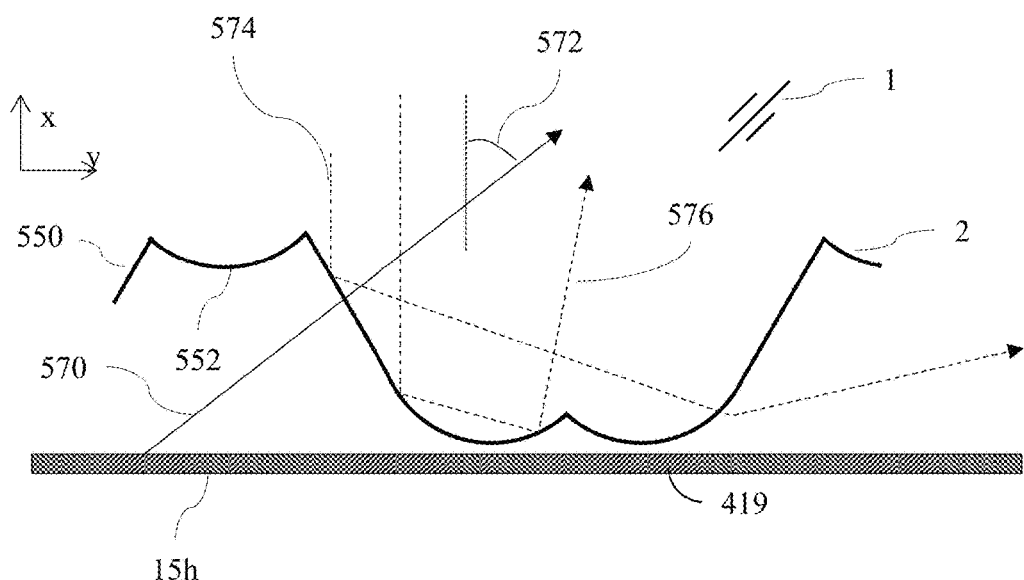
Figure 44C:
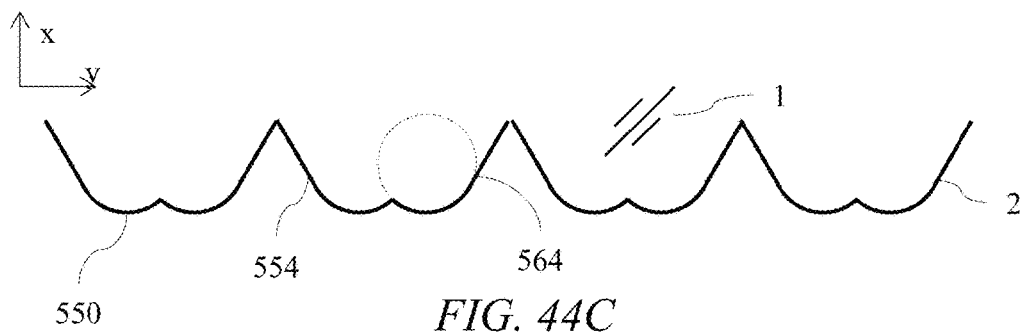

As shown in FIG. 44C, the first asymmetric curved sections 554 and the second asymmetric curved sections 564 alternate with each other across the array 550 of curved sections.

The upper of said different angles 436 and the lower of said different angles 434 may be identical for each asymmetric curved section.

The array 550 of curved sections 554, 564 may include further curved sections 552, interspersed with the asymmetric curved sections 554, 564. The angles 553 of the further curved sections at the cusps 431 with respect to the lateral direction being in a range from the first lower limit to the first upper limit.

In FIGS. 44A to 44D, the curved sections 550, 554, 564 are convex with respect to the waveguide 1. However, as in the example illustrated in FIG. 44E, the curved sections 550, 554, 564 may alternatively be concave with respect to the waveguide 1.

FIG. 44B illustrates operation of the array 550 of asymmetric cone sections. High angle transmitted rays 570 may be provided at high angles 572. Reflected rays 574 may be outputted, with relatively low reflectivity of double TIR rays 576.

Figure 44D:
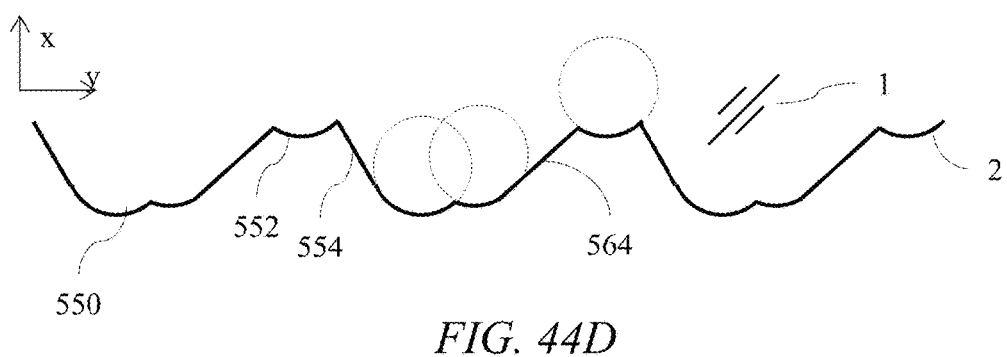
Figure 44E:
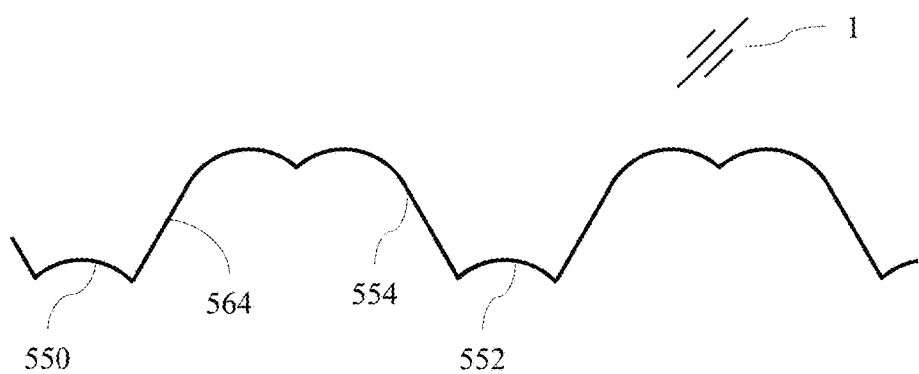

FIG. 44D illustrates that the asymmetric array 550 may have further asymmetries of angles. Light may be directed preferably to a near side 22, 24 with respect to the input microstructure array 550. Advantageously void filling may be improved.

Figure 45A:
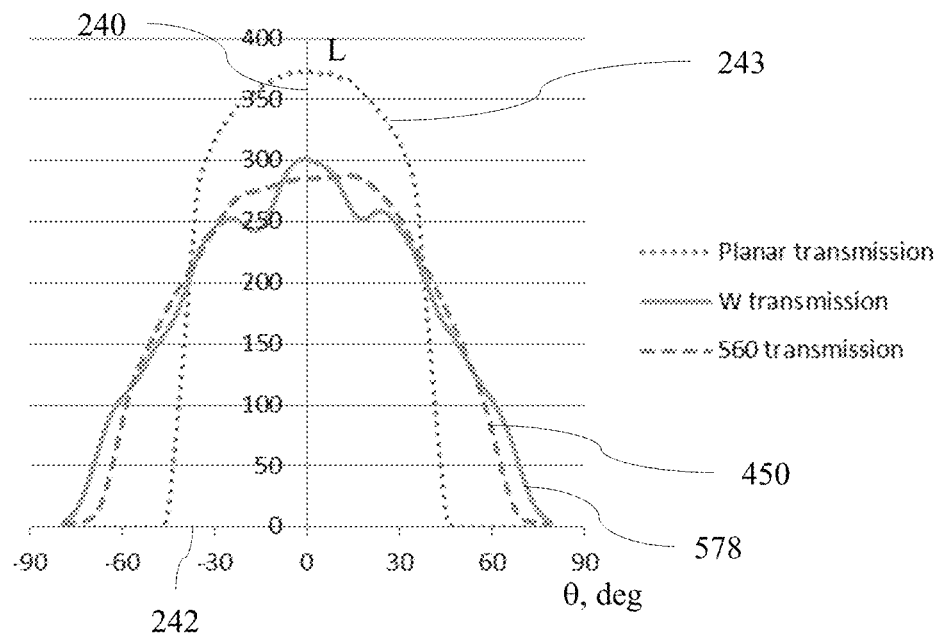
FIG. 45A and FIG. 45B are schematic graphs illustrating the angular variation of respectively transmitted luminous intensity L and reflected luminous intensity R against direction θ in the waveguide in the arrangement of FIG. 44A, in accordance with the present disclosure.
Figure 45B:
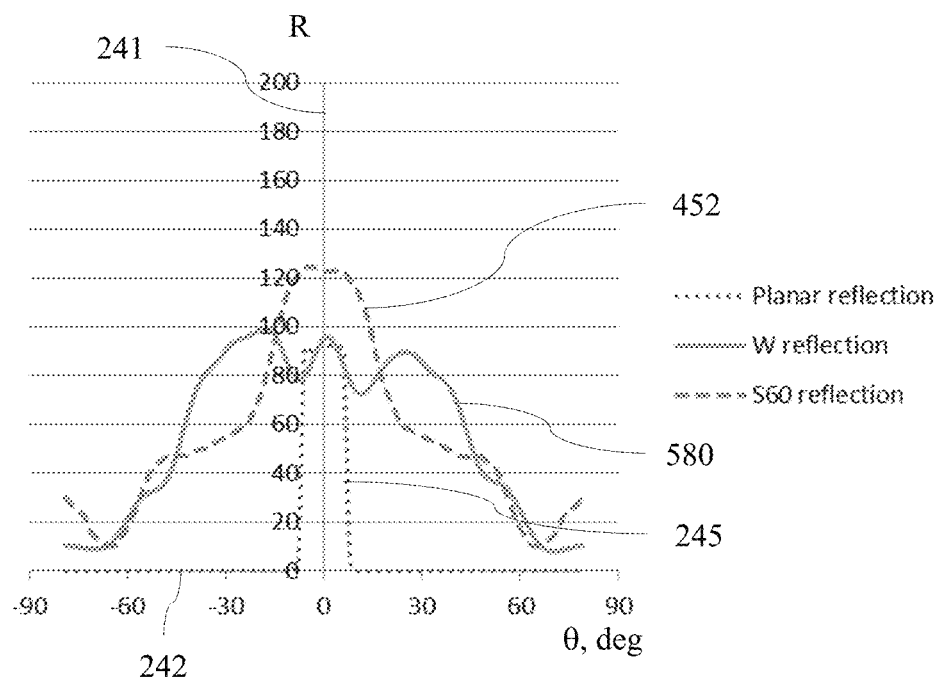

FIGS. 45A-B are schematic graphs illustrating the angular variation of respectively transmitted luminous intensity L 240 and reflected luminous intensity R 241 against direction θ 242 in the waveguide 1 in the arrangement of FIG. 44A.

Advantageously there may be provided (i) an input microstructure with a linear lightbar, (ii) a single cutting tool end radius similar to that shown in FIG. 29; and (iii) improved angular transmission and reflection characteristics for wide angle uniformity and privacy mode stray light reduction in comparison to an S60 microstructure.

Figure 46:
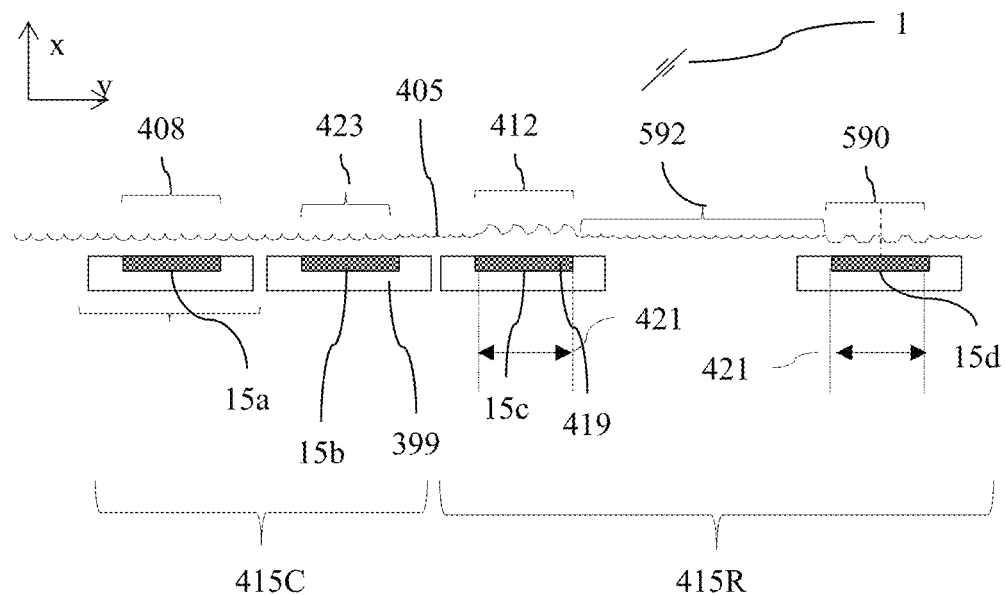
FIG. 46 is a schematic diagram illustrating in front view, an array of light sources for a directional waveguide comprising at least two different input microstructures aligned with each illumination region of the input light sources and further low reflectivity microstructure regions arranged between input microstructures, in accordance with the present disclosure.

FIG. 46 is a schematic diagram illustrating in front view, an array 15 of light sources for a directional waveguide 1 comprising at least two different input microstructures 408, 423, 412, 590 aligned with each illumination region 419 of the input light sources 15a, 15b, 15c, 15d respectively and further low reflectivity microstructure regions 405 arranged between input microstructures 408, 423, 412, 590.

Further, the input end 2 may comprise plural reflection reduction regions arranged between the lateral extents of the light sources. The array of light sources 15a-n may be at different input positions in a lateral direction across a central part 415C of the input end 2, and the input end 2 comprises reflection reduction regions outside the central part 415C of the input end 2, such as in parts 415L and 415R.

The light sources 15h may have light emitting areas 419 with respective lateral extents 421 that are separated, and the input end 2 comprises plural reflection reduction regions 405, 592 arranged between the lateral extents 421 of the light sources 15a, 15b, 15c, 15d.

Figure 47A:
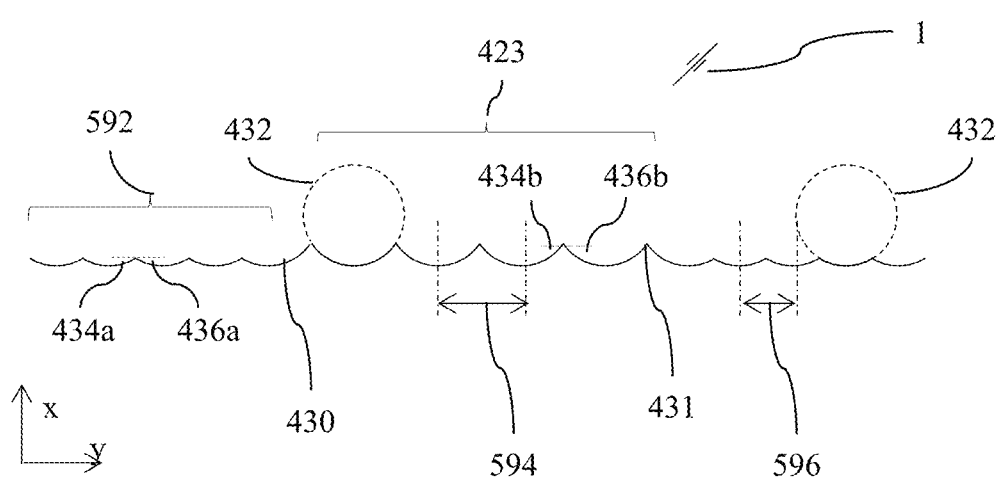
FIG. 47A and FIG. 47B are a schematic diagrams illustrating in front view, a detail of microstructures in FIG. 46, in accordance with the present disclosure.

FIG. 47A is a schematic diagram illustrating in front view, a detail of microstructures in FIG. 46. Microstructures 423 and 592 may further be provided with the same curved sections 430 which are conic sections formed by conics 432 with cusp 431 angles 434a, 436a and 434b, 436b for each microstructure provided by modification of pitch 594, 596 for respective regions. Advantageously the same cutting tool such as diamond 730 can be used to provide the respective microstructures, reducing cost and complexity of the tooling process. In FIG. 47A the curved sections 430 are convex, but they may equally be concave as shown in FIG. 47B.

Figure 47B:
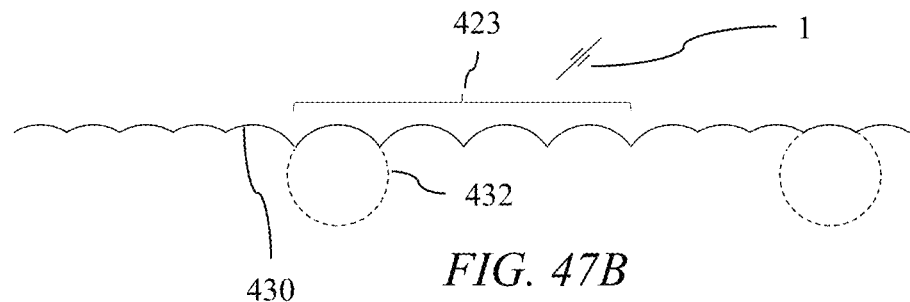
Figure 48A:
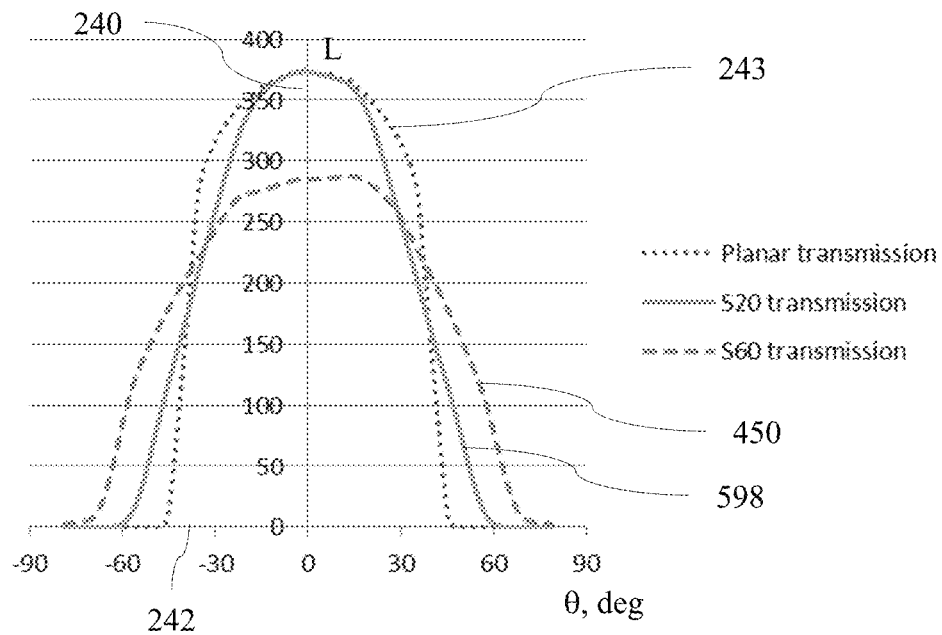
FIG. 48A and FIG. 48B are schematic graphs illustrating the angular variation of respectively transmitted luminous intensity L and reflected luminous intensity R against direction θ in the waveguide in the arrangement of FIGS. 47A and 47B, in accordance with the present disclosure.
Figure 48B:
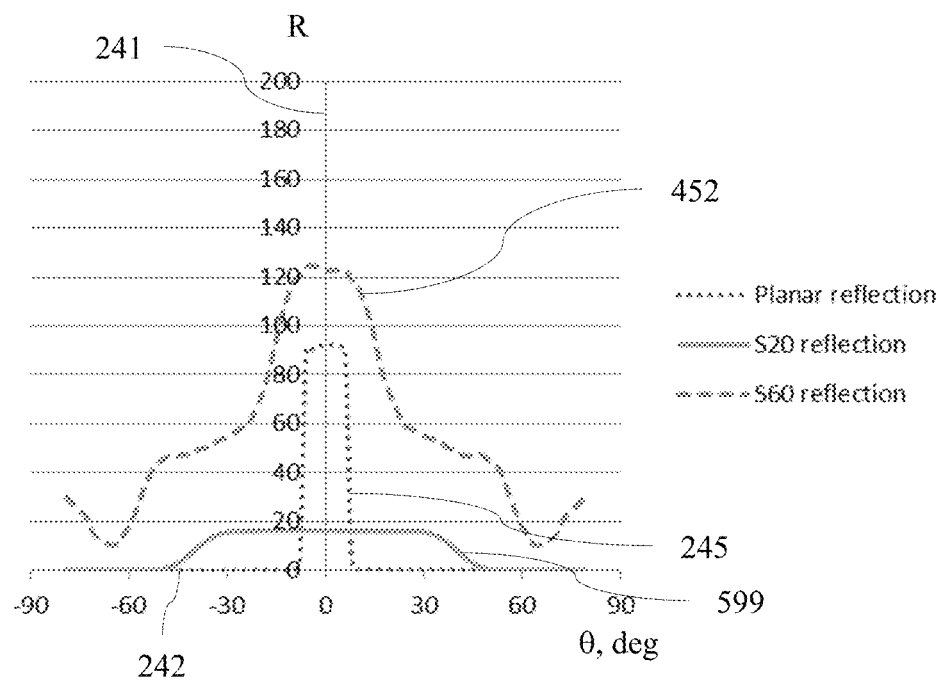

FIGS. 48A-B are schematic graphs illustrating the angular variation of respectively transmitted luminous intensity L 240 and reflected luminous intensity R 241 against direction θ 242 in the waveguide 1 in the arrangement of FIGS. 47A-B for the microstructure 592 with cusp angle 434a, 436a of 20 degrees, that may be referred to as an S20 microstructure herein. Angles 434b, 436b may be 60 degrees for an S60 microstructure.

The transmission profile 243 is not illuminated. The reflected profile 599 has low reflectivity and high uniformity, advantageously providing low levels of streaking in the privacy mode.

The input end 2 may comprise at least one reflection reduction region 405 in the lateral direction, outside the lateral extents 421 of the light emitting areas 419 of the light sources 15a-d, within which the input end 2 is shaped in the lateral direction as an array of curved sections having cusps therebetween, the angles 434a, 436a of the curved sections at the cusps 431 with respect to the lateral direction being in a range from a lower limit of 15° to an upper limit of 34°. The lower limit may alternatively be 20°. Instead or as well, the upper limit may alternatively be 30°. In one embodiment, the angles 434a, 436a of the curved sections at the cusps 431 with respect to the lateral direction may be 20°.

The curved sections may be concave with respect to the light guide 1 as illustrated in FIG. 47B. The curved sections may be convex with respect to the light guide as illustrated in FIG. 47A. The curved sections may be identical.

The light sources 15a-d may have light emitting areas with respective lateral extents that are separated, and the input end 2 may comprise plural reflection reduction regions 592, 405 arranged between the lateral extents 421 of the light sources.

The array of light sources 15 may be at different input positions in a lateral direction across a central part 415C of the input end 2, and the input end 2 may comprise reflection reduction regions outside the central part 415C of the input end 2.

It would be desirable to provide efficient electrical connections between light sources in an array of LEDs for use in a switchable privacy display.

Figure 49A:
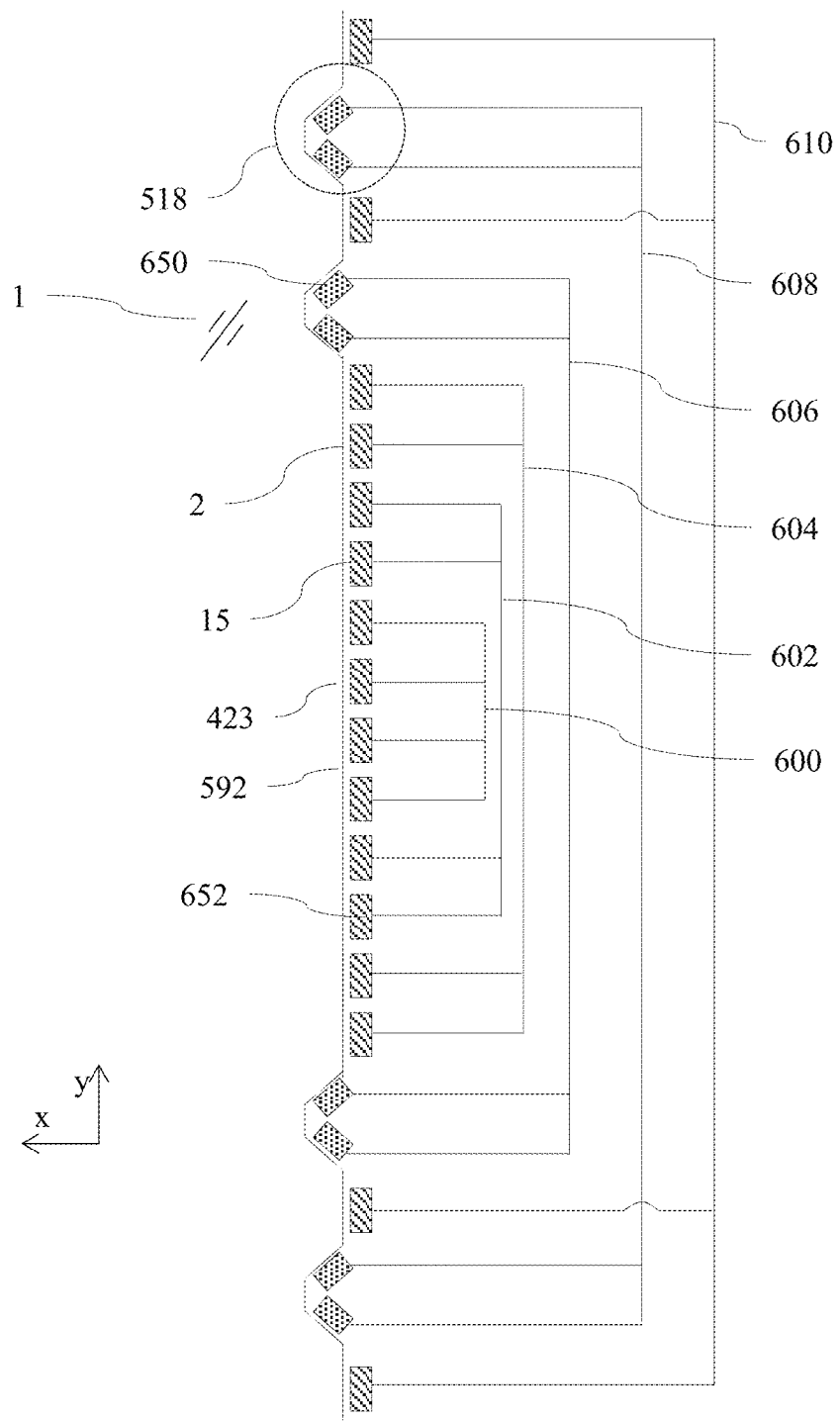
FIG. 49A and FIG. 49B are schematic diagrams illustrating in front view, connection methods for an array of light sources aligned with a microstructure input side, in accordance with the present disclosure.
Figure 49B:
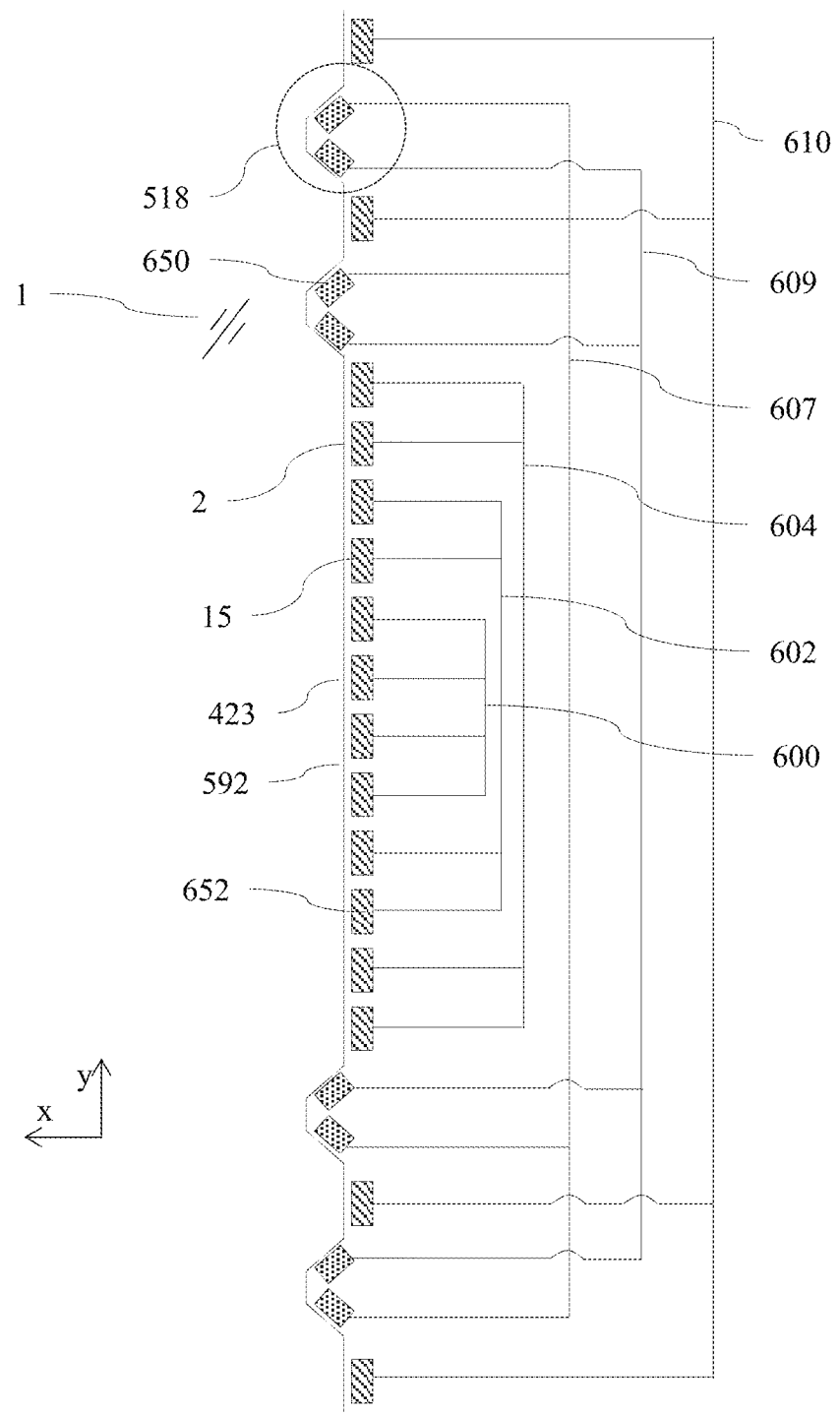

FIGS. 49A-B are schematic diagrams illustrating in front view, connection methods for an array of light sources aligned with a microstructure input side. Channels 600, 602, 604, 606, 608, 610 may be connected in series with double chip LED packages 652 and single chip packages 650 shaded accordingly. The voltage across a double chip LED package 652 may be twice the voltage across a single chip LED package. The same voltage may be applied to each channel, and the number of channels may be substantially lower than the number of LEDs. Advantageously drive circuit cost may be reduced, and display symmetry may be maintained.

LED array 15 and waveguide input end 2 structures that can achieve increased display luminance and reduced light source visibility will now be described. Advantageously the voltage in each LED string is arranged to be the same. Alternatively the LEDs may be driven with different groupings or individually.

Figure 50:
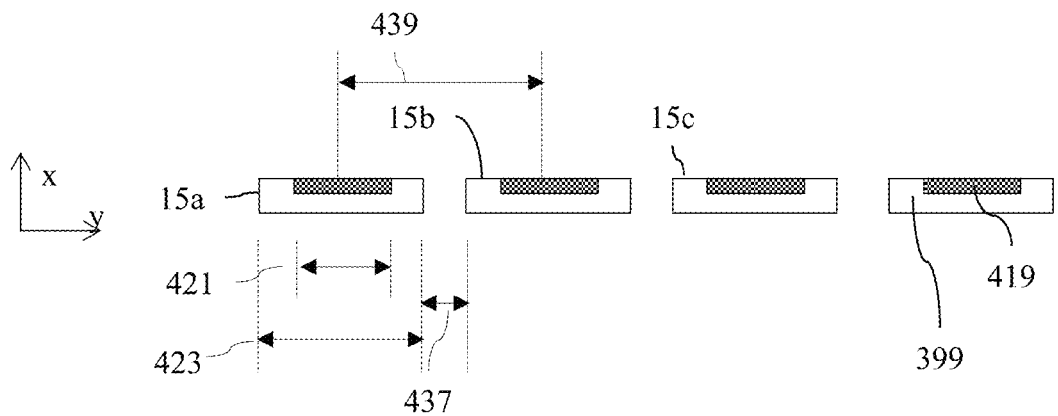
FIG. 50 is a schematic diagram illustrating in front view, a linear LED array, in accordance with the present disclosure.

FIG. 50 is a schematic diagram illustrating in front view, a linear LED array. LED spacing is determined by package width 423 and gap 437 that may be determined by restrictions of solder pad spacing and SMT placement tolerances.

It would be desirable to increase the packing density of central LEDs to increase head on display luminance with acceptable solder pad and placement tolerances.

Figure 51:
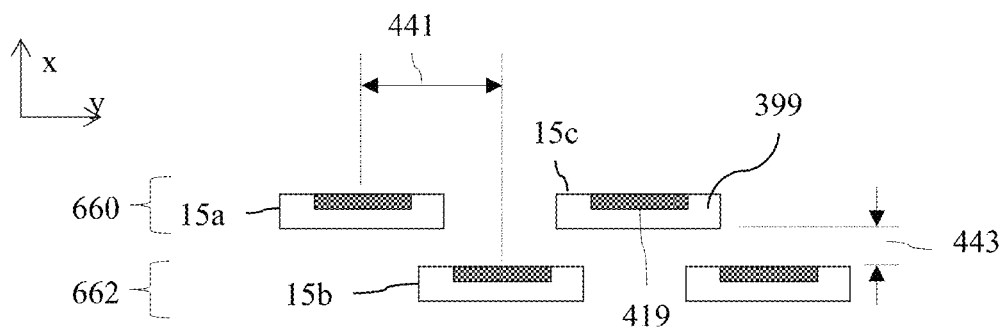
FIG. 51 is a schematic diagram illustrating in front view, a stepped LED array arranged to achieved increased luminous flux density, in accordance with the present disclosure.

FIG. 51 is a schematic diagram illustrating in front view, a stepped LED array arranged to achieve increased luminous flux density, that is the number of lumens that can be achieved in the lateral direction, that may be measured in lumens per millimeter (lm/mm) in the y direction. The packages 399 may be overlapped in the lateral direction. The packages may be arranged in at least two rows 660, 662. The spacing 441 between the emitting regions 419 is thus reduced in the lateral direction. Advantageously lumens per millimeter in the lateral direction may be increased.

In assembly, solder pad and LED placement tolerance may determine spacing 443, however emitting area of the lower light source array 662 comprising LEDs 15b, 15d may be arranged in the gap between upper light source array 660 comprising LEDs 15a, 15c.

Figure 52A:
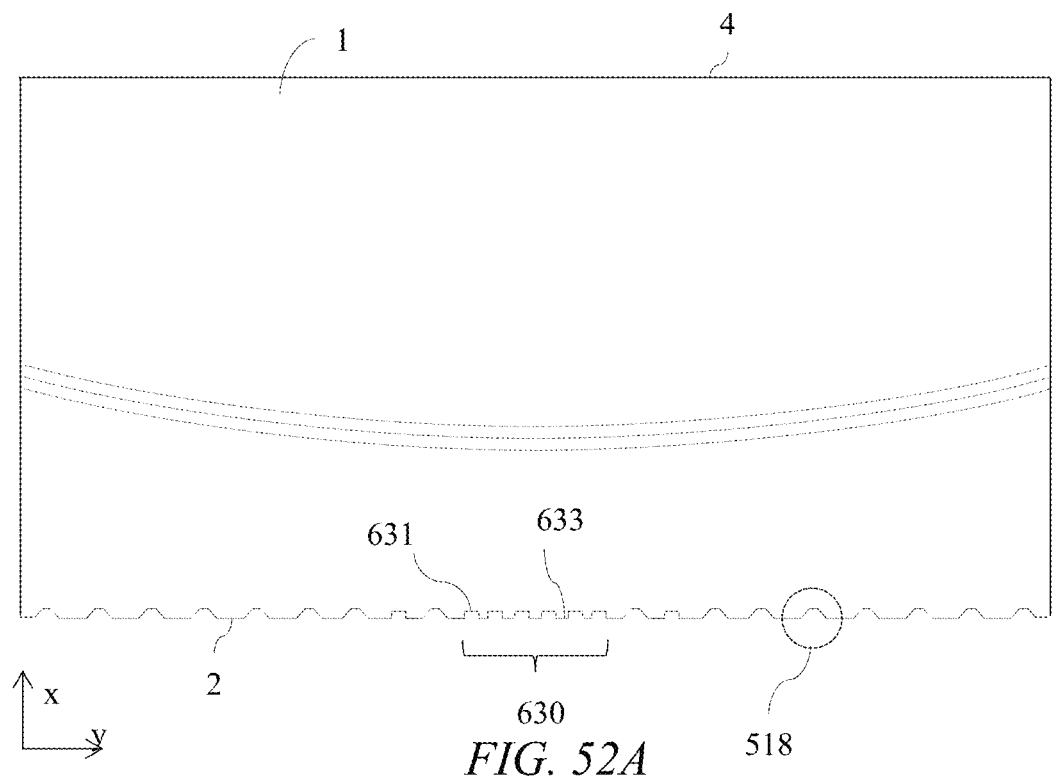
FIG. 52A is a schematic diagram illustrating in front view, a waveguide comprising a central input region that may be arranged to achieved increased luminous flux density, in accordance with the present disclosure.

FIG. 52A is a schematic diagram illustrating in front view, a waveguide 1 comprising a central input region 630 that may be arranged to achieve increased luminous flux density. Input side 2 may thus have region 630 with a castellated structure comprising upper and lower input facets 631, 633 respectively that in operation may be aligned with upper LEDs 15a, 15c and lower LEDs 15b, 15d of FIG. 51. Input facets 631, 633 may comprise input microstructures, as described elsewhere herein.

The light source packages 399 of the array 15 may thus be arranged at the input side 2 of the waveguide 1 in at least two rows so that the packages 399 are overlapped in the lateral direction.

Figure 52B:
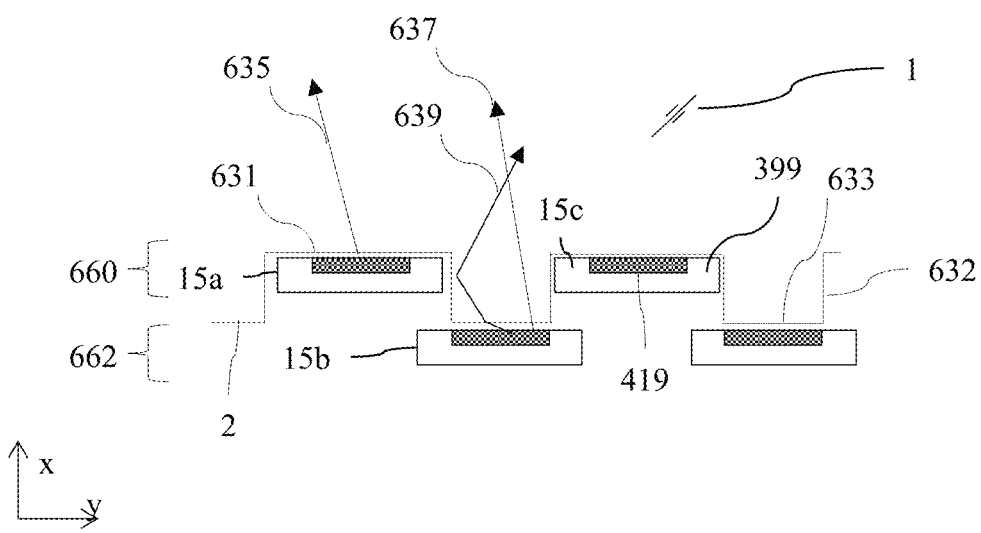
FIG. 52B is a schematic diagram illustrating in front view, alignment of a waveguide comprising a stepped central input region and aligned overlapping light source packages, in accordance with the present disclosure.

FIG. 52B is a schematic diagram illustrating in front view, alignment of a waveguide 1 comprising a stepped central input region 630 and aligned light source packages, 15a-15c that are overlapping in the lateral direction. Rays 635, 637 may be provided by light sources 15a, 15b in cooperation with microstructures arranged on facets 631, 633 respectively. Further rays 639 may be provided by total internal reflection at side walls 632. Advantageously the ray 639 may have a virtual object location that is behind the laterally overlapping package 15a, thus the lateral uniformity of the array of light sources 15a-c may be increased and the appearance of hotspots from the input light sources reduced.

Figure 53:
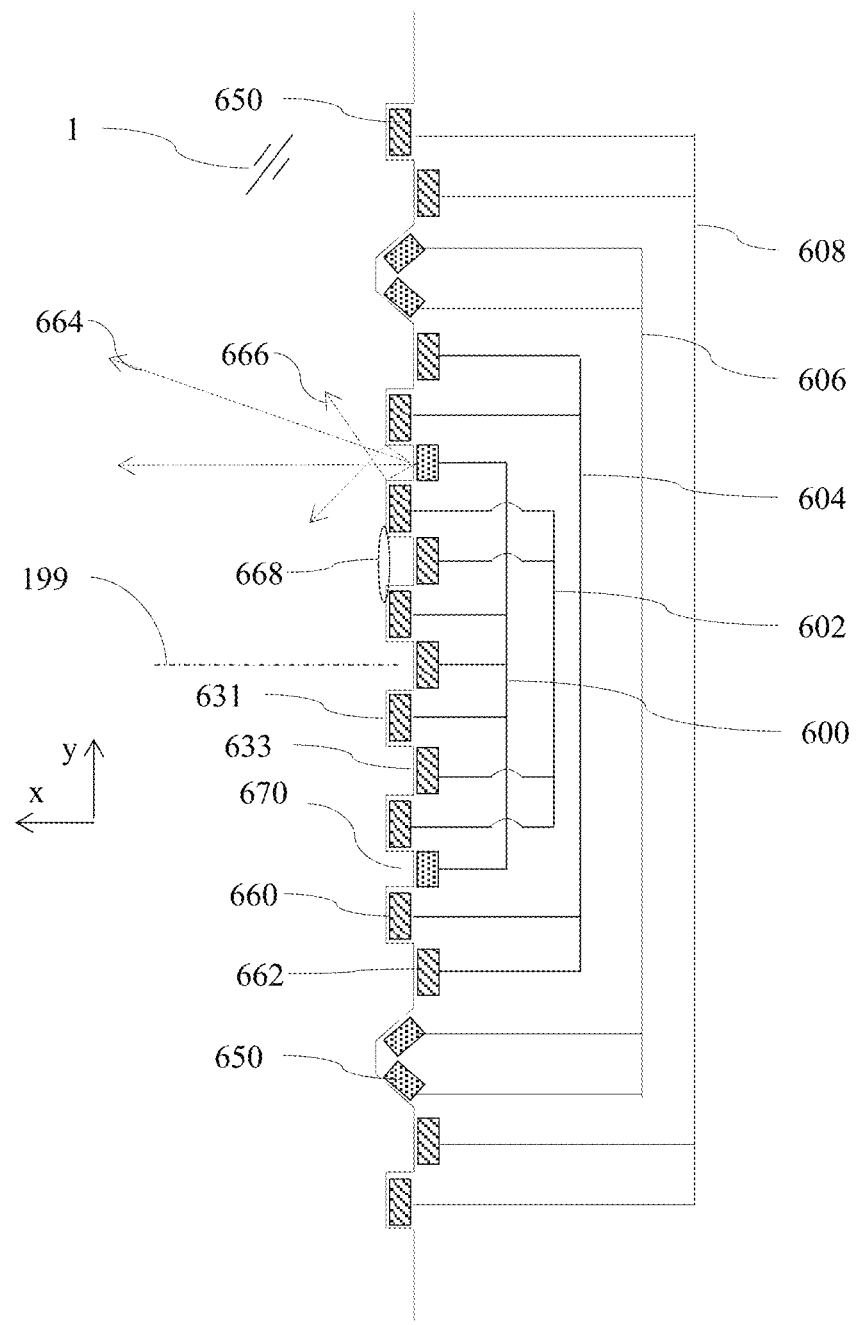
FIG. 53 is a schematic diagram illustrating in front view, a connection method for an array of light sources aligned with a microstructure input side as shown in FIG. 50, in accordance with the present disclosure.

FIG. 53 is a schematic diagram illustrating in front view, alignment of a stepped lightbar comprising arrays 660, 662 with a castellated input side 2 region 630 and an example connection method for an array of light sources and waveguide 1 as shown in FIGS. 51-52.

Upper LED array 660 and lower LED array 662 may be aligned with upper and lower facets 631, 633. A high lm/mm input array may be provided. Advantageously head on display luminance may be increased. Advantageously the voltage in each LED string is arranged to be the same. Alternatively the LEDs may be driven with different groupings or individually.

Further light rays 666 may be outputted from the rear LED array 662 by means of TIR at the side walls 635 of the castellated input. Side walls 635 may be planar to provide reflection of outputted light from microstructure at input facet 633. Such reflected light rays 666 may appear to originate from the exit aperture 668 of the castellated well 670. Thus gaps between the emitting areas 419 of the light emitting elements may be reduced in appearance. Advantageously light streaking artefacts for input light may be reduced.

FIG. 49A illustrates adjacent pairs of light sources that may be connected in series, for example by channel 606, 608 whereas FIG. 49B illustrates that outwards facing channel 607 and inwards facing channel 609 may be used to provide compensation between head on luminance and luminance of filled voids.

Further dual chip LEDs 650 and single chip LEDs 652 may be provided in the array to provide a symmetric addressing arrangement as illustrated by electrodes 600, 602, 604, 606, 608. Advantageously cost of addressing electronics is reduced.

The embodiments related to stepped waveguide directional backlights may be applied with changes as necessary to the wedge directional backlight as described herein.

The embodiments described herein may be arranged to provide reduced Privacy level (or cross talk) for off axis viewing of a Privacy display. The embodiments may further provide reduced cross talk in an autostereoscopic display, by reducing reflectivity of an input microstructure in regions that are not aligned with the emitting aperture of light sources of a light source array.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A directional backlight for a transmissive spatial light modulator, comprising:
   a waveguide comprising an input end; and
   an array of light sources at different input positions in a lateral direction across the input end, the light sources being arranged to input light into the waveguide through the input end, the light sources having light emitting areas with respective lateral extents,
   the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources, wherein the light sources include at least one pair of adjacent light sources arranged at input positions offset from the optical axis of the reflective end, wherein, within the pair, the light source closest to said optical axis is inclined with the normal to the lateral extent of its light emitting area inclined towards said optical axis and the light source furthest from said optical axis is inclined with the normal to the lateral extent of its light emitting area inclined away from said optical axis.

2. A directional backlight according to claim 1, wherein the input end of the waveguide comprises a pair of inclined input facets extending across the light emitting areas of the respective light sources of said pair.

3. A directional backlight according to claim 1, wherein the normal to the lateral extent of the light emitting area of said inclined light sources are inclined at angles to the lateral direction in a range from 15° to 45°.

4. A directional- backlight according to claim 2, wherein said input facets are each shaped as an array of curved sections having cusps therebetween, and the angles of the curved sections at the cusps, with respect to a direction along the light emitting area of the light source across which the input facet extends, are in a range from a first lower limit of 15° to a first upper limit of 60°.

5. A directional backlight according to claim 4, wherein the first lower limit is 35°.

6. A directional backlight according to claim 5, wherein the first upper limit is 50°.

7. A directional backlight according to claim 4, wherein the first upper limit is 50°.

8. A directional backlight according to claim 2, wherein the input end includes an intermediate facet extending between the inclined input facets.

9. A directional backlight according to claim 8, wherein said intermediate facet is each shaped as an array of curved sections having cusps therebetween, and the angles of the curved sections at the cusps, with respect to the lateral direction, are in a range from a second lower limit of 15° to a second upper limit of 34°.

10. A directional backlight according to claim 9, wherein the second lower limit is 20°.

11. A directional backlight according to claim 10, wherein the second upper limit is 30°.

12. A directional backlight according to claim 9, wherein the second upper limit is 30°.

13. A directional backlight according to claim 4, wherein said curved sections are conic sections.

14. A directional backlight according to claim 4, wherein the curved sections are concave with respect to the light guide.

15. A directional backlight according to claim 4, wherein the curved sections are convex with respect to the light guide.

16. A directional backlight according to claim 1, wherein the waveguide further comprises sides, extending between the input end and the reflective end and between the guiding surfaces, that are arranged to reflect light from the light sources.

17. A directional backlight according to claim 1, further comprising a control system arranged to control the light sources.

18. A directional backlight according to claim 17, the control system being arranged, on selective operation of a first light source to direct light into an optical window, to simultaneously operate a second light source that directs light reflected by the reflective end and then by a side of the waveguide into an outer portion of the waveguide that fails to be illuminated by the first light source.

19. A directional display device comprising:
a directional backlight according to claim 1; and
a transmissive spatial light modulator arranged to receive the output light from the waveguide and to modulate it to display an image.

20. A directional backlight for a transmissive spatial light modulator, comprising:
a waveguide comprising an input end; and
an array of light sources at different input positions in a lateral direction across the input end, the light sources being arranged to input light into the waveguide through the input end, the light sources having light emitting areas with respective lateral extents that do not cover the entirety of the input end in the lateral direction,
the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources,
wherein the input end comprises at least one reflection reduction region in the lateral direction, outside the lateral extents of the light emitting areas of the light sources, within which the input end is shaped in the lateral direction as an array of curved sections having cusps therebetween, the angles of the curved sections at the cusps with respect to the lateral direction being in a range from a lower limit of 15° to an upper limit of 34° and
wherein the first guide surface is arranged to guide light by total internal reflection and the second guide surface comprises a plurality of light extraction features oriented to direct light reflected by the reflected end in directions allowing exit through the first guide surface as the output light and intermediate regions between the light extraction features that are arranged to guide light along the waveguide.

21. A directional backlight according to claim 20, wherein the lower limit is 20°.

22. A directional backlight according to claim 21, wherein the upper limit is 30°.

23. A directional backlight according to claim 20, wherein the upper limit is 30°.

24. A directional backlight according to claim 20, wherein said curved sections are conic sections.

25. A directional backlight according to claim 20, wherein the curved sections are concave with respect to the light guide.

26. A directional backlight according to claim 20, wherein the curved sections are convex with respect to the light guide.

27. A directional backlight according to claim 20, wherein the curved sections are identical.

28. A directional backlight according to claim 20, wherein the light sources have light emitting areas with respective lateral extents that are separated, and the input end comprises plural reflection reduction regions arranged between the lateral extents of the light sources.

29. A directional backlight according to claim 20, wherein the array of light sources are at different input positions in a lateral direction across a central part of the input end, and the input end comprises reflection reduction regions outside the central part of the input end.

30. A directional backlight according to claim 20, wherein the light extraction features and the intermediate regions alternate with one another in a stepped shape.

31. A directional backlight according to claim 20, wherein the light extraction features have positive optical power in the lateral direction.

32. A directional backlight according to claim 20, wherein the waveguide further comprises sides, extending between the input end and the reflective end and between the guiding surfaces, that are arranged to reflect light from the light sources.

33. A directional display device comprising:
a directional backlight according to claim 20; and
a transmissive spatial light modulator arranged to receive the output light from the waveguide and to modulate it to display an image.

34. A directional backlight according to claim 33, wherein the first guide surface is arranged to guide light by total internal reflection and the second guide surface comprises a plurality of light extraction features oriented to direct light reflected by the reflected end in directions allowing exit through the first guide surface as the output light and intermediate regions between the light extraction features that are arranged to guide light along the waveguide.

35. A directional backlight according to claim 34, wherein the light extraction features and the intermediate regions alternate with one another in a stepped shape.

36. A directional backlight according to claim 34, wherein the light extraction features have positive optical power in the lateral direction.

37. A directional backlight for a transmissive spatial light modulator, comprising:
a waveguide comprising an input end; and
an array of light sources at different input positions in a lateral direction across the input end, the light sources being arranged to input light into the waveguide through the input end, the light sources having light emitting areas with respective lateral extents;
the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources,
wherein across a lateral extent of the input end aligned with the light emitting area of at least one of light sources, the input end is shaped in the lateral direction as an array of curved sections having cusps therebetween, the array of curved sections including asymmetric curved sections having different angles at the cusps on either side thereof, with respect to a direction along the aligned light emitting area of the light source, the higher of said different angles being in a range from a first lower limit of 35° to first upper limit of 90°, and the lower of said different angles being in a range from a second lower limit of 15° to a second upper limit of 34°.

38. A directional backlight according to claim 37, wherein the first lower limit is 45°, or 60°.

39. A directional backlight according to claim 38, wherein the first upper limit is 85°.

40. A directional backlight according to claim 37, wherein the first upper limit is 85°.

41. A directional backlight according to claim 37, wherein the second lower limit is 20°.

42. A directional backlight according to claim 38, wherein the second upper limit is 30°.

43. A directional backlight according to claim 37, wherein the second upper limit is 30°.

44. A directional backlight according to claim 37, wherein the asymmetric curved sections are divided into first asymmetric curved sections wherein the higher of said different angles is on a first side of the asymmetric curved sections and second asymmetric curved sections wherein the higher of said different angles is on a second, opposite side of the asymmetric curved sections.

45. A directional backlight according to 44, wherein the first asymmetric curved sections and the second asymmetric curved sections alternate with each other across the array of curved sections.

46. A directional backlight according to claim 37, wherein the upper of said different angles and the lower of said different angles are identical for each asymmetric curved section.

47. A directional backlight according to claim 37, wherein the array of curved sections include further curved sections, interspersed with the asymmetric curved sections, the angles of the further curved sections at the cusps with respect to the lateral direction being in a range from the first lower limit to the first upper limit.

48. A directional backlight according to claim 37, wherein said curved sections are conic sections.

49. A directional backlight according to claim 37, wherein the curved sections are concave with respect to the light guide.

50. A directional backlight according to claim 37, wherein the curved sections are convex with respect to the light guide.

51. A directional backlight according to claim 37, wherein the light sources have light emitting areas with respective lateral extents that are separated, and the input end comprises at least one reflection reduction region arranged outside the lateral extents of the light sources, within which the input end is shaped in the lateral direction as an array of curved sections having cusps therebetween, the angles of the curved sections at the cusps with respect to the lateral direction being in a range from a lower limit of 15° to an upper limit of 34°.

52. A directional backlight according to claim 37, wherein said at least one of light sources is at an input position offset from the optical axis of the reflective end.

53. A directional backlight according to claim 37, wherein the waveguide further comprises sides, extending between the input end and the reflective end and between the guiding surfaces, that are arranged to reflect light from the light sources.

54. A directional backlight according to claim 37, further comprising a control system arranged to control the light sources.

55. A directional backlight according to claim 54, the control system being arranged, on selective operation of a first light source to direct light into an optical window, to simultaneously operate a second light source that directs light reflected by the reflective end and then by a side of the waveguide into an outer portion of the waveguide that fails to be illuminated by the first light source.

56. A directional display device comprising:
    a directional backlight according to claim 37; and
    a transmissive spatial light modulator arranged to receive the output light from the waveguide and to modulate it to display an image.

57. A directional backlight for a transmissive spatial light modulator, comprising:
    a waveguide comprising an input end; and
    an array of light sources at different input positions in a lateral direction across the input end, the light sources being arranged to input light into the waveguide through the input end, the light sources having light emitting areas with respective lateral extents,
    the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources,
    wherein across a lateral extent of the input end aligned with the light emitting area of at least one of light sources, the input end is shaped in the lateral direction as an array of teeth that are each shaped with a convex curved section on one side the tooth and a concave curved section on the other side of the tooth.

58. A directional backlight according to claim 57, wherein said curved sections are conic sections.

59. A directional backlight according to claim 57, wherein, at cusps between the convex curved sections and the concave curved sections, each of the convex curved sections and the concave curved sections has a shallow angle at the cusp at one end thereof in a range from 0° to 20° and has a steep angle at the cusp at the other end thereof in a range from 45° to 90°.

60. A directional backlight according to claim 57, wherein said teeth are identical.

61. A directional backlight according to claim 57, wherein the light sources have light emitting areas with respective lateral extents that are separated, and the input end comprises at least one reflection reduction region arranged outside the lateral extents of the light sources, within which the input end is shaped in the lateral direction as an array of curved sections having cusps therebetween, the angles of the curved sections at the cusps with respect to the lateral direction being in a range from a lower limit of 15° to an upper limit of 34°.

62. A directional backlight according to claim 57, wherein the first guide surface is arranged to guide light by total internal reflection and the second guide surface comprises a plurality of light extraction features oriented to direct light reflected by the reflected end in directions allowing exit through the first guide surface as the output light and intermediate regions between the light extraction features that are arranged to guide light along the waveguide.

63. A directional backlight according to claim 62, wherein the light extraction features and the intermediate regions alternate with one another in a stepped shape.

64. A directional backlight according to claim 62, wherein the light extraction features have positive optical power in the lateral direction.

65. A directional backlight according to claim 57, wherein said at least one of light sources is at an input position offset from the optical axis of the reflective end.

66. A directional backlight according to claim 57, wherein the waveguide further comprises sides, extending between the input end and the reflective end and between the guiding surfaces, that are arranged to reflect light from the light sources.

67. A directional backlight according to claim 57, further comprising a control system arranged to control the light sources.

68. A directional backlight according to claim 67, the control system being arranged, on selective operation of a first light source to direct light into an optical window, to simultaneously operate a second light source that directs light reflected by the reflective end and then by a side of the waveguide into an outer portion of the waveguide that fails to be illuminated by the first light source.

69. A directional display device comprising:
    a directional backlight according to claim 57; and
    a transmissive spatial light modulator arranged to receive the output light from the waveguide and to modulate it to display an image.

70. A directional backlight for a transmissive spatial light modulator, comprising:
    a waveguide comprising an input end; and
    an array of light sources at different input positions in a lateral direction across the input end, the light sources being arranged to input light into the waveguide through the input end, the light sources having light emitting areas with respective lateral extents,
    the waveguide further comprising first and second, opposed guide surfaces for guiding the input light along the waveguide, and a reflective end facing the input end for reflecting the input light guided from the input end back through the waveguide, wherein the second guide surface is arranged to deflect light reflected from the reflective end through the first guide surface as output light, the reflective end has positive optical power in the lateral direction, and the waveguide is arranged to image the light sources in the lateral direction so that the output light from the light sources is directed into respective optical windows that are distributed in the lateral direction in dependence on the input positions of the light sources,
    wherein across a lateral extent of the input end aligned with the light emitting area of at least one of light sources, the input end is shaped in the lateral direction as an array of curved sections having cusps therebetween, the angles of the curved sections at the cusps with respect to the lateral direction being in a range from a lower limit of 35° to an upper limit of 90°, and wherein the first guide surface is arranged to guide light by total internal reflection and the second guide surface comprises a plurality of light extraction features oriented to direct light reflected by the reflected end in directions allowing exit through the first guide surface as the output light and intermediate regions between the light extraction features that are arranged to guide light along the waveguide.

71. A directional backlight according to claim 70, wherein the lower limit is 45°.

72. A directional backlight according to claim 71, wherein the upper limit is 75°.

73. A directional backlight according to claim 71, wherein the upper limit is 75°.

74. A directional backlight according to claim 70, wherein the curved sections are conic sections.

75. A directional backlight according to claim 70, wherein the curved sections are concave with respect to the light guide.

76. A directional backlight according to claim 70, wherein the curved sections are convex with respect to the light guide.

77. A directional backlight according to claim 70, wherein the light sources have light emitting areas with respective lateral extents that are separated, and the input end comprises at least one reflection reduction region arranged outside the lateral extents of the light emitting areas, within which the input end is shaped in the lateral direction as an array of curved sections having cusps therebetween, the angles of the curved sections at the cusps with respect to the lateral direction being in a range from a lower limit of 15° to an upper limit of 34°.

78. A directional backlight according to claim 70, wherein the light extraction features and the intermediate regions alternate with one another in a stepped shape.

79. A directional backlight according to claim 70, wherein the light extraction features have positive optical power in the lateral direction.

80. A directional backlight according to claim 70, further comprising a control system arranged to control the light sources.

81. A directional backlight according to claim 80, the control system being arranged, on selective operation of a first light source to direct light into an optical window, to simultaneously operate a second light source that directs light reflected by the reflective end and then by a side of the waveguide into an outer portion of the waveguide that fails to be illuminated by the first light source.

82. A directional display device comprising:
a directional backlight according to claim 70; and
a transmissive spatial light modulator arranged to receive the output light from the waveguide and to modulate it to display an image.

* * * * *